(12) United States Patent
Donnelly et al.

(10) Patent No.: US 11,599,123 B2
(45) Date of Patent: Mar. 7, 2023

(54) SYSTEMS AND METHODS FOR CONTROLLING AUTONOMOUS VEHICLES THAT PROVIDE A VEHICLE SERVICE TO USERS

(71) Applicant: Uber Technologies, Inc., San Francisco, CA (US)

(72) Inventors: Richard Brian Donnelly, Pittsburgh, PA (US); Michael Aitken, Pittsburgh, PA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 17/340,881

(22) Filed: Jun. 7, 2021

(65) Prior Publication Data
US 2021/0365042 A1 Nov. 25, 2021

Related U.S. Application Data

(63) Continuation of application No. 16/504,034, filed on Jul. 5, 2019, now Pat. No. 11,029,703, which is a (Continued)

(51) Int. Cl.
*E05F 15/00* (2015.01)
*G06N 5/00* (2006.01)
(Continued)

(52) U.S. Cl.
CPC ......... *G05D 1/0276* (2013.01); *B60R 16/037* (2013.01); *B60R 25/24* (2013.01);
(Continued)

(58) Field of Classification Search
CPC ..................................................... H04W 4/046
(Continued)

(56) References Cited

U.S. PATENT DOCUMENTS 8,774,752 B1 7/2014 Akcasu et al.
9,373,149 B2 6/2016 Abhyanker
(Continued)

OTHER PUBLICATIONS

"U.S. Appl. No. 16/734,947, Response filed Jan. 25, 2022 to Non Final Office Action dated Oct. 25, 2021", 11 pgs.
(Continued)

*Primary Examiner* — Adam D Tissot
(74) *Attorney, Agent, or Firm* — Schwegman Lundberg & Woessner, P.A.

(57) ABSTRACT

Systems and methods for determining autonomous vehicle user boarding times are provided. In one example embodiment, a computer implemented method includes obtaining location data associated with a user device associated with a user. The method includes determining an estimated time until the user starts boarding the autonomous vehicle based at least in part on the location data associated with the user device. The method includes obtaining data associated with the user. The method includes determining an estimated time of boarding duration for the user based at least in part on the data associated with the user. The method includes determining an estimated time until the user completes boarding of the autonomous vehicle based at least in part on the estimated time until the user starts boarding the autonomous vehicle and the estimated time of boarding duration for the user.

20 Claims, 16 Drawing Sheets

Related U.S. Application Data continuation of application No. 15/662,327, filed on Jul. 28, 2017, now Pat. No. 10,372,141.

(60) Provisional application No. 62/510,515, filed on May 24, 2017.

(51) Int. Cl.

| | |
|---|---|
| *G05D 1/02* | (2020.01) |
| *G05D 1/00* | (2006.01) |
| *G01C 21/34* | (2006.01) |
| *G01C 21/36* | (2006.01) |
| *G08G 1/01* | (2006.01) |
| *G08G 1/0962* | (2006.01) |
| *G08G 1/0967* | (2006.01) |
| *G08G 1/14* | (2006.01) |
| *G08G 1/00* | (2006.01) |
| *G08G 1/005* | (2006.01) |
| *G08G 1/0968* | (2006.01) |
| *B60R 16/037* | (2006.01) |
| *B60R 25/24* | (2013.01) |
| *G08G 1/09* | (2006.01) |
| *G08G 1/123* | (2006.01) |
| *H04W 4/46* | (2018.01) |
| *H04W 4/40* | (2018.01) |

(52) U.S. Cl.
CPC ..... *G01C 21/3438* (2013.01); *G01C 21/3492* (2013.01); *G01C 21/3676* (2013.01); *G05D 1/0088* (2013.01); *G08G 1/005* (2013.01); *G08G 1/0112* (2013.01); *G08G 1/0129* (2013.01); *G08G 1/0137* (2013.01); *G08G 1/0145* (2013.01); *G08G 1/09* (2013.01); *G08G 1/09623* (2013.01); *G08G 1/09626* (2013.01); *G08G 1/096725* (2013.01); *G08G 1/096775* (2013.01); *G08G 1/096791* (2013.01); *G08G 1/096827* (2013.01); *G08G 1/123* (2013.01); *G08G 1/143* (2013.01); *G08G 1/147* (2013.01); *G08G 1/202* (2013.01); *G08G 1/205* (2013.01); *H04W 4/46* (2018.02); *H04W 4/40* (2018.02)

(58) Field of Classification Search
USPC .......................................................... 701/23
See application file for complete search history.

(56) References Cited

U.S. PATENT DOCUMENTS

| | | | | |
|---|---|---|---|---|
| 9,769,616 | B1 * | 9/2017 | Pao | H04W 4/44 |
| 9,805,595 | B1 | 10/2017 | Portela et al. | |
| 10,248,120 | B1 | 4/2019 | Siegel et al. | |
| 10,372,141 | B2 | 8/2019 | Donnelly et al. | |
| 10,528,059 | B2 | 1/2020 | Donnelly et al. | |
| 11,029,703 | B2 | 6/2021 | Donnelly et al. | |
| 2013/0297549 | A1 * | 11/2013 | Yano | G08B 19/00 706/46 |
| 2015/0259967 | A1 * | 9/2015 | Kamisawa | E05F 15/79 49/30 |
| 2016/0046290 | A1 | 2/2016 | Aharony et al. | |
| 2016/0364678 | A1 | 12/2016 | Cao | |
| 2016/0364812 | A1 | 12/2016 | Cao | |
| 2017/0120803 | A1 | 5/2017 | Kentley et al. | |
| 2017/0120902 | A1 | 5/2017 | Kentley et al. | |
| 2017/0153714 | A1 * | 6/2017 | Gao | G06K 9/00805 |
| 2017/0192437 | A1 | 7/2017 | Bier et al. | |
| 2017/0365030 | A1 * | 12/2017 | Shoham | G06Q 10/02 |
| 2018/0033296 | A1 | 2/2018 | Fowe | |
| 2018/0039917 | A1 * | 2/2018 | Buttolo | G06Q 10/0631 |
| 2018/0075380 | A1 | 3/2018 | Perl et al. | |
| 2018/0090001 | A1 | 3/2018 | Fletcher | |
| 2018/0189913 | A1 | 7/2018 | Knopp et al. | |
| 2018/0211541 | A1 | 7/2018 | Rakah et al. | |
| 2018/0275658 | A1 | 9/2018 | Iandola et al. | |
| 2018/0281815 | A1 | 10/2018 | Stentz | |
| 2018/0329428 | A1 | 11/2018 | Nagy et al. | |
| 2018/0341274 | A1 | 11/2018 | Donnelly et al. | |
| 2018/0342157 | A1 | 11/2018 | Donnelly et al. | |
| 2019/0332123 | A1 | 10/2019 | Donnelly et al. | |
| 2020/0142428 | A1 | 5/2020 | Donnelly et al. | |
| 2020/0150682 | A1 | 5/2020 | Donnelly et al. | |
| 2020/0162489 | A1 | 5/2020 | Bar-nahum et al. | |
| 2020/0192355 | A1 | 6/2020 | Lu | |
| 2020/0342274 | A1 | 10/2020 | Elhattab et al. | |
| 2020/0342611 | A1 | 10/2020 | Elhattab et al. | |

OTHER PUBLICATIONS

"U.S. Appl. No. 16/734,947, Notice of Allowance dated Mar. 10, 2022", 5 pgs.

U.S. Appl. No. 15/662,314 U.S. Pat. No. 10,528,059, filed Jul. 28, 2017, Systems and Methods for Controlling Autonomous Vehicles That Provide a Vehicle Service to Users.

U.S. Appl. No. 16/734,945, filed Jan. 6, 2020, Systems and Methods for Controlling Autonomous Vehicles That Provide a Vehicle Service to Users.

U.S. Appl. No. 16/734,947, filed Jan. 6, 2020, Systems and Methods for Controlling Autonomous Vehicles That Provide a Vehicle Service to Users.

U.S. Appl. No. 15/662,327 U.S. Pat. No. 10,372,141, filed Jul. 28, 2017, Systems and Methods for Controlling Autonomous Vehicles That Provide a Vehicle Service to Users.

U.S. Appl. No. 16/504,034 U.S. Pat. No. 11,029,703, filed Jul. 5, 2019, Systems and Methods for Controlling Autonomous Vehicles That Provide a Vehicle Service to Users.

"U.S. Appl. No. 16/734,945, Non Final Office Action dated Oct. 22, 2021", 10 pgs.

"U.S. Appl. No. 16/734,947, Non Final Office Action dated Oct. 25, 2021", 9 pgs.

"U.S. Appl. No. 16/504,034, Preliminary Amendment filed Jul. 5, 2019", 8 pgs.

"U.S. Appl. No. 16/504,034, Notice of Allowance dated Feb. 2, 2021", 6 pgs.

"U.S. Appl. No. 16/734,945, Preliminary Amendment filed Feb. 18, 2020", 8 pgs.

"U.S. Appl. No. 16/734,947, Preliminary Amendment filed Feb. 18, 2020", 8 pgs.

"U.S. Appl. No. 15/662,327, Non Final Office Action dated Oct. 18, 2018", 12 pgs.

"U.S. Appl. No. 15/662,327, Response filed Jan. 16, 2019 to Non Final Office Action dated Oct. 18, 2018", 9 pgs.

"U.S. Appl. No. 15/662,327, Notice of Allowance dated Mar. 20, 2019", 6 pgs.

"U.S. Appl. No. 15/662,327, Notice of Allowance dated Apr. 25, 2019", 2 pgs.

"U.S. Appl. No. 15/662,327, Examiner Interview Summary dated Jan. 15, 2019", 3 pgs.

"U.S. Appl. No. 15/662,314, Non Final Office Action dated Jan. 8, 2019", 9 pgs.

"U.S. Appl. No. 15/662,314, Response filed Apr. 4, 2019 to Non Final Office Action dated Jan. 8, 2019", 10 pgs.

"U.S. Appl. No. 15/662,314, Final Office Action dated Apr. 22, 2019", 9 pgs.

"U.S. Appl. No. 15/662,314, Response filed Jun. 24, 2019 to Final Office Action dated Apr. 22, 2019", 17 pgs.

"U.S. Appl. No. 15/662,314, Advisory Action dated Jul. 5, 2019", 3 pgs.

"U.S. Appl. No. 15/662,314, Notice of Allowance dated Aug. 19, 2019", 6 pgs.

"U.S. Appl. No. 15/662,314, Notice of Allowance dated Oct. 21, 2019", 2 pgs.

* cited by examiner

SYSTEMS AND METHODS FOR CONTROLLING AUTONOMOUS VEHICLES THAT PROVIDE A VEHICLE SERVICE TO USERS

PRIORITY CLAIM

The present application is a continuation of U.S. application Ser. No. 16/504,034 having a filing date of Jul. 5, 2019, which is a continuation of U.S. application Ser. No. 15/662,327 having a filing date of Jul. 28, 2017, which is based on and claims priority to U.S. Provisional Application 62/510,515 having a filing date of May 24, 2017. Applicant claims priority to and the benefit of each of such applications and incorporates all such applications herein by reference in its entirety.

FIELD

The present disclosure relates generally to controlling the travel holding pattern of an autonomous vehicle that provides a vehicle service to a user.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of determining autonomous vehicle user boarding times. The method includes obtaining, by a computing system that includes one or more computing devices onboard an autonomous vehicle, location data associated with a user device associated with a user. The method includes determining, by the computing system, an estimated time until the user starts boarding the autonomous vehicle based at least in part on the location data associated with the user device. The method includes obtaining, by the computing system, data associated with the user. The method includes determining, by the computing system, an estimated time of boarding duration for the user based at least in part on the data associated with the user. The method includes determining, by the computing system, an estimated time until the user completes boarding of the autonomous vehicle based at least in part on the estimated time until the user starts boarding the autonomous vehicle and the estimated time of boarding duration for the user.

Another example aspect of the present disclosure is directed to a computing system for determining autonomous vehicle user boarding times. The computing system includes one or more processors and one or more memory devices. The one or more memory devices store instructions that when executed by the one or more processors cause the computing system to perform operations. The operations include obtaining location data associated with a user device associated with a user of an autonomous vehicle. The operations include obtaining data associated with the user of the autonomous vehicle. The operations include determining an estimated time until the user completes boarding of the autonomous vehicle based at least in part on the location data associated with the user device and the data associated with the user.

Yet another example aspect of the present disclosure is directed to an autonomous vehicle. The autonomous vehicle includes a communication system, one or more processors, and one or more memory device. The one or more memory devices store instructions that when executed by the one or more processors cause the autonomous vehicle to perform operations. The operations include obtaining, via the communication system, location data associated with a user device associated with a user. The operations include determining an estimated time until the user starts boarding the autonomous vehicle based at least in part on the location data associated with the user device. The operations include obtaining data associated with the user. The operations include determining an estimated time of boarding duration for the user based at least in part on the data associated with the user. The operations include determining an estimated time until the user completes boarding of the autonomous vehicle based at least in part on the estimated time until the user starts boarding the autonomous vehicle and the estimated time of boarding duration for the user.

Other example aspects of the present disclosure are directed to systems, methods, vehicles, apparatuses, tangible, non-transitory computer-readable media, and memory devices for controlling autonomous vehicles.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
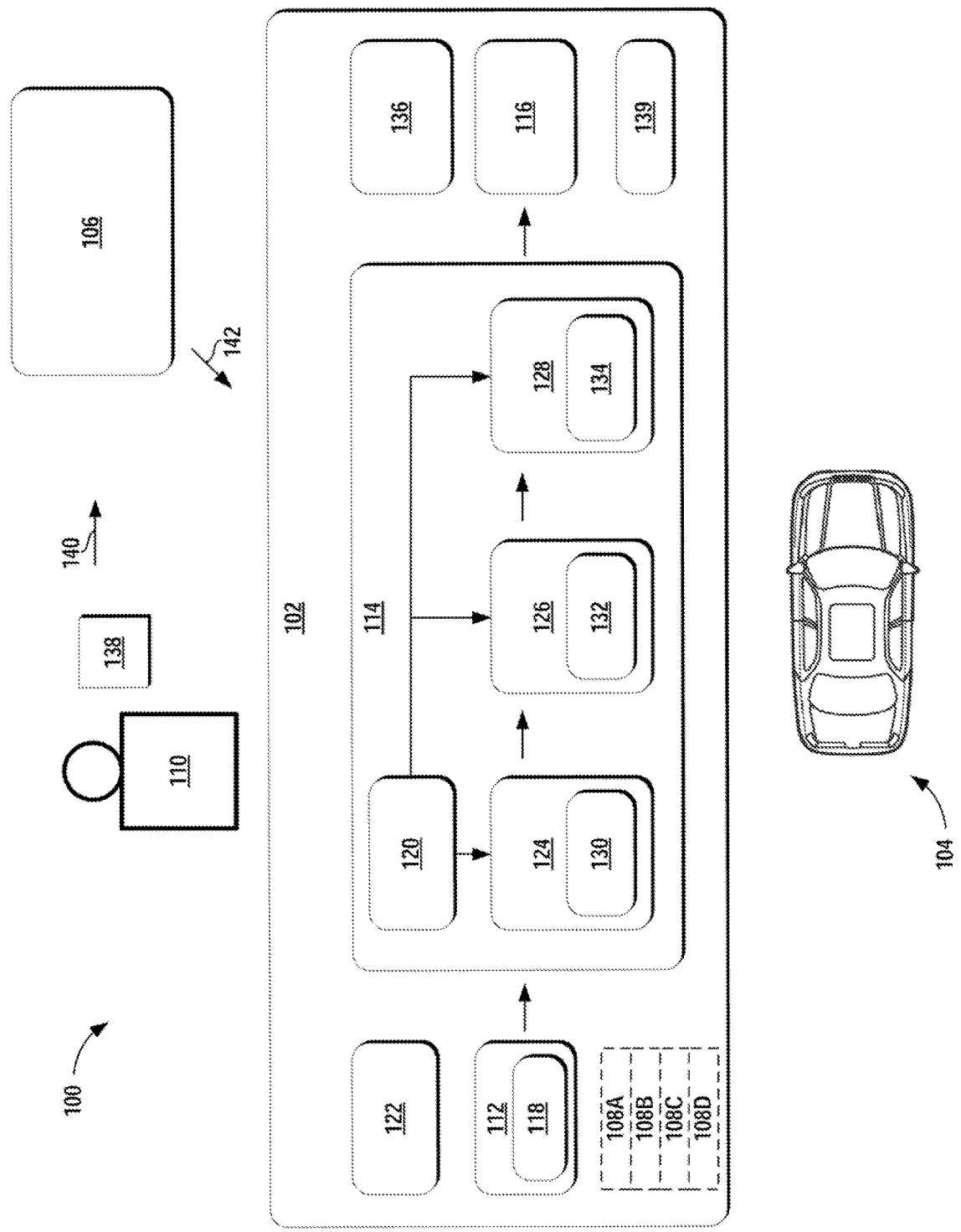
FIG. 1 depicts an example system overview according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to improving the travel patterns of an autonomous vehicle to account for potential traffic impacts, while waiting to provide a vehicle service to a user. For instance, an entity (e.g., service provider) can use a fleet of vehicles to provide a vehicle service (e.g., transportation service, delivery service, courier service, etc.) to a plurality of users. The fleet can include, for example, autonomous vehicles that can drive, navigate, operate, etc. with minimal and/or no interaction from a human driver. For example, an autonomous vehicle can receive data indicative of a location associated with a user that has requested a vehicle service, such as a transportation service. The autonomous vehicle can autonomously navigate along a route towards the location associated with the user. When within a vicinity of the location, the autonomous vehicle can attempt to identify a parking spot that is out of a travel way (e.g., out of a traffic lane). Such parking spots may not, however, be available to the autonomous vehicle. In such a case, the autonomous vehicle can determine whether the vehicle should stop in a travel lane to pick up the user and/or whether the vehicle should enter a holding pattern whereby the vehicle continues to travel (e.g., around the block) to return to the user's location. For example, as further described herein, the autonomous vehicle can estimate the impact the autonomous vehicle may have on traffic if the autonomous vehicle were to stop in a travel way to wait for the user, given, for example, the user's proximity to the vehicle. In the event that the impact would be low, the autonomous vehicle can stop in the travel way and alert the user of the vehicle's location. In the event that the impact would be high, or becomes high after the vehicle has stopped, the autonomous vehicle can be re-routed (e.g., around the block) so that the vehicle can again attempt to pick up the user. In this way, the system and methods of the present disclosure can improve the situational awareness of an autonomous vehicle that is waiting for a user of a vehicle service (e.g., while attempting to pick up a user for transport).

More particularly, an entity (e.g., service provider, owner, manager) can use one or more vehicles (e.g., ground-based vehicles) to provide a vehicle service such as a transportation service (e.g., rideshare service), a courier service, a delivery service, etc. The vehicle(s) can be autonomous vehicles that include various systems and devices configured to control the operation of the vehicle. For example, an autonomous vehicle can include an onboard vehicle computing system for operating the vehicle (e.g., located on or within the autonomous vehicle). The vehicle computing system can receive sensor data from sensor(s) onboard the vehicle (e.g., cameras, LIDAR, RADAR), attempt to comprehend the vehicle's surrounding environment by performing various processing techniques on the sensor data, and generate an appropriate motion plan through the vehicle's surrounding environment. Moreover, the autonomous vehicle can be configured to communicate with one or more computing devices that are remote from the vehicle. For example, the autonomous vehicle can communicate with an operations computing system that can be associated with the entity. The operations computing system can help the entity monitor, communicate with, manage, etc. the fleet of vehicles.

An autonomous vehicle can be configured to operate in a plurality of operating modes. For example, an autonomous vehicle can be configured to operate in a fully autonomous (e.g., self-driving) operating mode in which the autonomous vehicle can drive and navigate with no interaction from a human driver present in the vehicle. In some implementations, a human driver may not be present in the autonomous vehicle. The autonomous vehicle can also be configured to operate in an approach mode in which autonomous vehicle performs various functions as it approaches a location associated with a user, such as searching its surrounding environment for a parking location. The approach operating mode can be utilized, for example, when the autonomous vehicle is approaching a user that has requested a vehicle service, as further described herein.

A user can make a request for a vehicle service provided by the autonomous vehicle. For instance, a user can provide (e.g., via a user device) a request to the operations computing system of an entity (e.g., service provider, manager, owner) that is associated with the autonomous vehicle. The request can indicate the type of vehicle service that the user desires (e.g., a transportation service, a delivery service, a courier service, etc.), a location associated with the user (e.g., a current location of the user, a different location, etc.), an identifier (e.g., phone number, Bluetooth, WiFi, Cellular, other data that can be used to contact the user, etc.) associated with the user device that provided the request, and/or other information.

The operations computing system can process the request and select an autonomous vehicle to provide the requested vehicle service to the user. The operations computing system can provide, to the autonomous vehicle, data indicative of a location to which the autonomous vehicle is to travel. The location can be associated with the user that requested the vehicle service. For example, the location can be the current location of the user and/or a different location, such as for example a location at which the user would like to be picked up by the autonomous vehicle, provide an item to the autonomous vehicle, retrieve an item from the autonomous vehicle, etc. The location can be expressed as a coordinate (e.g., GPS coordinate, latitude-longitude coordinate pair), an address, a place name, and/or other geographic reference that can be used to identify the location. The location associated with the user can be represented, for example, as a pin on a map user interface.

The autonomous vehicle can obtain, from the operations computing system, the data indicative of the location associated with the user. The autonomous vehicle can also obtain a first vehicle route that leads to the location associated with the user. The first vehicle route can be, for example, a route from the current location of the vehicle to the location associated with the user. In some implementations, the operations computing system can provide the first vehicle route to the autonomous vehicle. Additionally, or alternatively, the onboard vehicle computing system of the autonomous vehicle can determine the first vehicle route.

The autonomous vehicle can travel in accordance with the first vehicle route to arrive within a vicinity of the location associated with the user. The vicinity can be defined by a distance (e.g., a radial distance) from the location associated with the user. The distance can be indicative of an acceptable walking distance from the location associated with the user. For example, an acceptable walking distance can be distance that a user would be willing walk to arrive at a vehicle. The acceptable walking distance can be determined based on a variety of information. Such information can include, for example, specific user preferences stored in a profile associated with the user, weather information (e.g., gathered via sensors onboard the vehicle, provided by a third party source, etc.), traffic conditions (e.g., current, historic, future predicted traffic conditions), historic vehicle services data (e.g., historic pickup data for previous transportation services), and/or other types of information. The autonomous vehicle can provide a communication to the user indicating that the autonomous vehicle is within the vicinity of the location associated with the user. For instance, such a communication can be in the form of a textual message stating "your ride is arriving please prepare to board".

Once the autonomous vehicle is within the vicinity of the location associated with the user, the autonomous vehicle can begin to search for a parking location. For example, the autonomous vehicle can enter into the approach operating mode when the vehicle is within the vicinity of the location associated with the user. While it is within the vicinity, the autonomous vehicle can search for a parking location before it reaches the location associated with the user (e.g., before the GPS pin coordinate on a map) and/or after it passes the location associated with the user, but is still within the vicinity of the user (e.g., within acceptable walking distance for the user).

To identify a parking spot, the autonomous vehicle can obtain sensor data associated with one or more objects that are proximate to the vehicle (e.g., within a field of view of one or more of the vehicle's onboard sensor(s)). The sensor data can include image data, radar data, LIDAR data, and/or other data acquired by the vehicle's sensor(s). The object(s) can include, for example, pedestrians, vehicles, bicycles, and/or other objects. The sensor data can be indicative of locations associated with the object(s) within the surrounding environment of the vehicle at one or more times. The autonomous vehicle can process the sensor data to determine if there are any available parking locations that are not currently occupied by the objects (e.g., other vehicles) within the vehicle's surrounding environment. In some implementations, the autonomous vehicle can utilize map data to determine if there are any designated parking locations (e.g., parking lots, pullover lanes, etc.) within the vicinity of the location associated with the user.

In the event the autonomous vehicle is able to identify a parking location that is out of a travel way and within the vicinity of the location associated with the user (e.g., out of a traffic lane), the autonomous vehicle can position itself into that parking location accordingly. The autonomous vehicle can send a communication to a user device associated with the user. The communication can indicate that the vehicle has arrived as well as the location of the autonomous vehicle. In some implementations, the user device can display a map user interface that includes a user route. The user route can be a route along which a user can travel to arrive at the autonomous vehicle. In the event that the autonomous vehicle is unable to identify a parking location that is out of the travel way (and within the vicinity of the user), the autonomous vehicle can decide whether or not to stop at least partially in a travel way to wait for the user.

To help decide whether to stop within a travel way, the autonomous vehicle can obtain traffic data associated with a geographic area that includes the location associated with the user. The traffic data can include various types of data such as historic traffic data, predicted traffic data, and/or current traffic data associated with the geographic area (e.g., within the vicinity of the location of the user, a wider area, etc.). The traffic data can be obtained from a variety of sources such as other autonomous vehicles (e.g., within the vehicle fleet), the operations computing system, third party sources (e.g., regional traffic management entities, etc.), as well as the autonomous vehicle itself.

By way of example, the autonomous vehicle can obtain the current traffic data associated with the geographic area that includes the location associated with the user. To do so, the autonomous vehicle can obtain sensor data (e.g., via its onboard sensors) associated with the surrounding environment of the autonomous vehicle that is within the vicinity of the location associated with the user, as described herein. The sensor data can be indicative of one or more objects within the surrounding environment of the autonomous vehicle. The autonomous vehicle can process the sensor data to classify which of the object(s) would be impacted (e.g., caused to stop) by the autonomous vehicle stopping in a travel way. For example, the autonomous vehicle can classify the vehicles that are behind the autonomous vehicle (in the same travel lane) as objects that would be impacted in the event the autonomous vehicle were to stop at least partially in the travel way. The autonomous vehicle can also identify object(s) that would not be affected by the vehicle stopping in the travel way. For example, the autonomous vehicle can determine that object(s) that have a path to travel around the autonomous vehicle (e.g., bicycles, vehicles in adjacent lanes, vehicles with clear paths to change lanes, etc.), may not be impacted and/or may be impacted to an insignificant degree. After such classification, the autonomous vehicle can determine a level of traffic associated with the geographic area (e.g., within the vicinity of the user's location) based at least in part on the sensor data. For example, the level of traffic can be based at least in part on the number of object(s) within the surrounding environment of the autonomous vehicle that would be impacted by the autonomous vehicle stopping at least partially in the travel way, while filtering out those object(s) that would not be impacted. Similar such information could be acquired via one or more other vehicles in the associated vehicle fleet.

The autonomous vehicle can determine an estimated traffic impact of the autonomous vehicle on the geographic area based at least in part on the traffic data. The estimated traffic impact can be indicative of an estimated impact of the autonomous vehicle on one or more objects within a surrounding environment of the autonomous vehicle in the event that the autonomous vehicle were to stop at least partially in the travel way (e.g., in the vicinity of the location associated with the user). For example, in some implementations, the autonomous vehicle can compare the level of traffic (e.g., based on the sensor data) to a traffic constraint to determine whether the estimated traffic impact would be high or low. The traffic constraint can be implemented in a variety of forms. For example, the traffic constraint can include a traffic threshold that is indicative of an acceptable level of traffic (e.g., an acceptable number of objects) that would be impacted by the autonomous vehicle stopping at least partially in the travel way. A traffic level that exceeds the traffic threshold would be considered a high impact on traffic. In some implementations, the traffic constraint can be implemented as cost data (e.g., one or more cost function(s)). For example, the autonomous vehicle's onboard vehicle computing system can include cost data that reflects the cost(s) of stopping vehicle motion, the cost(s) of causing traffic build-up, the cost(s) of illegally stopping in a travel way, etc.

The traffic constraint can be based on a variety of information. In some implementations, the traffic constraint can be based at least in part on historic traffic data that indicates the level of traffic previously occurring in that geographic area. For example, if the geographic area normally experiences a high level of traffic build-up, a corresponding traffic threshold can be higher (and/or the cost of stopping can be lower). Additionally, or alternatively, the traffic constraint can be based at least in part on real-time traffic data (e.g., from other vehicles in the fleet, from the autonomous vehicle, other sources). For example, in the event that there is already a traffic jam in the vicinity of the location of the user, the traffic threshold could be higher (and/or the cost of stopping could be lower). In some implementations, the traffic constraint can be based at least in part on the typical travel expectations of individuals in the geographic area. For example, individuals that are located in City A may be more patient when waiting in traffic than those in City B. Thus, a traffic threshold may be higher in City A than in City B (and/or the cost of stopping may be lower in City A than in City B). In some implementations, the traffic constraint can be based at least in part on map data. For example, in the event that the autonomous vehicle is traveling on a wide travel way in which impacted vehicles could eventually travel around the autonomous vehicle, the traffic threshold could be higher (and/or the cost of stopping could be lower).

In some implementations, the traffic constraint can be determined at least in part from a model, such as a machine-learned model. For example, the machine-learned model can be or can otherwise include one or more various model(s) such as, for example, models using boosted random forest techniques, neural networks (e.g., deep neural networks), or other multi-layer non-linear models. Neural networks can include recurrent neural networks (e.g., long short-term memory recurrent neural networks), feed-forward neural networks, and/or other forms of neural networks. For instance, supervised training techniques can be performed to train the model (e.g., using previous driving logs) to determine a traffic constraint based at least in part on input data. The input data can include, for example, traffic data as described herein, map data, data from a traffic management entity, driving characteristics of individuals in an associated geographic area, complaints received from operators of vehicles that were caused to stop by autonomous vehicles, etc. The machine-learned model can provide, as an output, data indicative of a recommended traffic constraint. In some implementations, the recommended traffic constraint can be specific to the geographic area.

The autonomous vehicle can also, or alternatively, determine an estimated time of user arrival in order to help determine whether or not to stop at least partially in the travel way. For instance, the autonomous vehicle can obtain location data associated with a user device associated with a user. The location data can be indicative of the position of the user device associated with the user. The autonomous vehicle can use one or more identifier(s) of the user device (e.g., provided by the operations computing system) to scan for and/or communicate with the user device when the vehicle is within the vicinity of the user. For example, the autonomous vehicle can utilize multiple input/multiple output communication, Bluetooth low energy protocol, RF signaling, and/or other communication technologies to obtain the location data. The autonomous vehicle can determine the estimated time of user arrival based at least in part on the location data associated with the user device. The estimated time of user arrival can be indicative of, for example, a time at which the user is estimated to complete boarding of the autonomous vehicle (e.g., for a transportation service). The estimated time of user arrival can be expressed as a time duration (e.g., user estimated to arrive in 1 minute) and/or a point in time (e.g., user estimated to arrive at 10:31 am (PT)). In this way, the autonomous vehicle can determine an amount of stopping time that the object(s) within its surroundings would be impacted as the autonomous vehicle waits for the user's arrival (e.g., how long other vehicles would be caused to stop while waiting for the user).

By way of example, the operations computing system can provide the autonomous vehicle with one or more identifier(s) of a user device associated with the user. The autonomous vehicle can use the identifier(s) (e.g., Bluetooth, WiFi, Cellular, other identifier) to determine the location of the user. For example, when the autonomous vehicle is within a vicinity of the location associated with the user, the autonomous vehicle can scan for the user device based at least in part on the identifier(s). Once the user device is found, the autonomous vehicle can track changes in the signal strength (e.g., radio signal strength identifier) to determine the approximate heading of the user as well as the approximate distance between the user and autonomous vehicle (e.g., without authenticated connection). In some implementations, the autonomous vehicle can determine differences in Bluetooth Low Energy beacon radio signal strength identifiers over time and/or inertial measurement unit changes, which can indicate distance and direction of the autonomous vehicle from the user device (e.g., mobile phone associated with the user). The autonomous vehicle can calculate the estimated time of user arrival based at least on the heading of the user and the approximate distance between the user and the vehicle (and/or the estimated velocity of the user), as further described herein. In some implementations, the autonomous vehicle can obtain the location data using multiple input, multiple output communication between the autonomous vehicle and a user device associated with the user. This can allow the autonomous vehicle to take advantage of the multiple antennas included in the vehicle's communication system as well as those of the user device to increase accuracy of the location data associated with the user. In some implementations, the estimated time to user arrival can be based at least in part on historic data. Such historic data can include, for example, previous correlations between changes in the signal strength of an identifier and the user's time to arriving at a vehicle.

Additionally, or alternatively, the autonomous vehicle, systems, and methods described herein can utilize other communication methods. Such communication methods can include, for example, autonomous vehicle based triangulation (e.g., on vehicle triangulated RF), on-vehicle multi-range beacon (e.g., Bluetooth Low Energy) hardware (e.g., paired with a software application on a user device), application triangulation, user device to vehicle handshake (e.g., light signal handshake), autonomous vehicle perception of the user (e.g., via processing of sensor data to perceive the user and the user's location, distance, heading, velocity, and/or other state data associated therewith), GPS location of the user device, device specific techniques (e.g., associated with a specific device/model type), the autonomous vehicle serving as a localized base station (e.g., GPS, WiFi, etc.) for the user device, autonomous vehicle localization and user device image based localization via one or more network(s), and/or other techniques.

In some implementations, in order to determine whether the amount of stopping time is acceptable, the autonomous vehicle can compare the estimated time of user arrival to a time constraint. The time constraint can be expressed as a time threshold (e.g., indicating an acceptable amount of stopping time) and/or cost data (e.g., cost functions expressing a cost in relation to stopping time). Similar to the traffic constraint, the time constraint can be based on historic data (e.g., indicating historic wait times), real-time data (e.g., indicating that the vehicles are already waiting due to another traffic build-up in front of the autonomous vehicle), expectations of individuals in the geographic area, machine-learned model(s), and/or other information.

In some implementations, the estimated time of user arrival can also factor in additional amounts of time that can impact the object(s) within the surrounding environment of the autonomous vehicle while the autonomous vehicle is stopped, awaiting the user. Example instances requiring such additional amounts of time can be associated with a user getting into the vehicle and securely fastening his/her seat-belt, a user helping other passengers enter and become securely positioned within the vehicle (e.g., children or others requiring assistance), a user loading luggage or other items for transportation within the vehicle, a user receiving delivered item(s) from/placing item(s) within the vehicle, etc. In some implementations, the additional amounts of time can be determined based at least in part on information provided with a service request (e.g., type of service, destination, number of passengers, child's car seat requested, etc.).

The autonomous vehicle can determine one or more vehicle actions based at least in part on the estimated traffic impact and/or the estimated time of user arrival. In some implementations, vehicle action(s) can include stopping within the vicinity of the location associated with the user (e.g., at least partially in the travel way). For example, in the event that the level of traffic (e.g., the number of other vehicles that would be impacted by an in-lane stop) is below a traffic threshold, the autonomous vehicle can determine that the vehicle can stop within the travel way to wait for the user to arrive at the vehicle. In another example, in the event that the estimated time of user arrival is below the time threshold, the autonomous vehicle can determine that the vehicle can stop at least partially within the travel way.

In some implementations, the autonomous vehicle can base its determination to stop at least partially within the travel way on both the estimated traffic impact and the estimated time of user arrival. For instance, the autonomous vehicle can weigh each of these estimates to determine whether it would be appropriate for the vehicle to stop at least partially in the travel way to wait for the user. The autonomous vehicle can apply a first weighting factor to the estimated traffic impact and a second weighting factor to the estimated time of user arrival. The first weighting factor can be different than the second weighting factor. By way of example, the estimated impact on traffic may be high while the estimated time of user arrival may be short. Accordingly, the autonomous vehicle may determine that it can stop within the travel way because although a higher number of objects (e.g., other vehicles) may be caused to stop, it would only be for a short period of time because the user is close in distance to the autonomous vehicle. In such a case, the estimated time of user arrival can be given a greater weight than the estimated traffic impact. In another example, the estimated impact on traffic may be low while the estimated time of user arrival may be long. Accordingly, the autonomous vehicle may determine that it should not stop within the travel way because although only a few objects (e.g., other vehicles) may be caused to stop, it would be for a greater period of time because the user is farther from the autonomous vehicle. In such a case, the estimated traffic impact can be given a greater weight than the estimated time of user arrival.

The vehicle action(s) can also, or alternatively, include the autonomous vehicle entering into a holding pattern. In such a case, the vehicle action(s) can include traveling along a second vehicle route (e.g., an optimal holding pattern route). For example, the autonomous vehicle may be unable to find a parking location before and/or after the location associated with the user (e.g., before and/or after a pin location of the user). Additionally, the autonomous vehicle may determine that it should not stop within a travel way to wait for the user's arrival, as described herein. Thus, the autonomous vehicle can be re-routed along a second vehicle route that is at least partially different than the first vehicle route. The second vehicle route can be a path along which the autonomous vehicle can travel to re-arrive within the vicinity of the location of the user. For example, the second vehicle route can be a path along which the autonomous vehicle can travel around a block, back to the location associated with the user. This can afford the user additional time to arrive at the vehicle, without the autonomous vehicle impacting traffic (e.g., due to a stop).

In some implementations, the autonomous vehicle can determine that it can stop within the travel way, but later determine that it must begin to travel again (e.g., according to a holding pattern route). For example, the autonomous vehicle can determine that it would be appropriate to stop at least partially within the travel way to wait for the user based at least in part on the estimated traffic impact and/or the estimated time of user arrival. While the autonomous vehicle is stopped, the traffic impact may increase (e.g., due to an increase in the number of other vehicle(s) stopped behind the autonomous vehicle) and/or the user may take longer than estimated to arrive at the autonomous vehicle. As such, the autonomous vehicle can determine an updated estimated traffic impact (e.g., based on the number of vehicles that have already stopped and/or additional vehicles that may be caused to stop) and/or an updated estimated time of user arrival (e.g., based on a change in the user device location data, if any). The autonomous vehicle can then determine that it can no longer remain stopped to wait for the user based at least in part on the updated estimates. As such, the autonomous vehicle can begin to travel again, for example, along the second vehicle route (e.g., around the block).

The vehicle computing system of the autonomous vehicle can implement the determined vehicle action(s). For example, in the event that the autonomous vehicle has determined to stop in the travel way, the vehicle computing system can cause the autonomous vehicle to stop by sending one or more control signals to the braking control system(s) of the autonomous vehicle. In the event that the autonomous vehicle has determined to travel along a second vehicle route (e.g., in accordance with the holding pattern), the vehicle computing system can obtain data associated with the second vehicle route and implement the route accordingly. For example, the vehicle computing system can request and obtain data indicative of the second vehicle route from the operations computing system. Additionally, or alternatively, the vehicle computing system can determine the second vehicle route onboard the vehicle. In either case, the vehicle computing system can send one or more control signals to cause a motion planning system of the autonomous vehicle to plan the motion of the vehicle in accordance with the second vehicle route (e.g., to implement a vehicle trajectory in accordance with the second vehicle action).

The autonomous vehicle can provide the user with one or more communications indicating the actions taken by the autonomous vehicle. For example, in the event that the autonomous vehicle stops within the travel way, the autonomous vehicle can provide a communication to the user indicating that the vehicle is waiting for the user (e.g., "your vehicle has arrived, please proceed quickly to the vehicle"). In response to receiving such a communication, a user device associated with the user can display a map user interface indicating the vehicle location of the autonomous vehicle and a user route to the vehicle's location. In the event that the autonomous vehicle does not find a parking spot and does not stop in the travel way, the autonomous vehicle can provide a communication to the user indicating as such (e.g., "I could not locate you at the pin drop, traffic forced me to go around the block. Please proceed to the pin drop").

In some implementations, the autonomous vehicle may be relieved of its responsibility to provide a vehicle service to the user. For instance, in the event that a vehicle computing system and/or operations computing system determines that an autonomous vehicle should travel along the second vehicle route, such computing system(s) can determine whether it would be advantageous (e.g., more time efficient, more fuel efficient, etc.) for another autonomous vehicle in the area to be routed to the user. In the event that it would be advantageous, the computing system(s) can provide data to the autonomous vehicle indicating that the autonomous vehicle is no longer responsible for the service request. Additionally, or alternatively, the computing system(s) can re-route the autonomous vehicle to provide a vehicle service to another user.

In some implementations, the autonomous vehicle can cancel the service request of the user. By way of example, the autonomous vehicle may be caused to re-route (e.g., circle the block) a certain number of times and/or the user may not arrive at the autonomous vehicle within a certain timeframe (e.g., above a trip cancellation threshold). In response, the autonomous vehicle can send data to the operations computing system requesting the cancellation of the user's service request. The operations computing system can cancel the service request (and inform the user accordingly) and/or re-route the autonomous vehicle to provide a vehicle service to another user. In some implementations, the autonomous vehicle can communicate directly with a user device associated with the user to cancel the service request and inform the user accordingly. The autonomous vehicle can report such a cancellation to the operations computing system.

The systems and methods described herein may provide a number of technical effects and benefits. For instance, the systems and methods enable an autonomous vehicle to determine a holding pattern, for waiting for a user, onboard the autonomous vehicle. As such, the autonomous vehicle need not communicate with a remote computing system (e.g., operations computing system) each time the vehicle must decide whether to stop in a travel way or re-route the vehicle (e.g., around the block). This can help improve the response time of the vehicle computing system when deciding and/or implementing such a holding pattern. Moreover, by enabling the vehicle computing system to determine whether to stop and/or to re-route onboard the vehicle, the systems and methods described herein can save computational resources of the operations computing system (that would otherwise be required for such determination). Accordingly, the computational resources of the operations computing system can be allocated to other core functions such as the management of service requests, routing of autonomous vehicles, etc.

The systems and methods of the present disclosure also provide an improvement to vehicle computing technology, such as autonomous vehicle computing technology. For instance, the computer-implemented methods and systems improve the situational awareness of the autonomous vehicle to provide a vehicle service to a user. The systems and methods can enable a computing system to obtain data indicative of a location associated with a user to which an autonomous vehicle is to travel. The autonomous vehicle can travel along a first vehicle route that leads to the location associated with the user. The computing system can obtain traffic data associated with a geographic area that includes the location associated with the user and location data associated with a user device associated with the user. The computing system can determine an estimated traffic impact of the autonomous vehicle on the geographic area based at least in part on the traffic data and/or an estimated time of user arrival based at least in part on the location data associated with the user device. The computing system can determine one or more vehicle actions based at least in part on the estimated traffic impact and/or the estimated time of user arrival. The computing system can cause the autonomous vehicle to perform the one or more vehicle actions. As described herein, the vehicle action(s) can include at least one of stopping the autonomous vehicle at least partially in a travel way within a vicinity of the location associated with the user or travelling along a second vehicle route. In this way, the vehicle computing system can improve the holding pattern of the autonomous vehicle that is waiting for a user. For example, the holding pattern can be customized based on the estimated impact on the traffic surrounding the autonomous vehicle and/or the estimated time it will take for the specific user to arrive at the vehicle. As such, the systems and methods can improve the vehicle computing system's situational awareness by allowing it to take into account (e.g., in real-time) such circumstances when making a determination as to how to best provide vehicle services. Such approach can also increase the efficiency of implementing a holding pattern (e.g., by avoiding the aforementioned latency issues) while providing an additional benefit of minimizing the autonomous vehicle's impact on traffic.

Additionally, the systems and methods of the present disclosure can enhance the user experience associated with the autonomous vehicle. For instance, the systems and methods described herein provide a systematic approach that enables users to engage autonomous vehicles and receive effectively communicated information regarding expected autonomous locations including, for example, arrival times, use of holding patterns when needed, etc. By way of example, the communications and user interfaces described herein provide the user with updated information regarding the autonomous vehicle's actions and locations, thereby increasing the user's knowledge and understanding of the autonomous vehicle's intentions. In addition to these advantages, the user experience is further enhanced in that the described systems and methods can decrease the likelihood that a user will be subjected to potential frustration from other drivers or pedestrians in the surrounding environment that could be impacted while the user is arriving to and/or boarding the autonomous vehicle.

With reference now to the FIGS, example embodiments of the present disclosure will be discussed in further detail. FIG. 1 depicts an example system 100 according to example embodiments of the present disclosure. The system 100 can include a vehicle computing system 102 associated with a vehicle 104 and an operations computing system 106 that is remote from the vehicle 104.

The vehicle 104 incorporating the vehicle computing system 102 can be a ground-based autonomous vehicle (e.g., car, truck, bus, etc.), an air-based autonomous vehicle (e.g., airplane, drone, helicopter, or other aircraft), or other types of vehicles (e.g., watercraft, etc.). The vehicle 104 can be an autonomous vehicle that can drive, navigate, operate, etc. with minimal and/or no interaction from a human driver. A human operator can be omitted from the vehicle 104 (and/or also omitted from remote control of the vehicle 104).

The vehicle 104 can be configured to operate in a plurality of operating modes 108A-D. The vehicle 104 can be configured to operate in a fully autonomous (e.g., self-driving) operating mode 108A in which the vehicle 104 can drive and navigate with no input from a user present in the vehicle 104. The vehicle 104 can be configured to operate in a semi-autonomous operating mode 108B in which the vehicle 104 can operate with some input from a user present in the vehicle 104. The vehicle 104 can enter into a manual operating mode 108C in which the vehicle 104 is fully controllable by a user (e.g., human driver) and can be prohibited from performing autonomous navigation (e.g., autonomous driving). In some implementations, the vehicle 104 can implement vehicle operating assistance technology (e.g., collision mitigation system, power assist steering, etc.) while in the manual operating mode 108C to help assist the operator of the vehicle 104.

The vehicle 104 can also be configured to operate in an approach mode 108D in which vehicle 104 performs various functions as it approaches a location associated with a user. For example, the vehicle 104 can enter into the approach mode 108D when the vehicle is within a vicinity of a user to which the vehicle 104 is to provide a vehicle service, as further described herein. While in the approach mode 108D, the vehicle 104 can search its surrounding environment for a parking location as well as communicate with a user (e.g., via a user device associated with the user). Additionally, or alternatively, the vehicle 104 can be configured to evaluate its estimated impact on traffic and/or an estimated time of user arrival, as further described herein, when the vehicle 104 is in the approach mode 108D.

The operating mode of the vehicle 104 can be adjusted in a variety of manners. In some implementations, the operating mode of the vehicle 104 can be selected remotely, off-board the vehicle 104. For example, an entity associated with the vehicle 104 (e.g., a service provider) can utilize the operations computing system 106 to manage the vehicle 104 (and/or an associated fleet). The operations computing system 106 can send one or more control signals to the vehicle 104 instructing the vehicle 104 to enter into, exit from, maintain, etc. an operating mode. By way of example, the operations computing system 106 can send one or more control signals to the vehicle 104 instructing the vehicle 104 to enter into the fully autonomous operating mode 108A. In some implementations, the operating mode of the vehicle 104 can be set onboard and/or near the vehicle 104. For example, the vehicle computing system 102 can automatically determine when and where the vehicle 104 is to enter, change, maintain, etc. a particular operating mode (e.g., without user input). Additionally, or alternatively, the operating mode of the vehicle 104 can be manually selected via one or more interfaces located onboard the vehicle 104 (e.g., key switch, button, etc.) and/or associated with a computing device proximate to the vehicle 104 (e.g., a tablet operated by authorized personnel located near the vehicle 104). In some implementations, the operating mode of the vehicle 104 can be adjusted based at least in part on a sequence of interfaces located on the vehicle 104. For example, the operating mode may be adjusted by manipulating a series of interfaces in a particular order to cause the vehicle 104 to enter into a particular operating mode.

The vehicle computing system 102 can include one or more computing devices located onboard the vehicle 104. For example, the computing device(s) can be located on and/or within the vehicle 104. The computing device(s) can include various components for performing various operations and functions. For instance, the computing device(s) can include one or more processor(s) and one or more tangible, non-transitory, computer readable media (e.g., memory devices). The one or more tangible, non-transitory, computer readable media can store instructions that when executed by the one or more processor(s) cause the vehicle 104 (e.g., its computing system, one or more processors, etc.) to perform operations and functions, such as those described herein for controlling an autonomous vehicle.

As shown in FIG. 1, the vehicle 104 can include one or more sensors 112, an autonomy computing system 114, and one or more vehicle control systems 116. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel.

The sensor(s) 112 can be configured to acquire sensor data 118 associated with one or more objects that are proximate to the vehicle 104 (e.g., within a field of view of one or more of the sensor(s) 112). The sensor(s) 112 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data 118 can include image data, radar data, LIDAR data, and/or other data acquired by the sensor(s) 112. The object(s) can include, for example, pedestrians, vehicles, bicycles, and/or other objects. The object(s) can be located in front of, to the rear of, and/or to the side of the vehicle 104. The sensor data 118 can be indicative of locations associated with the object(s) within the surrounding environment of the vehicle 104 at one or more times. The sensor(s) 112 can provide the sensor data 118 to the autonomy computing system 114.

In addition to the sensor data 118, the autonomy computing system 114 can retrieve or otherwise obtain map data 120. The map data 120 can provide detailed information about the surrounding environment of the vehicle 104. For example, the map data 120 can provide information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle 104 in comprehending and perceiving its surrounding environment and its relationship thereto.

The vehicle 104 can include a positioning system 122. The positioning system 122 can determine a current position of the vehicle 104. The positioning system 122 can be any device or circuitry for analyzing the position of the vehicle 104. For example, the positioning system 122 can determine position by using one or more of inertial sensors, a satellite positioning system, based on IP/MAC address, by using triangulation and/or proximity to network access points or other network components (e.g., cellular towers, WiFi access points, etc.) and/or other suitable techniques. The position of the vehicle 104 can be used by various systems of the vehicle computing system 102 and/or provided to one or more remote computing device(s) (e.g., of the operations computing system 106). For example, the map data 120 can provide the vehicle 104 relative positions of the surrounding environment of the vehicle 104. The vehicle 104 can identify its position within the surrounding environment (e.g., across six axes) based at least in part on the data described herein. For example, the vehicle 104 can process the sensor data 118 (e.g., LIDAR data, camera data) to match it to a map of the surrounding environment to get an understanding of the vehicle's position within that environment.

The autonomy computing system 114 can include a perception system 124, a prediction system 126, a motion planning system 128, and/or other systems that cooperate to perceive the surrounding environment of the vehicle 104 and determine a motion plan for controlling the motion of the vehicle 104 accordingly. For example, the autonomy computing system 114 can receive the sensor data 118 from the sensor(s) 112, attempt to comprehend the surrounding environment by performing various processing techniques on the sensor data 118 (and/or other data), and generate an appropriate motion plan through such surrounding environment. The autonomy computing system 114 can control the one or more vehicle control systems 116 to operate the vehicle 104 according to the motion plan.

The autonomy computing system 114 can identify one or more objects that are proximate to the vehicle 104 based at least in part on the sensor data 118 and/or the map data 120. For example, the perception system 124 can obtain state data 130 descriptive of a current state of an object that is proximate to the vehicle 104. The state data 130 for each object can describe, for example, an estimate of the object's: current location (also referred to as position); current speed (also referred to as velocity); current acceleration; current heading; current orientation; size/footprint (e.g., as represented by a bounding shape); class (e.g., pedestrian class vs. vehicle class vs. bicycle class), and/or other state information. The perception system 124 can provide the state data 130 to the prediction system 126 (e.g., for predicting the movement of an object).

The prediction system 126 can create predicted data 132 associated with each of the respective one or more objects proximate to the vehicle 104. The predicted data 132 can be indicative of one or more predicted future locations of each respective object. The predicted data 132 can be indicative of a predicted path (e.g., predicted trajectory) of at least one object within the surrounding environment of the vehicle 104. For example, the predicted path (e.g., trajectory) can indicate a path along which the respective object is predicted to travel over time (and/or the speed at which the object is predicted to travel along the predicted path). The prediction system 126 can provide the predicted data 132 associated with the object(s) to the motion planning system 128.

The motion planning system 128 can determine a motion plan 134 for the vehicle 104 based at least in part on the predicted data 132 (and/or other data). The motion plan 134 can include vehicle actions with respect to the objects proximate to the vehicle 104 as well as the predicted movements. For instance, the motion planning system 128 can implement an optimization algorithm that considers cost data associated with a vehicle action as well as other objective functions (e.g., cost functions based on speed limits, traffic lights, etc.), if any, to determine optimized variables that make up the motion plan 134. By way of example, the motion planning system 128 can determine that the vehicle 104 can perform a certain action (e.g., pass an object) without increasing the potential risk to the vehicle 104 and/or violating any traffic laws (e.g., speed limits, lane boundaries, signage). The motion plan 134 can include a planned trajectory, speed, acceleration, other actions, etc. of the vehicle 104.

The motion planning system 128 can provide the motion plan 134 with data indicative of the vehicle actions, a planned trajectory, and/or other operating parameters to the vehicle control system(s) 116 to implement the motion plan 134 for the vehicle 104. For instance, the vehicle 104 can include a mobility controller configured to translate the motion plan 134 into instructions. By way of example, the mobility controller can translate a determined motion plan 134 into instructions to adjust the steering of the vehicle 104 "X" degrees, apply a certain magnitude of braking force, etc. The mobility controller can send one or more control signals to the responsible vehicle control component (e.g., braking control system, steering control system, acceleration control system) to execute the instructions and implement the motion plan 134.

The vehicle 104 can include a communications system 136 configured to allow the vehicle computing system 102 (and its computing device(s)) to communicate with other computing devices. The vehicle computing system 102 can use the communications system 136 to communicate with the operations computing system 106 and/or one or more other remote computing device(s) over one or more networks (e.g., via one or more wireless signal connections). In some implementations, the communications system 136 can allow communication among one or more of the system(s) on-board the vehicle 104. The communications system 136 can also be configured to enable the autonomous vehicle to communication and/or otherwise receive data from a user device 138 associated with a user 110. The communications system 136 can utilize various communication technologies such as, for example, Bluetooth low energy protocol, radio frequency signaling, etc. In some implementations, the communications systems 136 can enable the vehicle 104 to function as a WiFi base station for a user device 138 and/or implement localization techniques. The communications system 136 can include any suitable components for interfacing with one or more network(s), including, for example, transmitters, receivers, ports, controllers, antennas, and/or other suitable components that can help facilitate communication.

The vehicle 104 can include one or more human-machine interfaces 139. For example, the vehicle 104 can include one or more display devices located onboard the vehicle 104. A display device (e.g., screen of a tablet, laptop, etc.) can be viewable by a user of the vehicle 104 that is located in the front of the vehicle 104 (e.g., driver's seat, front passenger seat). Additionally, or alternatively, a display device can be viewable by a user of the vehicle 104 that is located in the rear of the vehicle 104 (e.g., back passenger seat(s)).

In some implementations, the vehicle 104 can be associated with an entity (e.g., a service provider, owner, manager). The entity can be one that provides one or more vehicle service(s) to a plurality of users via a fleet of vehicles that includes, for example, the vehicle 104. In some implementations, the entity can be associated with only vehicle 104 (e.g., a sole owner, manager). In some implementations, the operations computing system 106 can be associated with the entity. The vehicle 104 can be configured to provide one or more vehicle services to one or more users. The vehicle service(s) can include transportation services (e.g., rideshare services in which the user rides in the vehicle 104 to be transported), courier services, delivery services, and/or other types of services. The vehicle service(s) can be offered to users by the entity, for example, via a software application (e.g., a mobile phone software application). The entity can utilize the operations computing system 106 to coordinate and/or manage the vehicle 104 (and its associated fleet, if any) to provide the vehicle services to a user 110.

The operations computing system 106 can include one or more computing devices that are remote from the vehicle 104 (e.g., located off-board the vehicle 104). For example, such computing device(s) can be components of a cloud-based server system and/or other type of computing system that can communicate with the vehicle computing system 102 of the vehicle 104. The computing device(s) of the operations computing system 106 can include various components for performing various operations and functions. For instance, the computing device(s) can include one or more processor(s) and one or more tangible, non-transitory, computer readable media (e.g., memory devices). The one or more tangible, non-transitory, computer readable media can store instructions that when executed by the one or more processor(s) cause the operations computing system 106 (e.g., the one or more processors, etc.) to perform operations and functions, such as coordinating vehicles to provide vehicle services.

For example, a user 110 can request a vehicle service provided by the vehicle 104. For instance, a user can provide (e.g., via a user device 138) data indicative of a request 140 to the operations computing system 106 (e.g., of the entity that is associated with the vehicle 104). In some implementations, the request 140 can be generated based at least in part on user input to a user interface displayed on the user device 138 (e.g., a user interface associated with a software application of the entity). The request 140 can indicate the type of vehicle service that the user 110 desires (e.g., a transportation service, a delivery service, a courier service, etc.) and a location associated with the user 110 (e.g., a current location of the user, a different location, etc.). The request 140 can also include an identifier (e.g., phone number, Bluetooth, WiFi, Cellular, IP address, other information, etc.) associated with the user device 138 that provided the request 140 (and/or other user device). The identifier can be used by the vehicle computing system 102 to communicate with the user device 138 and/or otherwise provide/obtain data associated therewith, as further described herein. In some implementations, such an identifier can be retrieved from a memory that securely stores such information in a profile/account associated with the user 110 (e.g., such that the request 140 need not provide the identifier).

Figure 2:
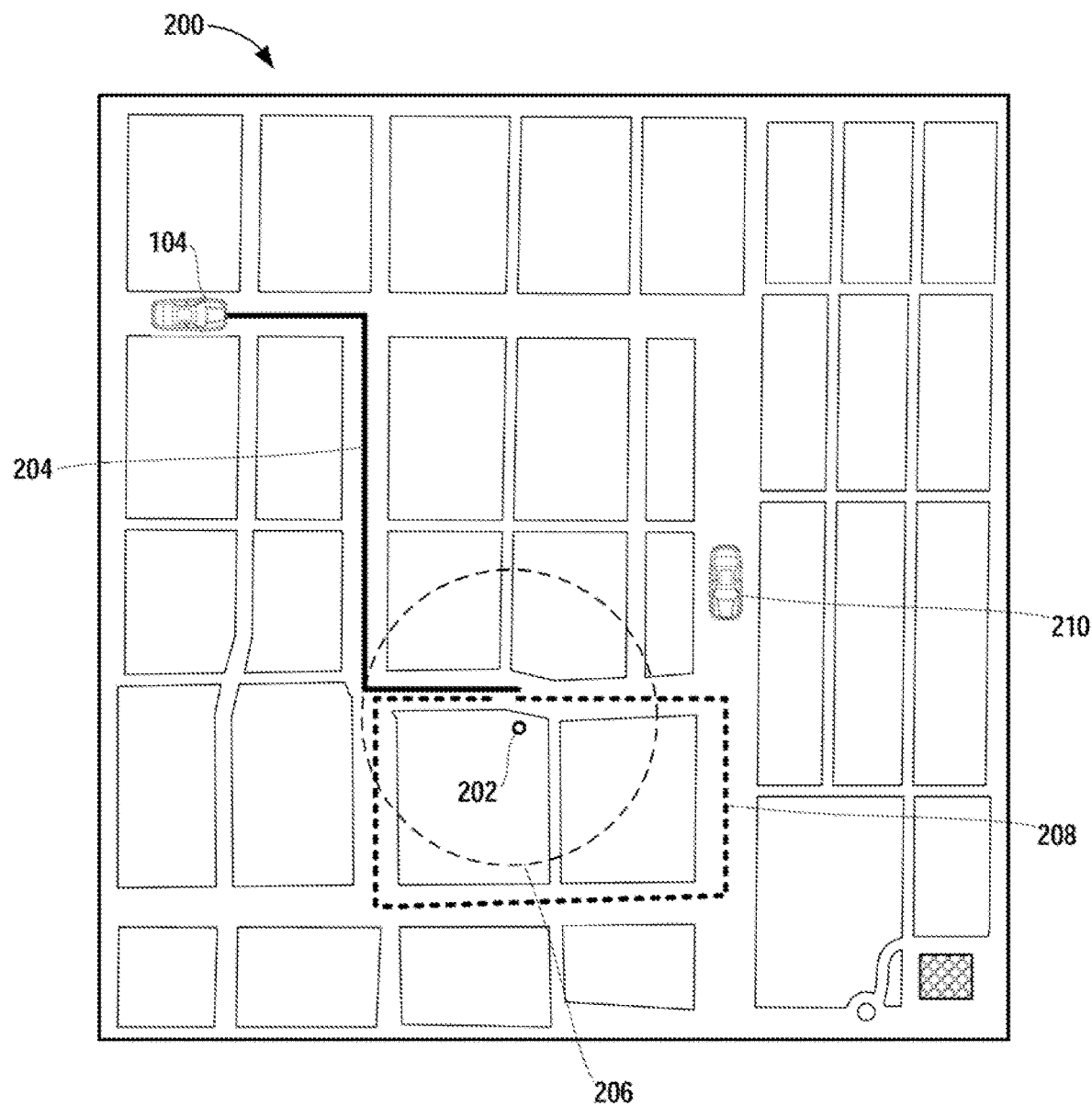
FIG. 2 depicts an example geographic area that includes a location associated with a user according to example embodiments of the present disclosure.

The operations computing system 106 can process the request 140 and select the vehicle 104 to provide the requested vehicle service to the user 110. The operations computing system can provide, to the vehicle 104, data 142 indicative of a location to which the vehicle 104 is to travel. For example, FIG. 2 depicts an example geographic area 200 that includes a location 202 associated with the user 110 according to example embodiments of the present disclosure. The location 202 can be associated with the user 110 that requested the vehicle service. For example, the location 202 can be the current location of the user 110, as specified by the user 110 and/or determined based on user device location data (e.g., provided with the request 140 and/or otherwise obtained). The location 202 can also be a location that is different than a current location of a user 110, such as for example a location at which the user 110 would like to be picked-up by the vehicle 104, provide an item to the vehicle 104, retrieve an item from the vehicle 104, and/or otherwise interact with the vehicle 104. The location 202 can be expressed as a coordinate (e.g., GPS coordinate, latitude-longitude coordinate pair), an address, a place name, and/or another geographic reference that can be used to identify the location 202. The location 202 associated with the user 110 can be represented, for example, as a pin on a map user interface.

The vehicle computing system 102 can obtain the data 142 indicative of the location 202 associated with the user 110 to which the vehicle 104 is to travel. As described herein, the user 110 can be associated with a request 140 for a vehicle service provided by the vehicle 104. The vehicle 104 can obtain the data 142 indicative of the location 202 associated with the user 110 from the operations computing system 106. In some implementations, the user 110 may communicate directly with the vehicle 104 to request the vehicle service. For example, the user 110 may use the user device 138 to send the request 140 to the vehicle computing system 102. In such a case, the vehicle computing system 102 can process the request 140 and determine the location 202 of the user 110.

The vehicle 104 can also obtain a first vehicle route 204 that leads to the location 202 associated with the user 110. The first vehicle route 204 can be, for example, a route from the current location of the vehicle 104 to the location 202 associated with the user 110. In some implementations, the operations computing system 106 can provide the first vehicle route 204 to the vehicle 104. Additionally, or alternatively, the vehicle computing system 102 of the vehicle 104 can determine the first vehicle route 204. For example, the vehicle computing system 102 can determine the first vehicle route 204 based at least in part on the map data 120.

The vehicle 104 is to travel in accordance with the first vehicle route 204 to arrive within a vicinity 206 of the location 202 associated with the user 110. For example, the vehicle computing system 102 can control the vehicle 104 (e.g., via a motion plan 134 implemented by the control system(s) 116) to travel along a first vehicle route 204 to arrive within a vicinity 206 of the location 202 associated with the user 110. The vicinity 206 of the location 202 associated with the user 110 can be defined at least in part by a distance (e.g., a radial distance) from the location 202 associated with the user 110. The distance can be indicative of an acceptable walking distance from the location 202 associated with the user 110. For example, an acceptable walking distance can be distance that a user would be willing walk (or otherwise travel) to arrive at a vehicle. In some implementations, the operations computing system 106 can determine the acceptable walking distance, as described herein, and provide such information to the vehicle 104. In some implementations, the vehicle 104 can determine the acceptable walking distance. In some implementations, the acceptable walking distance can be determined by another computing system and provided to the operations computing system 106 and/or the vehicle 104.

Figure 3:
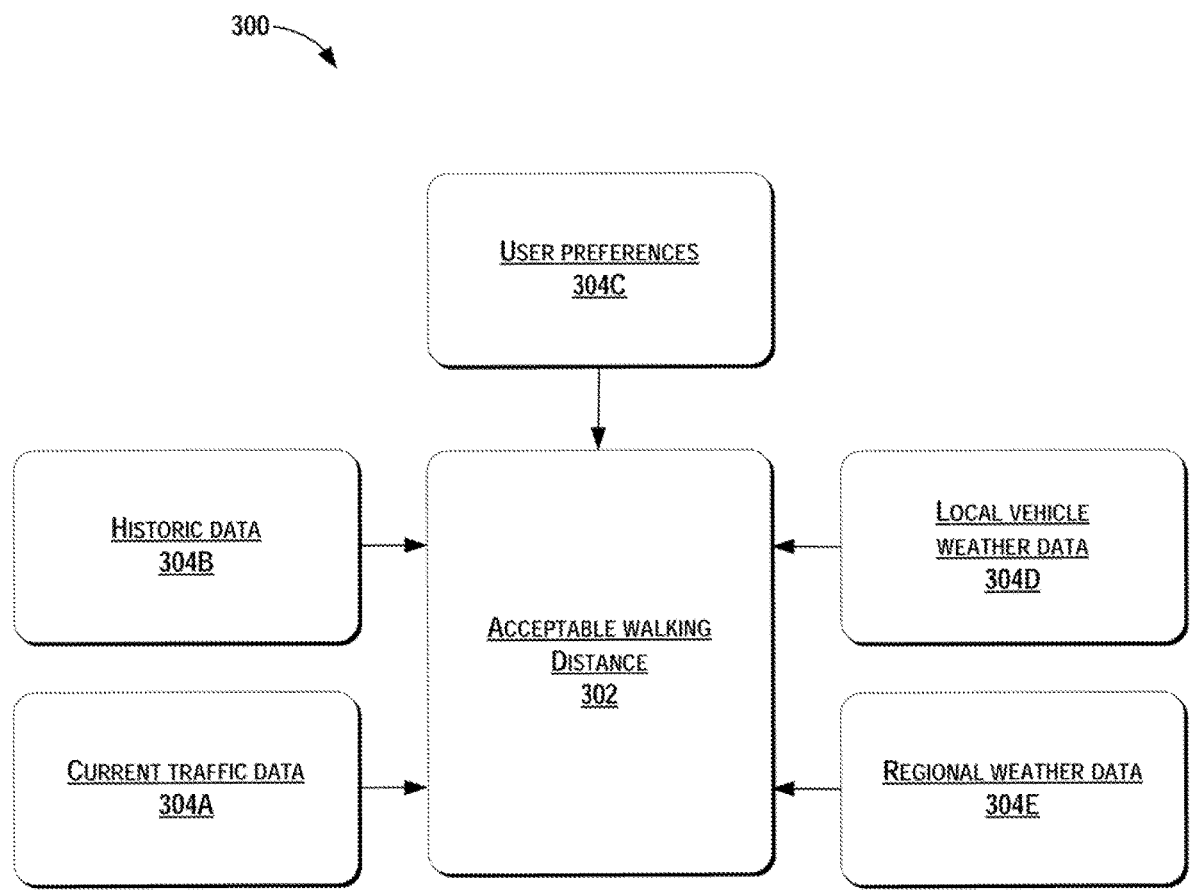
FIG. 3 depicts example information associated with an acceptable walking distance according to example embodiments of the present disclosure.

The acceptable walking distance can be determined based on a variety of information. FIG. 3 depicts example information 300 associated with an acceptable walking distance according to example embodiments of the present disclosure. The acceptable walking distance 302 can be determined based at least in part on at least one of current traffic data 304A, historic data 304B, user preference data 304C, local vehicle weather data 304D, regional weather data 304E, and/or other data. The current traffic data 304A can be indicative of a current level of traffic within the geographic area 200 and/or an area that would affect the geographic area 200. The current traffic data 304A can be obtained from another computing system (e.g., city management database, the operations computing system 106, another vehicle, etc.) and/or determined by a vehicle 104, as further described herein. For example, in the event that the current traffic level is high such that it would take a longer time for the vehicle 104 to reach the location 202, the acceptable walking distance 302 may be higher so that the user 110 isn't waiting a greater time to board the vehicle 104, place an item in the vehicle 104, retrieve an item from the vehicle, etc.

The historic data 304B can include historic data associated with providing vehicle services to a user. For instance, the historic data 304B can be indicative of previously calculated acceptable walking distances for the specific user 110 and/or for other user(s) of the vehicle services. By way of example, in the event that the user (or similarly situated user(s)) has shown a willingness to walk a certain distance to a vehicle, the acceptable walking distance 302 can be determined to reflect the historically acceptable walking distance. In some implementations, the historic data 304B can include historic traffic data.

Additionally, or alternatively, the acceptable walking distance 302 can be based at least in part on preferences of the user 110. For instance, the entity associated with the vehicle 104 can maintain an account/profile associated with the user 110. In some implementations, the user 110 can specify an acceptable walking distance (e.g., via user input to a user interface). The user-specified acceptable walking distance can be securely stored and used to determine the acceptable walking distance 302 when the user 110 requests a vehicle service. In some implementations, the user 110 may provide feedback regarding the distance the user 110 walked to arrive at a vehicle that is providing the user 110 vehicle services. The user 110 can provide feedback data (e.g., via user input to a user interface) indicating whether the distance was acceptable or unacceptable (e.g., as prompted by a software application). Accordingly, the acceptable walking distance 302 can be based at least in part on such feedback data. In some implementations, acceptable walking distance 302 can be based at least in part on preferences of other users such as those similar situated to the user 110, within the geographic area, within a similar geographic area, etc.

The acceptable walking distance 302 can also, or alternatively, be based at least in part on weather data. In some implementations, the acceptable walking distance 302 can be based at least in part on local weather data 304D obtained via a vehicle. For example, the vehicle 104 can include a rain sensor, thermometer, humidity sensor, and/or other types of sensor(s) that can be used to determine weather conditions within the surrounding environment of the vehicle 104. The vehicle 104 can also be configured to determine the presence of one or more weather conditions (e.g., rain, sleet, snow, etc.) based at least in part on the sensor data 118. Additionally, or alternatively, the acceptable walking distance 302 can be based at least in part on regional weather data 304E (e.g., from a third party weather source). The acceptable walking distance 302 can be adjusted depending on the weather conditions indicated by the weather data. By way of example, in the event that the local weather data 304D and/or the regional weather data 304E indicate that the geographic area 200 is experiencing (and/or will experience) rain, the acceptable walking distance 302 may be decreased to a short distance from the location 202. In the event that the local weather data 304D and/or the regional weather data 304E indicate that the geographic area 200 is experiencing (and/or will experience) clear skies, the acceptable walking distance 302 can be greater distance from the location 202.

In some implementations, the acceptable walking distance 302 can be determined at least in part from a model, such as a machine-learned model. For example, the machine-learned model can be or can otherwise include one or more various model(s) such as, for example, models using boosted random forest techniques, neural networks (e.g., deep neural networks), or other multi-layer non-linear models. Neural networks can include recurrent neural networks (e.g., long short-term memory recurrent neural networks), feed-forward neural networks, and/or other forms of neural networks. For instance, supervised training techniques can be performed to train the model using historical acceptable walking distances, weather data, user feedback data, etc. to determine an acceptable walking distance 302 based at least in part on input data. The input data can include, for example, the various types of information 300, as described herein. The machine-learned model can provide, as an output, data indicative of an acceptable walking distance 302. In some implementations, the acceptable walking distance 302 can be specific to the geographic area. For example, the model can be trained based on information associated with the geographic area 200 such that the outputted acceptable walking distance 302 is specific to the geographic area 200.

In some implementations, the vehicle 104 can provide a communication to the user 110 indicating that the vehicle 104 is within the vicinity 206 of the location 202 associated with the user 110. For example, the vehicle computing system 102 can determine that the vehicle 104 is within the acceptable walking distance 302 from the location 202 of the user 110 (e.g., based on the positioning system 144). In response, the vehicle computing system 102 can send a communication to the user device 138 associated with the user 110. The communication can indicate that the vehicle 104 is within the vicinity 206 of the user 110 (e.g., within the acceptable walking distance 302). For instance, for a transportation service, such a communication can be in the form of a textual message, auditory message, etc. stating "your vehicle is arriving please prepare to board".

The vehicle 104 can begin to search for a parking location (e.g., out of the vehicle's travel way) when the vehicle 104 is within the vicinity of the location 202 associated with the user 110. For example, the vehicle 104 can enter into the approach operating mode 108D when the vehicle 104 is within the vicinity 206 of the location 202 associated with the user 110. While within the vicinity 206, the vehicle 104 can search for a parking location before it reaches the location 202 associated with the user 110 (e.g., before the GPS pin coordinate on a map). In some implementations, the vehicle 104 can search for a parking location after it passes the location 202 associated with the user 110 and is still within the vicinity 206 of the user 110 (e.g., within the acceptable walking distance 302).

To identify a parking location, the vehicle computing system 102 can obtain sensor data 118 associated with one or more objects that are proximate to the vehicle 104. As described herein, the sensor data 118 can be indicative of locations associated with the object(s) within the surrounding environment of the vehicle 104 at one or more times. The vehicle 104 can process the sensor data 118 to determine if there are any available parking locations out of the vehicle's travel way (e.g., out of a traffic lane) that are not currently occupied by the objects (e.g., other vehicles) within the vehicle's surrounding environment. In some implementations, the vehicle 104 can utilize the map data 120 to determine whether any designated parking locations (e.g., parking lots, pullover lanes, etc.) are located and/or are available within the vicinity 206 of the location 202 associated with the user 110. In the event the vehicle 104 can identify a parking location that is out of a travel way and within the vicinity 206 of the location 202 associated with the user 110 (e.g., out of a traffic lane), the vehicle 104 can position itself into that parking location accordingly.

Figure 4:
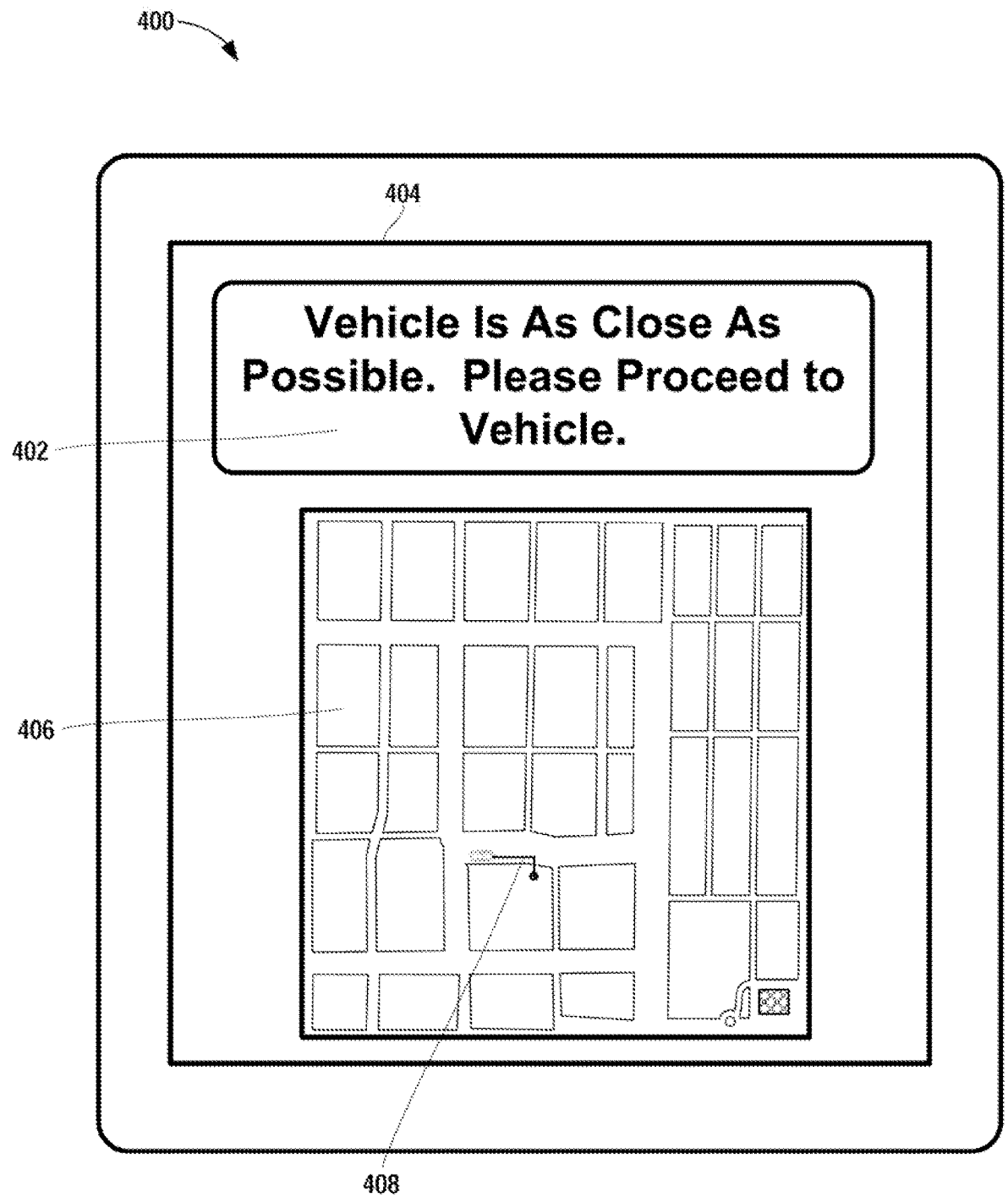
FIG. 4 depicts an example display device with an example communication according to example embodiments of the present disclosure.

The vehicle computing system 102 can send a communication to the user device 138 associated with the user 110 indicating that the vehicle 104 has parked. For example, FIG. 4 depicts an example display device 400 with an example communication 402 according to example embodiments of the present disclosure. The display device 400 (e.g., display screen) can be associated with the user device 138 associated with the user 110. The communication 402 can be presented via a user interface 404 on the display device 400. The communication 402 can indicate that the vehicle 104 has arrived. In some implementations, the communication 402 and/or another portion of the user interface 404 can be indicative of a location of the vehicle 104. For example, the display device 400 can display a map user interface 406 that includes a user route 408. The user route 408 can be a route along which a user 110 can travel to arrive at the vehicle 104.

In the event that the vehicle 104 is unable to identify a parking location that is out of the travel way (and within the vicinity 206 of the user 110), the vehicle 104 can decide whether or not to stop at least partially in a travel way to wait for the user 110. To help do so, the vehicle computing system 102 of the vehicle 104 can obtain traffic data associated with the geographic area 200 that includes the location 202 associated with the user 110.

Figure 5:
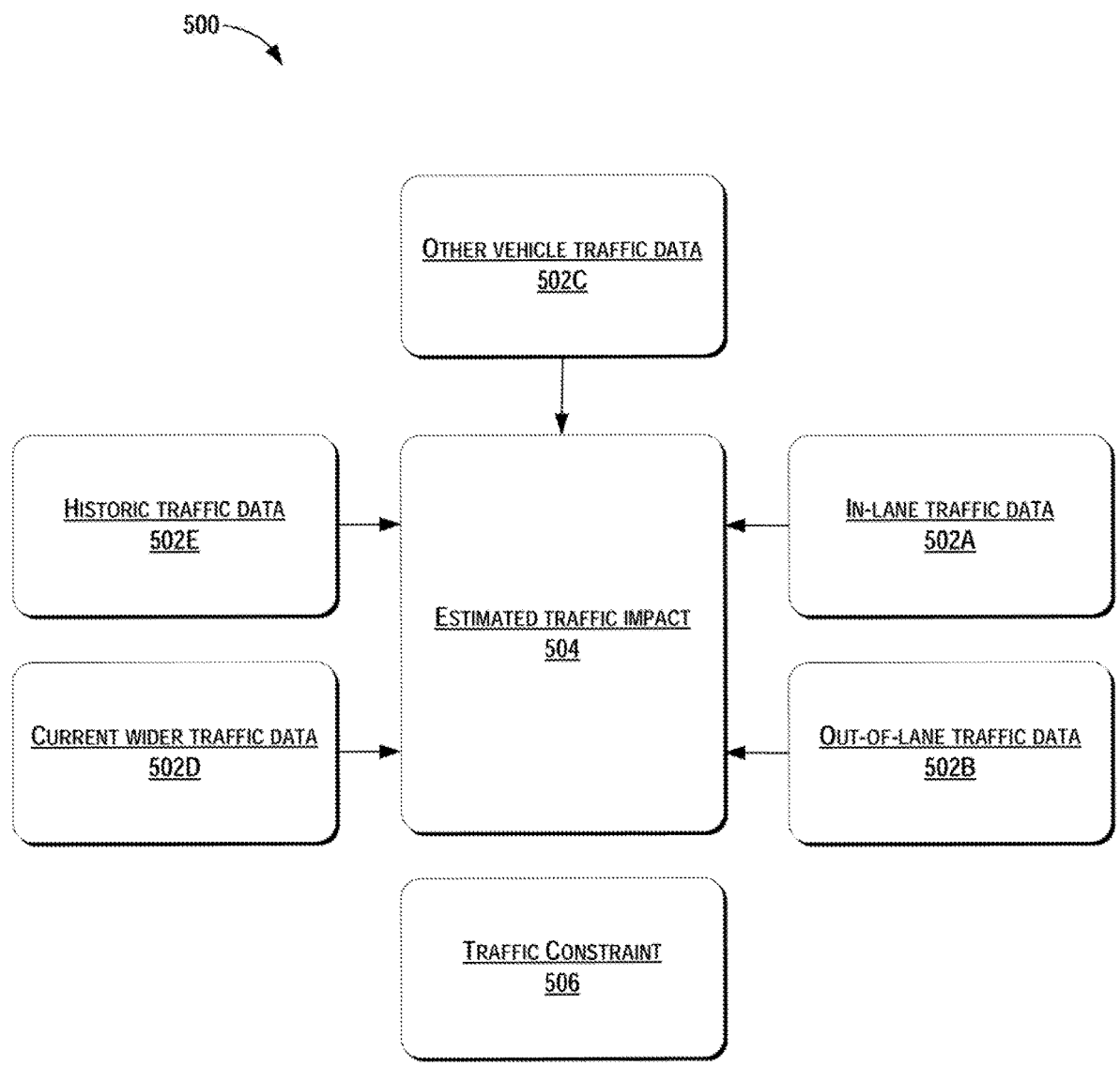
FIG. 5 depicts example information associated with an estimated traffic impact according to example embodiments of the present disclosure.

FIG. 5 depicts example traffic data 500 that can be obtained by the vehicle computing system 102 according to example embodiments of the present disclosure. The traffic data 500 can be obtained from a variety of sources such as other vehicles (e.g., other autonomous vehicles within the vehicle fleet), the operations computing system 106, third party sources (e.g., traffic management entities, etc.), as well as the vehicle 104 itself. The traffic data 500 can include, for example, in-lane traffic data 502A, out-of-lane traffic data 502B, other vehicle traffic data 502C, current wider traffic data 502D, historic traffic data 502E, and/or other types of traffic data. The traffic data 500 can be updated periodically, as scheduled, upon request, in real-time, and/or in near real-time.

The in-lane traffic data 502A and/or out-of-lane traffic data 502B can be indicative of a level of traffic within the surrounding environment of the vehicle 104. For instance, the in-lane traffic data 502A can be indicative of the number of objects, object locations, and the speed of the respective objects within the current travel lane (and/or other designated travel boundaries) of the vehicle 104 (e.g., the other vehicles to the rear and front of the vehicle 104). The out-of-lane traffic data 502B can be indicative of the number of objects, object locations, and the speed of the respective objects within the surrounding environment, other than in the current travel lane (or other boundaries) of the vehicle 104 (e.g., other vehicles in the other lanes, all other classified objects around the vehicle 104, etc.). The in-lane traffic data 502A and/or out-of-lane traffic data 502B can be based at least in part on the sensor data 118 associated with the surrounding environment of the vehicle 104, as further described herein.

The vehicle computing system 102 can obtain the other vehicle traffic data 502C from one or more other vehicles, such as one or more other autonomous vehicles in a fleet that includes the vehicle 104. The other vehicle traffic data 502C can be indicative of the number of objects, object locations, and the speed of the respective objects within the surrounding environment of the other vehicle(s), while the other vehicle(s) are within the geographic area 200, the vicinity 206 of the location 202 associated with the user 110, and/or another location which may have a traffic effect on the geographic area 200 and/or the vicinity 206 of the location 202 associated with the user 110. The vehicle computing system 102 can obtain the other vehicle traffic data 502C via vehicle to vehicle communication and/or via other computing device(s) (e.g., the operations computing system 106).

The current wider traffic data 502D can be indicative of the traffic within a larger regional area that includes the geographic area 200. For instance, the vehicle computing system 102 can obtain the current wider traffic data 502D that indicates the current traffic patterns, build-ups, etc. within a region that includes the geographic area 200. Such data can be obtained via a third party source such as, for example, a traffic management entity associated with the region.

The historic traffic data 502E can include previously collected traffic data of the types of traffic data described herein and/or other types of traffic data. For example, the historic traffic data 502E can include traffic data previously obtained by the vehicle computing system 102 (e.g., in-lane, out-of-lane traffic data), traffic data previously obtained by other vehicle(s) (e.g., associated with the geographic area 200, the vicinity 206 of the location 202, etc.), historic traffic data (e.g., traffic patterns) associated with a region that includes the geographic area 200, and/or other types of historic traffic data.

The vehicle computing system 102 can determine an estimated traffic impact 504 of the vehicle 104 on the geographic area 200 based at least in part on the traffic data 500. The estimated traffic impact 504 can be indicative of an estimated impact of the vehicle 104 on one or more objects within a surrounding environment of the vehicle 104 in the event that the vehicle 104 were to stop at least partially in the travel way within the vicinity 206 of the location 202 associated with the user 110. In some implementations, the estimated traffic impact 504 can estimate the likelihood that an approach object (e.g., another vehicle) can pass safely without endangering the user 110.

In some implementations, the estimated traffic impact 504 can be based at least in part on a comparison of a level of traffic to a traffic constraint 506. The vehicle computing system 102 can determine a level of traffic (e.g., a number of objects that could be impacted by the vehicle 104 stopping at least partially in a travel way) within the surrounding environment of the vehicle 104 based at least in part on one or more of the types of traffic data 500. The vehicle computing system 102 can compare the level of traffic to a traffic constraint 506 to determine whether the estimated traffic impact 504 would be high or low (e.g., significant or insignificant, unacceptable or acceptable, etc.).

The traffic constraint 506 can be implemented in a variety of forms. For example, the traffic constraint 506 can include a traffic threshold that is indicative of an acceptable level of traffic (e.g., an acceptable number of objects) that would be impacted by the vehicle 104 stopping at least partially in the travel way. A level of traffic that exceeds the traffic threshold would be considered a high impact on traffic. In some implementations, the traffic constraint 506 can be implemented as cost data (e.g., one or more cost function(s)). For example, the vehicle computing system 102 (e.g., the motion planning system 128) can include cost data that reflects the cost(s) of stopping vehicle motion, the cost(s) of causing traffic build-up, the cost(s) of illegally stopping in a travel way, etc.

The traffic constraint 506 can be based on a variety of information. In some implementations, the traffic constraint 506 can be based at least in part on historic traffic data that indicates the level of traffic previously occurring in that geographic area. For example, if the geographic area 200 normally experiences a high level of traffic build-up, a corresponding traffic threshold can be higher (and/or the cost of stopping can be lower). Additionally, or alternatively, the traffic constraint 506 can be based at least in part on real-time traffic data (e.g., from other vehicles in the fleet, from the vehicle 104, other sources). For example, in the event that there is already a traffic jam in the vicinity 206 of the location 202 of the user 110, the traffic threshold could be higher (and/or the cost of stopping could be lower). In some implementations, the traffic constraint 506 can be based at least in part on the typical travel expectations of individuals in the geographic area 200. For example, individuals that are located in City A may be more patient when waiting in traffic than those in City B. Thus, a traffic threshold may be higher in City A than in City B (and/or the cost of stopping may be lower in City A than in City B). In some implementations, the traffic constraint 506 can be based at least in part on map data 120 (and/or other map data). For example, in the event that the vehicle 104 is traveling on a wide travel way in which impacted vehicles could eventually travel around the vehicle 104, the traffic threshold could be higher (and/or the cost of stopping could be lower). The traffic constraint 506 can be determined dynamically, in real-time (and/or near real-time) to reflect the conditions currently faced by the vehicle 104.

In some implementations, the traffic constraint 506 can be determined at least in part from a model, such as a machine-learned model. For example, the machine-learned model can be or can otherwise include one or more various model(s) such as, for example, models using boosted random forest techniques, neural networks (e.g., deep neural networks), or other multi-layer non-linear models. Neural networks can include recurrent neural networks (e.g., long short-term memory recurrent neural networks), feed-forward neural networks, and/or other forms of neural networks. For instance, supervised training techniques can be performed to train the model (e.g., using previous driving logs) to determine a traffic constraint 506 based at least in part on input data. The input data can include, for example, the traffic data 500 as described herein, map data, data from a traffic management entity, driving characteristics of individuals in an associated geographic area, complaints received from operators of vehicles that were caused to stop by autonomous vehicles, etc. The machine-learned model can provide, as an output, data indicative of a recommended traffic constraint. In some implementations, the recommended traffic constraint can be specific to the geographic area 200. For example, the model can be trained based at least in part on data associated with geographic area 200 such that the recommended traffic constraint is specific for that particular region.

Additionally, or alternatively, the estimated traffic impact 504 can be based at least in part on a model. The vehicle computing system 102 and/or the operations computing system 106 can obtain data descriptive of the model (e.g., machine learned model). The vehicle computing system 102 and/or the operations computing system 106 can provide input data to the model. The input data can include the one or more of the types of traffic data 500 (e.g., associated with the geographic area 200). In some implementations, the input data can include the map data 120. The model can determine the estimated traffic impact 504 that the vehicle 104 would have on the geographic area 200 if the vehicle 104 were to stop at least partially within a travel way (e.g., within a current lane of travel). By way of example, the model can evaluate the traffic data 500 to determine the level of traffic in the vehicle surrounding environment. The model can analyze the traffic data 500 with respect to the traffic constraint 506 to determine whether the estimated traffic impact 504 is high or low, significant or insignificant, unacceptable or acceptable, etc. The output of such a model can be the estimated traffic impact 504, which can be indicative of, for example, a number of objects that would be impacted by the vehicle 104 stopping at least partially in a travel way and/or whether the estimated traffic impact is high or low, significant or insignificant, acceptable or unacceptable, etc.

In some implementations, the output of the model can be provided as an input to the model for another set of traffic data (e.g., at a subsequent time step). In such fashion, confidence can be built that a determined estimated traffic impact is the accurate. Stated differently, in some implementations, the process can be iterative such that the estimated traffic impact can be recalculated over time as it becomes clearer what the estimated traffic impact is on the respective geographic area. For example, the model can include one or more autoregressive models. In some implementations, the model can include one or more machine-learned recurrent neural networks. For example, recurrent neural networks can include long or short-term memory recurrent neural networks, gated recurrent unit networks, or other forms of recurrent neural networks.

As described herein, the estimated traffic impact 504 can be based at least in part on the sensor data 118 acquired onboard the vehicle 104. For instance, the vehicle computing system 102 can obtain traffic data associated with the geographic area 200 that includes the location 202 associated with the user 110 based at least in part on the sensor data 118 obtained via the one or more sensors 112. By way of example, the vehicle computing system 102 can obtain the in-lane traffic data 502A and/or out-of-lane traffic data 502B associated with the geographic area 200 that includes the location 202 associated with the user 110. In some implementations, the vehicle computing system 102 can obtain sensor data 118 (e.g., via the one or more sensors 112) associated with the surrounding environment of the vehicle 104 that is within the vicinity 206 of the location 202 associated with the user 110, as described herein. The sensor data 118 can be indicative of one or more objects within the surrounding environment of the vehicle 104 that is within the vicinity 206 of the location 202. The vehicle computing system 102 can process the sensor data 118 to classify which of the object(s) would be impacted (e.g., caused to stop) by the vehicle 104 stopping in a travel way.

Figure 6:
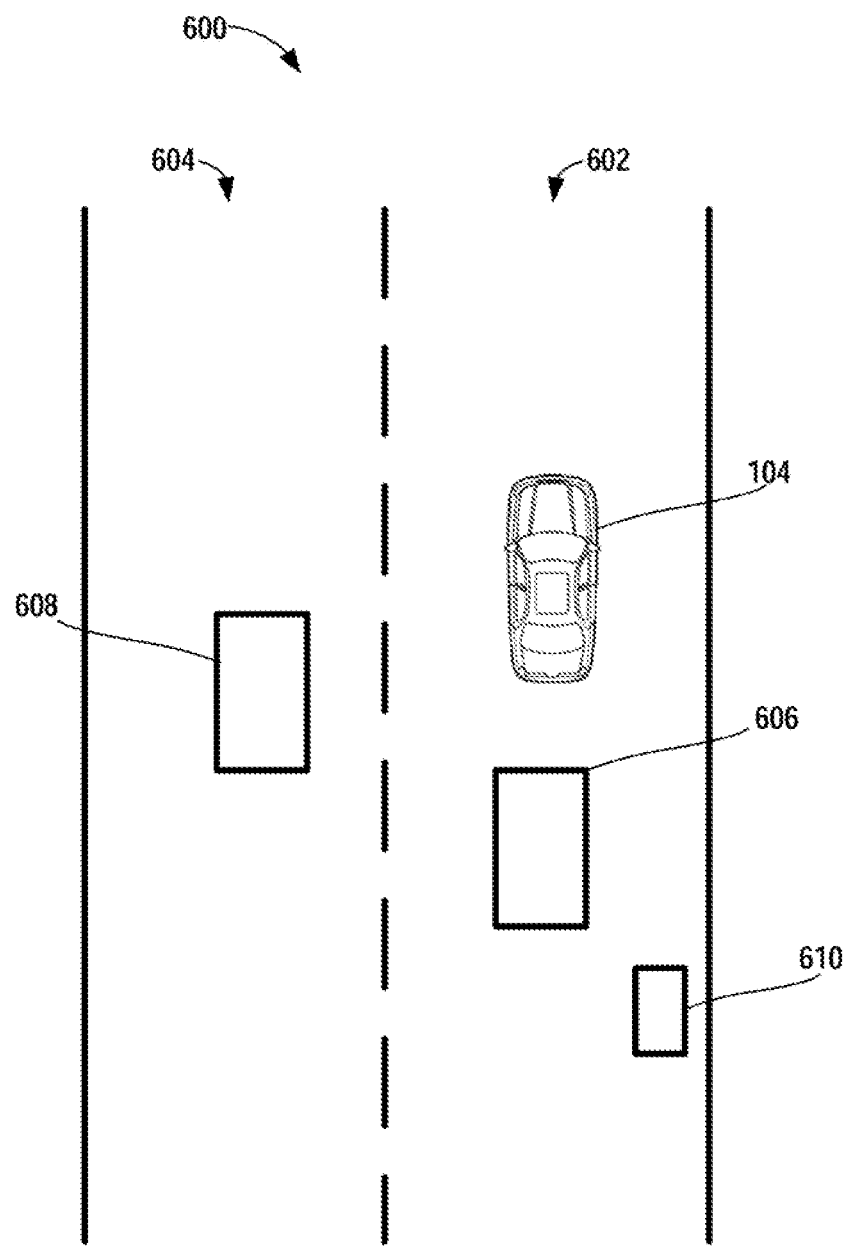
FIG. 6 depicts an example travel way according to example embodiments of the present disclosure.

By way of example, FIG. 6 depicts an example travel way 600 according to example embodiments of the present disclosure. The travel way 600 can be associated with the geographic area 200. For example, the travel way 600 can be located within the vicinity 206 of the location 202 associated with the user 110 (e.g., the street on which the user 110 is located). The travel way 600 can include the current travel lane 602 (and/or other designated travel boundaries) of the vehicle 104. The travel way 600 can include other travel lanes, such as other lane 604 (e.g., a lane adjacent to the current travel lane 602). The vehicle computing system 102 can classify the objects within the surrounding environment that would be impacted in the event the vehicle 104 were to stop at least partially in the travel way 600. For example, the object 606 (e.g., another vehicle behind the vehicle 104 in the same travel lane 602) can be identified as an object that would be impacted in the event that the vehicle 104 stops at least partially in the current lane 602.

The vehicle computing system 102 can also identify object(s) that would not be affected by the vehicle 104 stopping at least partially in the travel way 600. Such object(s) can include one or more objects in another travel lane as well as objects with the same travel lane as the vehicle 104. For example, the vehicle computing system 102 can determine that the object 608 located in the other travel lane 604 (e.g., another vehicle in an adjacent travel lane) will not be impacted by the vehicle 104 stopping at least partially in the travel way 600 because the object 608 can continue passed the vehicle 104 via the other travel lane 604. In another example, the vehicle computing system 102 can determine that an object 610 (e.g., a bicycle) may not be impacted by the vehicle 104 stopping (and/or may be impacted to an insignificant degree) because the object 608 may be parked and/or have the opportunity to travel around the vehicle 104 (e.g., via a lane change into the adjacent lane, maneuver around the vehicle 104 within the same lane, etc.).

After such classification, the vehicle computing system 102 can determine a level of traffic associated with the geographic area 200 (e.g., within the vicinity of the user's location) based at least in part on the sensor data 118. For example, the level of traffic can be based at least in part on the number of object(s) within the surrounding environment of the vehicle 104 that would be impacted by the vehicle 104 stopping at least partially in the travel way 600 (e.g., the current travel lane 602), while filtering out those object(s) that would not be impacted. Similar such information could be acquired via one or more other vehicles in the associated vehicle fleet. The vehicle computing system 102 can determine the estimated traffic impact by comparing the level of traffic to the traffic constraint 506 (e.g., a traffic threshold indicative of a threshold level of traffic). In the event that the level of traffic exceeds the traffic constraint 506, the vehicle computing system 102 can determine that the estimated traffic impact 504 on the geographic area 200 would be high.

The vehicle computing system 102 can also, or alternatively, determine an estimated time of user arrival. The estimated time of user arrival can be indicative of an amount of time needed for the user 110 to interact with the vehicle 104 (e.g., before the vehicle 104 can begin moving again). For example, the vehicle computing system 102 can determined an estimated time until the user 110 completes boarding of the vehicle 104 (e.g., enters the vehicle 104 and fasten a seatbelt for a transportation service). This can be made up of an estimated time until the user 110 starts boarding the vehicle 104 (e.g., the time needed to walk to the vehicle 104, the time until the vehicle doors unlock, etc.) and an estimated time of boarding duration for a user 110 (e.g., to load luggage, help other passengers board, etc.). In some implementations, the vehicle computing system 102 can determine an estimated time until the user 110 completes the retrieval of an item from the vehicle 104 (e.g., completely removes an item from the vehicle 104 for a delivery service). In some implementations, the vehicle computing system 102 can determine an estimated time until the user 110 places an item in the vehicle 104 (e.g., for a courier service). The estimated time estimated time of user arrival (e.g., estimated time until the user 110 completes boarding) can help the vehicle computing system 102 determine whether or not to stop at least partially in the travel way 600. Such time estimate(s) can be expressed as a time duration (e.g., user estimated to arrive in 1 minute) and/or a point in time (e.g., user estimated to arrive at 10:31 am (PT)).

Figure 7:
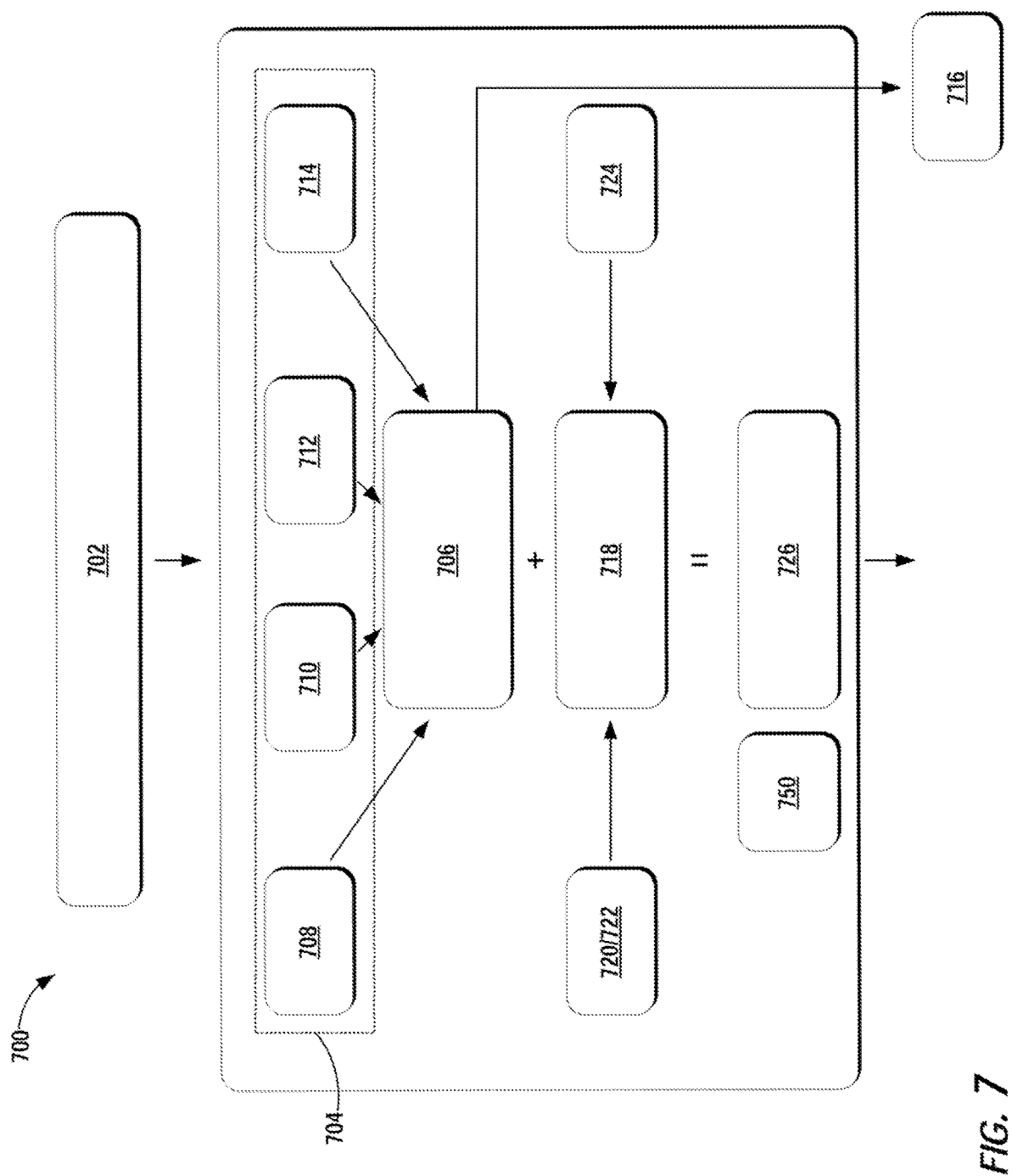
FIG. 7 depicts a flow diagram of an example method of determining an estimated time of user arrival according to example embodiments of the present disclosure.

The estimated time of user arrival (e.g., the estimated time until the user 110 completes boarding, item retrieval, item placement, etc.) can be based on a variety of information. FIG. 7 depicts example depicts a flow diagram of an example method 700 of determining an estimated time of user arrival (e.g., autonomous vehicle user boarding times) according to example embodiments of the present disclosure. While the following provides examples of the method 700 with respect to determining autonomous vehicle user boarding times, a similar approach can be taken for determining an estimated time until the user 110 completes the retrieval of an item from the vehicle 104 and/or an estimated time until the user 110 places an item in the vehicle 104. One or more portion(s) of the method 700 can be implemented by one or more computing devices such as, for example, the one or more computing device(s) of the vehicle computing system 102 and/or other systems (e.g., as computing operations). Each respective portion of the method 700 can be performed by any (or any combination) of the one or more computing devices. Moreover, one or more portion(s) of the method 700 can be implemented as an algorithm on the hardware components of the device(s) described herein (e.g., as in FIGS. 1 and 14), for example, to control an autonomous vehicle. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (702), the method 700 can include obtaining one or more identifiers of a user device. The vehicle computing system 102 can use one or more identifier(s) of the user device 138 (e.g., obtained with the request 140, obtained by the vehicle 104, provided by the operations computing system 106, etc.) to scan for and/or communicate with the user device 138 when the vehicle 104 is within the vicinity 206 of the user 110. By way of example, the operations computing system 106 can provide the vehicle computing system 102 with one or more identifier(s) of a user device 138 associated with the user 110. The identifiers can be, for example, unique radio identifiers (e.g., Bluetooth, WiFi, Cellular, friendly names, contact number, other identifier) collected via a software application and provided to the operations computing system 106. The vehicle computing system 102 can utilize the identifiers to communicate and/or locate a user device 138 associated with the user 110. For example, when the vehicle 104 is within a vicinity 206 of the location 202 associated with the user 110, the vehicle computing system 102 can scan for the user device 138 (e.g., opt-in radios) based at least in part on the identifier(s) (e.g., when the vehicle 104 is in the approach mode 108D).

At (704), the method 700 can include obtaining location data associated with the user device. For instance, the vehicle computing system 102 can obtain (e.g., via the communication system 136) location data associated with a user device 138 associated with a user 110. The location data associated with the user device 138 can be indicative of one or more locations of the user device 138 associated with the user 110, at one or more times. In some implementations, the vehicle computing system 102 can use the identifier(s) to determine the location of the user 110. The vehicle computing system 102 can be configured to utilize a variety of communication technologies to obtain the location data associated with the user device 138. For example, the vehicle computing system 102 can obtain the location data based at least in part on a triangulation of signals via at least one of multiple input, multiple output communication between the vehicle 104 and the user device 138, one or more Bluetooth low energy beacons located onboard the vehicle 104, or a light signal handshake between the user device 138 and the vehicle 104, as further described herein.

Figure 8A:
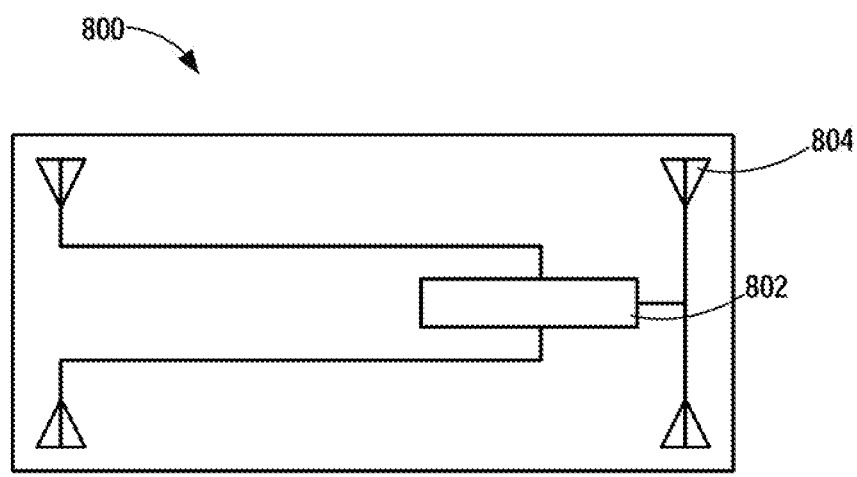
FIG. 8A depicts an example portion of a communications system according to example embodiments of the present disclosure.

In some implementations, the vehicle computing system 102 can use radio frequency (RF) signaling to obtain location data associated with the user 138. For example, FIG. 8A depicts an example portion 800 of a communications system 136 according to example embodiments of the present disclosure. The communications system 136 can include one or more electronic devices 802 (e.g., RF module) configured to transmit and/or obtain one or more RF signals (e.g., from the user device 138) via one or more communication device(s) 804 (e.g., transmitters, receivers, transmitters, RF sensors, etc.). For example, once the user device 138 is found (e.g., via the identifiers), the vehicle computing system 102 can track changes in the signal strength (e.g., radio signal strength identifier (RSSI)) to determine various information about the user device 138. For example, the vehicle computing system 102 can determine the approximate distance of the user device 138 (and the user 110) to the vehicle 104 (e.g., the difference between RSSI triangulation and improvements over time can be used to determine the approximate distance of the user 110 to the vehicle 104). Additionally, or alternatively, the vehicle computing system 102 can determine a heading of the user 110 based at least in part on RF signal(s) associated with the user device 138 (e.g., the communication device(s) 804 with the best/strongest RSSI reading can indicate direction/heading of the user 110). The vehicle computing system 102 can also determine a speed/velocity of the user device 138 using such a technique. The approximate distance, heading, speed, etc. measurements can be determined with or without an authenticated connection.

Figure 8B:
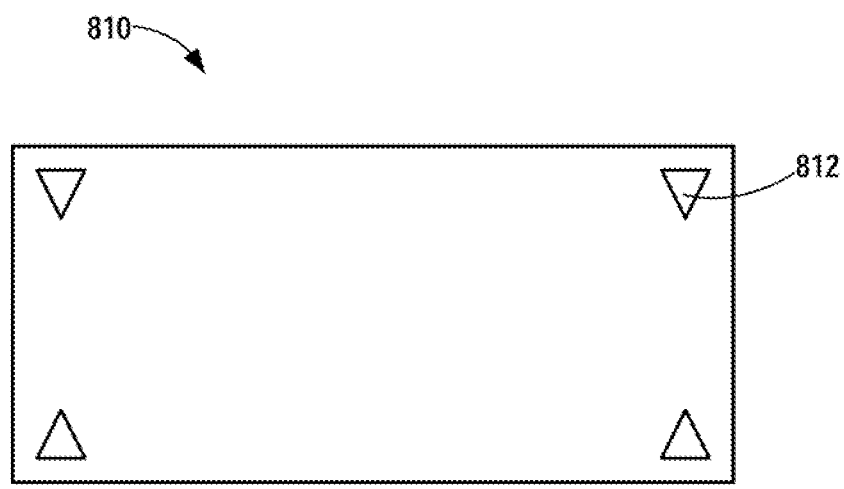
FIG. 8B depicts an example portion of a communications system according to example embodiments of the present disclosure.

Additionally, or alternatively, the vehicle computing system 102 can utilize Bluetooth low energy protocol to obtain location data associated with the user device 138. For example, FIG. 8B depicts an example portion 810 of a communications system 136 according to example embodiments of the present disclosure. The communications system 136 can include one or more Bluetooth low energy beacons 812 that are located onboard the vehicle 104. The vehicle computing system 102 can obtain the location data associated with the user device 138 based at least in part on the one or more Bluetooth low energy beacons 812 located onboard the vehicle 104. In some implementations, the vehicle computing system 102 can determine differences in Bluetooth Low Energy (BLE) beacon radio signal strength identifiers over time and/or inertial measurement unit changes, which can indicate a distance between the user device 138 of the user 110 (e.g., a mobile phone associated with the user 110) and the vehicle 104. Additionally, or alternatively, the vehicle computing system 102 can determine a heading of the user device 138 (and the user 110) based at least in part on the Bluetooth low energy beacon(s) 812 (e.g., the beacon(s) with the best/strongest RSSI reading can indicate direction/heading of the user 110). The vehicle computing system 102 can also determine a speed/velocity of the user device 138 using such a technique. In some implementations, the user device 138 can determine its location (e.g., relative to the vehicle 104) based at least in part on signals transmitted from one or more beacons 812 located onboard the vehicle 104. The user device 138 can provide data indicative of its location to one or more remote computing device(s) (e.g., the operations computing system 106, cloud-based system). The remote computing device(s) can provide data indicative of the location of the user device 138 (determined based on the beacons 812) to the vehicle computing system 102. The vehicle computing system 102 can determine the location of the user device 138 (and the user 110) based on such data. In some implementations, the remote computing device(s) can process data from the user device 138 (e.g., associated with the beacons 812) to determine a location of the user device 138 and provide data associated therewith to the vehicle computing system 102.

Figure 8C:
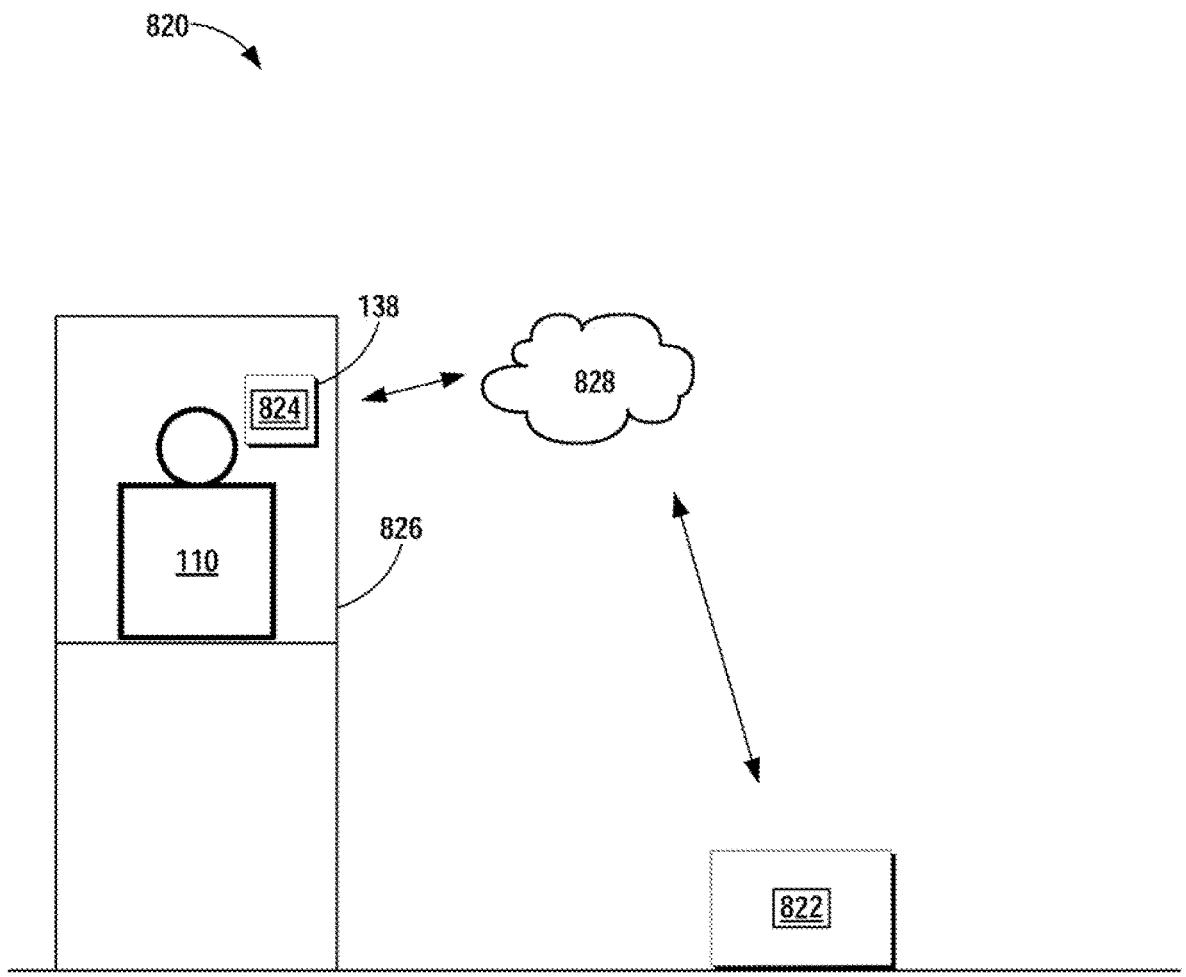
FIG. 8C depicts an example diagram of obtaining location data according to example embodiments of the present disclosure.

In some implementations, the vehicle computing system 102 can utilize one or more altimeters (and/or other measuring device) to obtain location data associated with the user device 138. For example, FIG. 8C depicts an example diagram 820 of obtaining location data according to example embodiments of the present disclosure. The vehicle 104 can include one or more altimeters 822 located onboard the vehicle 104. The user device 138 can include one or more altimeters 824. As shown, the user device 138 (and the user 110) can be located on the second story of a building 826. The vehicle computing system 102 can obtain location data associated with the user device 138 via at least one altimeter 822 located onboard the vehicle 104. By way of example, the vehicle computing system 102 can obtain location data associated with altimeter(s) 824 of the user device 138 via one or more network(s) 828. The vehicle computing system 102 can compare the location data associated with altimeter(s) 824 of the user device 138 to location data associated with altimeter(s) 822 of the vehicle 104. The vehicle computing system 102 can determine an elevation/altitude of the user device 138 (and the user 110) based at least in part on this comparison (e.g., a difference between the altimeter(s) 824 of the user device 138 and the altimeter(s) 822 of the vehicle 104 can indicate elevation/altitude difference). The elevation/altitude can be relative to the position of the vehicle 104 and/or another reference (e.g., ground level, sea level, etc.).

In some implementations, the vehicle computing system 102 can utilize other communication technologies to obtain location data associated with the user device 138. For example, the vehicle computing system 102 can obtain the location data associated with the user device 138 based at least in part on multiple input, multiple output communication between the vehicle 104 and the user device 138 associated with the user 110. This can allow the vehicle 104 to take advantage of the multiple antennas included in the vehicle's communication system 136 as well as those of the user device 138 to increase accuracy of the location data 704A associated with the user 110. For example, the user device 138 can obtain an identifier (e.g., Radio Network Temporary Identifier) that can be associated with the user device 138. The user device 138 can provide data indicative of the identifier to one or more remote computing device(s) (e.g., the operations computing system 106, cloud-based system). The remote computing device(s) can provide data indicative of the identifier to the vehicle computing system 102. The vehicle computing system 102 can locate the user device 138 (and the user 110) based at least in part on the identifier via the multiple antennas onboard the vehicle 104 (and/or the antenna(s) of the user device 138). In some implementations, the vehicle computing system 102 can utilize a handshake (e.g., light signal handshake) between the user device 138 and the vehicle 104.

In some implementations, the vehicle computing system 102 can obtain location data associated with the user device 138 based at least in part on image data. For example, the user 110 can obtain image data associated with the user 110 (e.g., via the user device 138). The image data can be indicative of one or more characteristics (e.g., buildings, street signs, etc.) of the geographic area and/or surrounding environment of the user 110. In some implementations, the user 110 may be included in the image data. The user device 138 can process the image data to determine the location of the user 110 (e.g., via a comparison of image data features to known geographic features). The user device 138 can provide the determined location to one or more remote computing device(s) (e.g., the operations computing system 106 and/or other cloud-based system). The remote computing device(s) can provide data indicative of the location of the user 110 to the vehicle computing system 102. The vehicle computing system 102 can obtain the data indicative of the location of the user 110 determined based at least in part on image data associated with the user 110. The estimated time until the user 110 starts boarding the vehicle 104 can be based at least in part on the location of the user 110. In some implementations, the remote computing device (e.g., the operations computing system 106 and/or other cloud-based system) can obtain the image data associated with the user 110, process the image data (e.g., as described herein), and provide the data indicative of the location of the user 110 to the vehicle computing system 102. This can be helpful to save the processing resources of a computationally limited device (e.g., mobile device).

In some implementations, the vehicle computing system 102 can obtain the image data associated with the user 110 (e.g., via the user device 138 and/or the remote computing device). The vehicle computing system 102 can determine a location of the user 110 based at least in part on the image data. For example, the vehicle computing system 102 can analyze the features of the image data (e.g., the background, street signs, buildings, etc.) and compare the features to other data (e.g., sensor data 118, map data 120, other data, etc.). The vehicle computing system 102 can determine a location of the user based at least in part on this comparison.

In some implementations, the vehicle computing system 102 can utilize other communication techniques. These techniques can include, for example, vehicle perception of the user 110 (e.g., via processing of sensor data 118 to perceive the user 110 and the user's location, distance, heading, velocity, and/or other state data 130 associated therewith), GPS location of the user device 138, device specific techniques (e.g., specific device/model type), the vehicle 104 serving as a localized base station (e.g., GPS, WiFi, etc.), and/or other techniques.

Returning to FIG. 7, the method 700 can include determining an estimated time until the user starts interaction with the vehicle, at (706). For instance, the vehicle computing system 102 can determine an estimated time until the user starts boarding the vehicle 104 (ETSB) based at least in part on the location data associated with the user device 138. The estimated time of until the user 110 starts interaction with the vehicle 104 (e.g., the estimated time until the user starts boarding the vehicle 104 (ETSB)) can be indicative of, for example, a countdown in time until the user's location is near/at the vehicle 104, until the user 110 begins to board, until the doors of the vehicle 104 are unlocked, until the doors are opened, etc. The user 110 can, but need not, physically interact with the vehicle 104 for this time estimate.

The estimated time until the user 110 starts interaction with the vehicle 104 (e.g., the estimated time until the user starts boarding the vehicle 104 (ETSB)) can be based on a variety of data. For example, the vehicle computing system 102 can determine a distance 708 between the user 110 and the vehicle 104 based at least in part on the location data associated with the user device 138, as described herein. The estimated time until the user 110 starts interaction with the vehicle 104 (e.g., the estimated time until the user starts boarding the vehicle 104 (ETSB)) can be based at least in part on the distance 708 between the user 110 and the vehicle 104. Additionally, or alternatively, the vehicle computing system 102 can determine an elevation/altitude 710 of the user 110 based at least in part on the location data associated with the user device 138 (e.g., obtained via the one or more altimeters onboard the vehicle 104), as described herein. The estimated time until the user 110 starts interaction with the vehicle 104 (e.g., the estimated time until the user starts boarding the vehicle 104 (ETSB)) can be based at least in part on the elevation/altitude 710 of the user 110 (e.g., if the user 110 is in a tall building then additional time should be added). Additionally, or alternatively, the vehicle computing system 102 can determine a heading 712 of the user 110 based at least in part on the location data associated with the user device 138, as described herein. The estimated time until the user 110 starts interaction with the vehicle 104 (e.g., the estimated time until the user starts boarding the vehicle 104 (ETSB)) can be based at least in part on the heading 712 of the user 110 (e.g., if the user 110 is across the street then additional time can be added). Additionally, or alternatively, the vehicle computing system 102 can determine a location of the user 110 based at least in part on image data, as described herein. The estimated until the user 110 starts interaction with the vehicle 104 (e.g., the estimated time until the user starts boarding the vehicle 104 (ETSB)) can be based at least in part on the location of the user 100, as determined from the image data.

In some implementations, the vehicle computing system 102 can obtain historic data 714 to help determine the estimated time until the user 110 starts interaction with the vehicle 104 (e.g., the estimated time until the user starts boarding the vehicle 104 (ETSB)). The historic data 714 can be indicative of, for example, historic start boarding times of one or more other users (and or the user 110). In some implementations, a machine learned model can be trained based on such historic data to determine the estimated time until the user 110 starts interaction with the vehicle 104 (e.g., the estimated time until the user starts boarding the vehicle 104 (ETSB)). For example, the model can be trained based on training data indicative of previous location data, user distances, altitudes, headings, etc. labeled with the times of user arrival (e.g., the times when the users started boarding the vehicle). The model can be trained to receive input data (e.g., location data, user distances, altitudes, headings, etc.) and provide, as an output, an until the user 110 starts interaction with the vehicle 104 (e.g., an estimated time until the user starts boarding a vehicle (ETSB)). In some implementations, the estimated time until the user 110 starts interaction with the vehicle 104 (e.g., the estimated time until the user starts boarding the vehicle 104 (ETSB)) can be based at least in part on the historic data 714. For example, vehicle computing system 102 can determine the estimated time until the user 110 starts interaction with the vehicle 104 (e.g., the estimated time until the user starts boarding the vehicle 104 (ETSB)) based at least in part on such a machine-learned model (e.g., as an output thereto).

In some implementations, the estimated time until the user 110 starts interaction with the vehicle 104 (e.g., the estimated time until the user starts boarding the vehicle 104 (ETSB)) can be used to determine one or more vehicle actions, at (716). For example, the estimated time until the user 110 starts interaction with the vehicle 104 (e.g., the estimated time until the user starts boarding the vehicle 104 (ETSB)) can indicate that the user 110 is close to the vehicle 104 and/or heading toward the vehicle 104. The vehicle computing system 102 can cause one or more doors of the vehicle 102 to unlock based at least in part on the estimated time until the user 110 starts interaction with the vehicle 104 (e.g., the estimated time until the user starts boarding the vehicle 104 (ETSB)). To do so, the vehicle computing system 102 can provide control signal(s) to an associated door controller. Additionally, or alternatively, the vehicle computing system 102 can cause the vehicle 104 to implement one or more vehicle settings (e.g., temperature, music, etc.) associated with the user 110 based at least in part on the estimated time until the user 110 starts interaction with the vehicle 104 (e.g., the estimated time until the user starts boarding the vehicle 104 (ETSB)). For example, the vehicle computing system 102 can access a profile associated with the user 110 to identity the user's preferred vehicle settings and can provide one or more control signals to the appropriate systems onboard the vehicle 104 (e.g., temperature control system, sound system etc.) to implement the vehicle settings.

At (718), the method 700 can include determining an estimated time of interaction duration between the user and the vehicle. This estimated time can be indicative of the time it will take for the user 110 to interact with the vehicle 102. By way of example, the estimated time of interaction duration can include an estimated board duration (EBD) that is indicative of how long the user 110 may take to load him/herself, children, luggage, etc. into the vehicle 104, to securely fastening seatbelts, and/or undertake other tasks (e.g., for a transportation service). In some implementations, the estimated time of interaction duration can be indicative of how long the user 110 may take to unsecure and remove an item from the vehicle 104 (e.g., for a delivery service). In some implementations, the estimated time of interaction duration can be indicative of how long the user 110 may take to securely place an item into the vehicle 104 (e.g., for a courier service).

To help determine the estimated time of interaction duration between the user 110 and the vehicle 104, the vehicle computing system 102 can obtain data associated with the user 110. The vehicle computing system 102 can determine the estimated time of interaction duration (e.g., an estimated time of boarding duration for the user 110) based at least in part on the data associated with the user 110. The data associated with the user 110 can include, for example, data indicative of one or more preferences 720 of the user 110 and/or one or more vehicle service parameters 722 associated with the user 110. The preferences 720 can be indicative of the user's destination (e.g., airport, train station, etc.), service type, and/or other information specified by the user 110 (e.g., when requesting the vehicle service). The one or more vehicle service parameters 722 can be indicative of number of passengers, child's car seat request, presence/amount of luggage, etc. The vehicle service parameters 722 can also be specified by the user 110 (e.g., when requesting the vehicle service).

In some implementations, the data associated with the user 110 can include historic data 724 (e.g., indicative of a boarding behavior associated with one or more other users). For example, the historic data 724 can be indicative of historic wait time(s) associated with other users in the geographic area 200 and/or a greater region, similarly situated users, etc. In some implementations, the historic data 724 can be associated with the specific user 110. The historic data 724 can include, for example, previous correlations between changes in the signal strength of an identifier and a user's time to arriving at a vehicle. For example, the historic data 724 can indicate historic RSSI changes as a countdown to user arrival.

At (726), the method 700 can include determining an estimated time of user arrival with the vehicle 104. The estimated time of user arrival can include, for example, an estimated time until the user completes boarding of the vehicle 104 (ETCB) (e.g., for a transportation service), an estimated time until the user 110 finishes retrieving an item from the vehicle 104 (e.g., for a delivery service), and estimated time until the user 110 finishes placing an item in the vehicle 104 (e.g., for a courier service), etc. The vehicle computing system 102 can determine an estimated time of user arrival based at least in part on the location data associated with the user device 138. The vehicle computing system 102 can determine the estimated time of user arrival based at least in at part on the estimated time until the user 110 starts interaction with the vehicle 104 and the estimated time of interaction duration (e.g., a sum of these estimated times). By way of example, the vehicle computing system 102 can determine an estimated time until the user 110 completes boarding of the vehicle 102 based at least in part on the location data associated with the user device 110 and the data associated with the user 110. More particularly, the vehicle computing system 102 can determine an estimated time until the user 110 completes boarding of the vehicle 104 based at least in part on the estimated time until the user 110 starts boarding the vehicle 104 and the estimated time of boarding duration for the user 110. The vehicle computing system 102 can determine the estimated time until the user 110 completes boarding of the vehicle 104 via the addition of these two time estimates (e.g., ETCB=ETSB+EBD). In this way, the vehicle computing system 102 can determine the amount of time that the object(s) within its surroundings would be impacted as the vehicle 104 waits for the user 110 (e.g., how long other vehicles would be caused to stop while waiting for the user 110 to board the vehicle 104).

In some implementations, in order to determine whether the estimated time of user arrival (e.g., the estimated time until the user 110 completes boarding of the vehicle 104) is acceptable, the vehicle computing system 102 can compare the estimated time for interaction between the user 110 and the vehicle 104 (e.g., the estimated time until the user 110 completes boarding of the vehicle 104) to a time constraint 750. The time constraint 750 can be expressed as a time threshold (e.g., indicating an acceptable amount of stopping time) and/or cost data (e.g., cost functions expressing a cost in relation to stopping time). This can allow the vehicle computing system 102 to determine whether the amount of stopping time is acceptable.

Similar to the traffic constraint 506, the time constraint 750 can be based on historic data (e.g., indicating historic wait times), real-time data (e.g., indicating that the vehicles are already waiting due to another traffic build-up in front of the autonomous vehicle), expectations of individuals in the geographic area, machine-learned model(s), and/or other information. For example, in the event that there is already a traffic jam in front of the vehicle 104, the time constraint 750 (e.g., indicative an acceptable wait time) can be higher.

In some implementations, the time constraint 750 can be determined at least in part from a model, such as a machine-learned model. For example, the machine-learned model can be or can otherwise include one or more various model(s) such as, for example, models using boosted random forest techniques, neural networks (e.g., deep neural networks), or other multi-layer non-linear models. Neural networks can include recurrent neural networks (e.g., long short-term memory recurrent neural networks), feed-forward neural networks, and/or other forms of neural networks. For instance, supervised training techniques can be performed to train the model (e.g., using historical wait time data) to determine a time constraint 750 based at least in part on input data. The input data can include, for example, the data described herein with reference to FIGS. 7 and 8A-C, driving characteristics of individuals in an associated geographic area, complaints received from operators of vehicles that were caused to stop by autonomous vehicles, etc. The machine-learned model can provide, as an output, data indicative of a recommended time constraint. In some implementations, the recommended time constraint can be specific to the geographic area 200. For example, the model can be trained based at least in part on data associated with geographic area 200 such that the recommended time constraint is specific for that particular region.

Additionally, or alternatively, one or more time estimates of FIG. 7 can be based at least in part on a model. The vehicle computing system 102 can obtain data descriptive of the model (e.g., machine learned model). The vehicle computing system 102 can provide input data to the model. The input data can include the one or more of the types of data described herein with reference to FIGS. 7 and 8A-C. For example, the model can determine an estimated time of user arrival (e.g., an estimated time until the user 110 completes boarding of the vehicle 104 (ETCB)), an estimated time until the user 110 starts interaction with the vehicle 104 (e.g., an estimate time until the user 110 starts boarding the vehicle 104 (ETSB)), and/or an estimated time of interaction duration between the user 110 and the vehicle 104 (e.g., an estimated time of boarding duration for a user 110 (EBD)). For example, the estimated time of user arrival to the vehicle 104 (e.g., ETSB) can be based at least in part on the input data (e.g., the user's location, heading, distance, altitude, etc.). In some implementations, the model can analyze the input data with respect to the time constraint 750 to determine whether the estimated time of user arrival (e.g., the estimated time until the user 110 completes boarding of the vehicle 104 (ETCB)) is high or low, significant or insignificant, acceptable or unacceptable, etc. The output of such a model can be the estimated time for interaction between the user 110 and the vehicle 104 (e.g., the estimated time until the user 110 completes boarding of the vehicle 104 (ETCB)) and/or whether it is high or low, significant or insignificant, acceptable or unacceptable, etc.

In some implementations, the output of the model can be provided as an input to the model for another set of data (e.g., at a subsequent time step). In such fashion, confidence can be built that a determined time estimate is the accurate. Stated differently, in some implementations, the process can be iterative such that the time estimate can be recalculated over time as it becomes clearer what the time estimate is with respect to the user 110. For example, the model can include one or more autoregressive models. In some implementations, the model can include one or more machine-learned recurrent neural networks. For example, recurrent neural networks can include long or short-term memory recurrent neural networks, gated recurrent unit networks, or other forms of recurrent neural networks.

Returning to FIG. 6, the vehicle computing system 102 can determine one or more vehicle actions based at least in part on at least one of the estimated traffic impact 504 or the estimated time of user arrival (e.g., one and/or both of the estimates). In some implementations, the vehicle computing system 102 can determine the vehicle action(s) based at least in part on the estimated traffic impact 504. By way of example, the vehicle action(s) can include stopping within the vicinity 206 of the location 202 associated with the user 110 (e.g., at least partially in the travel way 600). In the event that the level of traffic (e.g., the number of other vehicles that would be impacted by an in-lane stop) is below a traffic threshold (e.g., the estimated traffic impact 504 is low), the vehicle computing system 102 can determine that the vehicle 104 can stop within the travel way 600 to wait for the user 110 to arrive at the vehicle 104. In some implementations, the vehicle computing system 102 can determine the vehicle action(s) based at least in part on the estimated time of user arrival. For instance, in the event that the estimated time of user 702 arrival is below the time constraint 706 (e.g., the estimated time of user arrival is low), the vehicle computing system 102 can determine that the vehicle 104 can stop at least partially within the travel way 600. Such a stop can occur, for example, as close as possible (e.g., for the vehicle 104) to the location 202 associated with the user 110.

In some implementations, the vehicle computing system 102 can base its determination to stop at least partially within the travel way 600 on both the estimated traffic impact 504 and the estimated time of user arrival. For instance, vehicle computing system 102 can weigh each of these estimates to determine whether it would be appropriate for the vehicle 104 to stop at least partially in the travel way 600 to wait for the user 110. The vehicle computing system 102 can apply a first weighting factor to the estimated traffic impact 504 and a second weighting factor to the estimated time of user arrival. The first weighting factor can be different than the second weighting factor. In some implementations, the first weighting factor can be inversely related to the second weighting factor. An example equation can include: ETI*w1+ETUR*w2, where "ETI" is the estimated traffic impact 504, "w1" is the first weighing factor (e.g., 0 to 1), "ETUR" is the estimated time to user arrival 702, and "w2" is the second weighting factor (e.g., 0 to 1). By way of example, the estimated traffic impact 504 may be high while the estimated time of user arrival may be short. Accordingly, the vehicle computing system 102 may determine that it can stop within the travel way 600 because although a higher number of objects (e.g., other vehicles) may be caused to stop, it would only be for a short period of time because the user 110 is close in distance to and/or quickly heading toward the vehicle 104. In such a case, the estimated time of user arrival can be given a greater weight than the estimated traffic impact 504. In another example, the estimated impact on traffic 504 may be low while the estimated time of user arrival may be long. Accordingly, the vehicle computing system 102 can determine that it should not stop within the travel way 600 because although only a few objects (e.g., other vehicles) may be caused to stop, it would be for a greater period of time because the user 110 is farther from (and/or moving slowly, moving away from, etc.) the vehicle 104. In such a case, the estimated time of user arrival can be given a greater weight than the estimated traffic impact 504. In some implementations, the first and second weighting factors can be manually and/or automatically adjusted depending on the circumstances (e.g., a VIP user is being provided the vehicle services) and/or the geographic area 200.

In some implementations, the estimated traffic impact 504 can be adjusted based at least in part on the estimated time to user arrival 702. For instance, in the event that the estimated time to user arrival 702 is long, the estimated traffic impact 504 can be higher.

With reference again to FIG. 2, the vehicle computing system 102 can also, or alternatively determine that the vehicle 104 is to enter into a holding pattern. For instance, the vehicle action(s) can include traveling along a second vehicle route 208 (e.g., an optimal holding pattern route). In some implementations, the vehicle computing system 102 can cause the vehicle 104 to enter into a particular operating mode in which the vehicle 104 implements a holding pattern (e.g., a holding pattern operating mode). The vehicle 104 may be unable to find a parking location before and/or after travelling passed the location 202 associated with the user 110. Additionally, the vehicle 104 may determine that it should not stop within a travel way 600 to wait for the user's arrival, as described herein. Thus, the vehicle 104 can be re-routed along a second vehicle route 208 that is at least partially different than the first vehicle route. The second vehicle route 208 can be a path along which the vehicle 104 can travel to re-arrive within the vicinity 206 of the location 202 of the user 110. For example, the second vehicle route 208 can be a path along which the vehicle 104 can travel around a block, back to the location associated with the user. In some implementations, such a path may be similar to and/or the same as a portion of the first vehicle route 204 (e.g., along the street associated with the user 110). In some implementations, the second vehicle route 208 can be completely different from the first vehicle route 204 such that no portion of the second vehicle route 208 overlaps with the first vehicle route 204.

Figure 9:
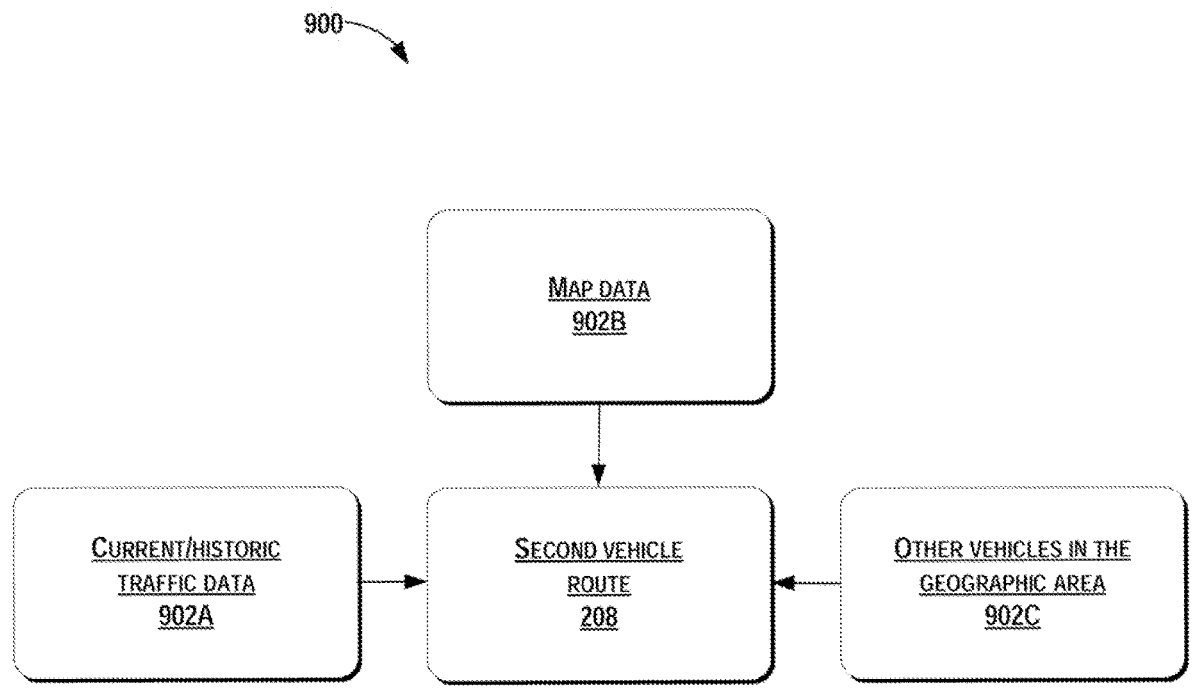
FIG. 9 depicts example information associated with a second vehicle route according to example embodiments of the present disclosure.

The determination of the second vehicle route 208 can be based on a variety of information. For example, FIG. 9 depicts example information 900 associated with a second vehicle route 208 according to example embodiments of the present disclosure. In some implementations, the vehicle computing system 102 can determine the second vehicle route 208 based at least in part on such information. In some implementations, the second vehicle route 208 can be determined off-board the vehicle 104 by another computing system (e.g., the operations computing system 106) and data indicative of the second vehicle route 208 can be provided to the vehicle computing system 102.

The second vehicle route 208 can be determined based at least in part on current and/or historic traffic data 902A. For example, the second vehicle route 208 can be determined to implement the route that will allow the vehicle 104 to arrive back within the vicinity 206 of the location 202 of the user 110 within the shortest amount of time and/or distance. The second vehicle route 208 can take into account the current traffic (and/or historic traffic patterns) within the geographic area 200 such that the vehicle 104 is minimally impeded by such traffic (e.g., such that the second vehicle route 208 is the fastest and/or shortest vehicle route to the location 202 of the user 110).

Additionally, or alternatively, the second vehicle route 208 can be determined based at least in part on map data 902B. For example, the map data 902B can be used to determine the path (e.g., roads, other terrain, etc.) the vehicle 104 is to travel along to arrive back within the vicinity 206 of the user 110.

In some implementations, the second vehicle route 208 can be based on data 902C associated with other vehicle(s) in the geographic area 200. For instance, the data 902C associated with other vehicle(s) can include additional traffic data associated with the geographic area 200 (e.g., indicating a certain road is impeded by heavy traffic). The data 902C associated with the other vehicle(s) can also include the location of such vehicles. For example, the vehicle computing system 102 and/or the operations computing system 106 can determine the second vehicle route 208 (e.g., optimal vehicle holding pattern) by processing map data and traffic data to establish an estimated time back to the location 202 associated with the user 110. If another vehicle (e.g., another autonomous vehicle in an associated fleet) can arrive at the location 202 associated with the user 110 in a shorter time period than the vehicle 104, the other vehicle (rather than the vehicle 104) can be routed to the location 202. If the vehicle 104 would arrive to the location 202 the fastest, then the vehicle 104 can be routed in accordance with the second vehicle route 208. In some implementations, the second vehicle route 208 can be based on a model, such as a machine-learned model, in a manner similar to that described herein with respect to the estimated traffic impact 504, the estimated time to user arrival 702, etc.

In some implementations, the vehicle computing system 102 can determine that the vehicle 104 can stop within the travel way 600, but later determine that the vehicle 104 should begin to travel again (e.g., according to a holding pattern route). For example, the vehicle computing system 102 can determine that it would be appropriate for the vehicle 104 to stop at least partially within the travel way 600 to wait for the user 110 based at least in part on the estimated traffic impact 504 and/or the estimated time of user arrival, as described herein. The vehicle computing system 102 can be configured to update (e.g., continuously, periodically, as scheduled, in real-time, in near real-time, etc.) the estimated traffic impact 504 and/or the estimated time of user arrival. For example, while the vehicle 104 is stopped, the traffic impact may increase (e.g., due to an increase in the number of other vehicle(s) stopped behind the vehicle 104) and/or the user 110 may take longer than estimated to arrive at the vehicle 104. The vehicle computing system 102 can determine at least one of an updated estimated traffic impact (e.g., based on the number of vehicles that have already stopped and/or additional vehicles that may be caused to stop) or an updated estimated time of user arrival (e.g., based on a change in the user device location data, if any). The vehicle computing system 102 can determine that the vehicle 104 can no longer remain stopped to wait for the user 110 based at least in part on at least one of the updated estimated traffic impact or the updated estimated time of user arrival. Accordingly, the vehicle computing system 102 can cause the vehicle 104 to travel along the second vehicle route 208 based at least in part on at least one of the updated estimated traffic impact or the updated estimated time of user arrival.

The vehicle computing system 102 can cause the vehicle 104 to perform one or more vehicle action(s). As described herein, the vehicle action(s) can include at least one of stopping the vehicle 104 (e.g., at least partially within the travel way 600) within the vicinity 206 of the location 202 associated with the user 110 or travelling along a second vehicle route 208. In the event that the one or more vehicle actions include stopping the vehicle 104 within the vicinity 206 of the location 202 associated with the user 110, the vehicle computing system 102 can cause the vehicle 104 to stop. For example, the vehicle computing system 102 can provide one or more control signals to a control system 116 of the vehicle 104 (e.g., braking control system) to cause the vehicle 104 to decelerate to a stopped position that is at least partially in a travel way 600 within the vicinity 206 of the location 202 associated with the user 110. In the event that the vehicle computing system 102 has determined that the vehicle 104 is to travel along a second vehicle route 208 (e.g., in accordance with the holding pattern), the vehicle computing system 102 can obtain data associated with the second vehicle route 208 and implement the second vehicle route 208 accordingly. For example, the vehicle computing system 102 can request and obtain data indicative of the second vehicle route 208 from the operations computing system 106. Additionally, or alternatively, the vehicle computing system 102 can determine the second vehicle route 208 onboard the vehicle 104. The vehicle computing system 102 can provide one or more control signals to cause the vehicle 104 to implement a motion plan that causes the vehicle 104 to travel in accordance with the second vehicle route 208 (e.g., to implement one or more vehicle trajectories in accordance with the second vehicle route 208).

The vehicle computing system 102 can provide the user 110 with one or more communications indicating the actions performed by (or to be performed by) the vehicle 104. For example, in the event that the vehicle 104 does not find a parking location and does not stop in the travel way, the vehicle computing system 102 can provide, via the communication system 136, a communication to the user device 138 associated with the user 110. The communication can include, for example, a textual message, auditory message, etc. that indicates the vehicle actions (e.g., "I could not locate you at the pin drop, traffic forced me to go around the block. Please proceed to the pin drop").

Figure 10:
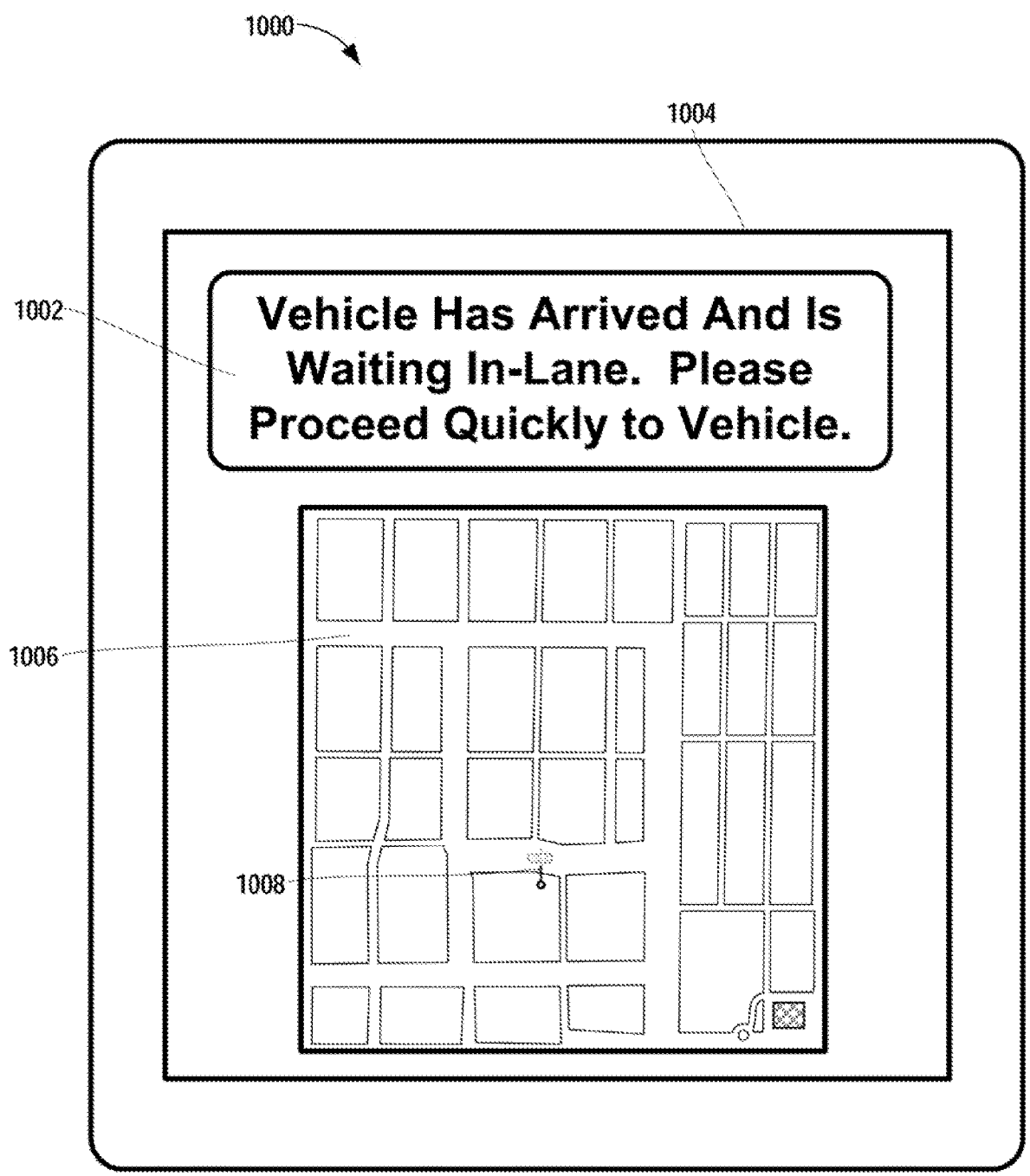
FIG. 10 depicts an example display device with an example communication according to example embodiments of the present disclosure.

In the event that the vehicle 104 stops at least partially within the travel way 600, the vehicle computing system 102 can provide a communication (e.g., data) to a user device 138 associated with the user 110. The communication can indicate that the vehicle 104 is travelling to return to the location 202 associated with the user 110. In response to receiving such a communication, the user device 138 associated with the user 110 can display a user interface indicative of the communication. For example, FIG. 10 depicts an example display device 1000 with an example communication 1002 according to example embodiments of the present disclosure. The display device 1000 (e.g., display screen) can be associated with the user device 138 associated with the user 110. The communication 1002 can be presented via a user interface 1004 on the display device 1000. The communication 1002 can indicate that the vehicle 104 has arrived and is waiting in the travel way (e.g., in a current traffic lane). In some implementations, the communication 1002 and/or another portion of the user interface 1004 can be indicative of a location of the vehicle 104. For example, the display device 1000 can display a map user interface 1006 that includes a user route 1008. The user route 1008 can be a route along which a user 110 can travel to arrive at the vehicle 104.

Returning to FIG. 2, in some implementations, the vehicle 104 may be relieved of its responsibility to provide a vehicle service to the user 110. For instance, in the event that a vehicle computing system 102 (and/or operations computing system 106) determines that a vehicle 104 is to travel along the second vehicle route 208, such computing system(s) can determine whether it would be advantageous (e.g., more time efficient, more fuel efficient, etc.) for another vehicle 210 (e.g., another autonomous vehicle) within the geographic area 200 to be routed to the user 110. In the event that it would be advantageous (e.g., because the other vehicle 210 can arrive sooner), the operations computing system 106 can provide data to the vehicle 104 indicating that the vehicle 104 is no longer responsible for the request 140. The other vehicle 210 can be routed to the user 110 in the manner described herein. Additionally, or alternatively, the operations computing system 106 (and/or the vehicle computing system 102 of the vehicle 104) can re-route the vehicle 104 to provide a vehicle service to another user.

In some implementations, the vehicle computing system 102 can cancel the request 140 associated with the user 110. By way of example, the vehicle 104 may be caused to re-route (e.g., circle the block) a certain number of times and/or the user 110 may not arrive at the vehicle 104 within a certain timeframe. The vehicle computing system 102 can determine whether to cancel the request 140 based at least in part on a vehicle service cancellation threshold.

Figure 11:
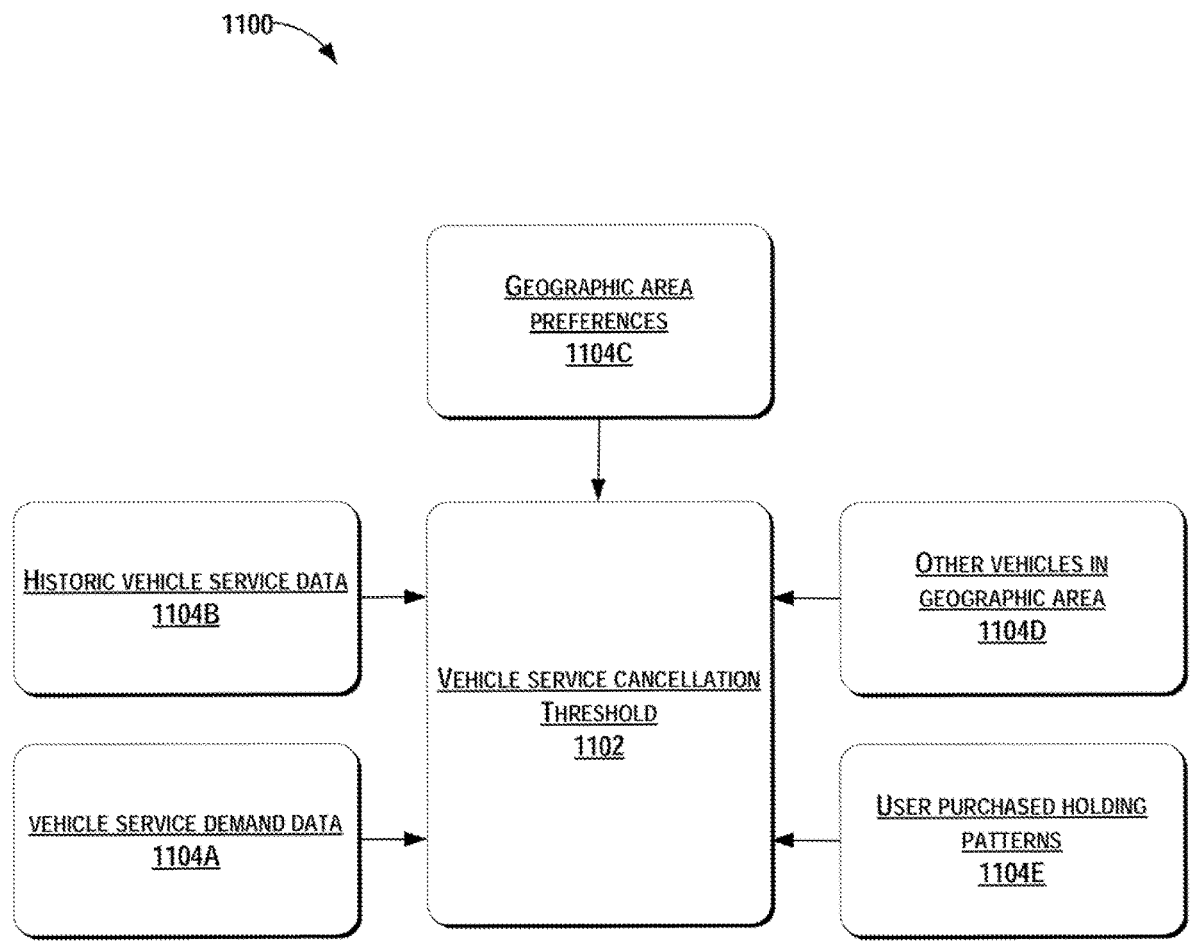
FIG. 11 depicts example information associated with a vehicle service cancellation threshold according to example embodiments of the present disclosure.

FIG. 11 depicts example information 1100 associated with a vehicle service cancellation threshold 1102 according to example embodiments of the present disclosure. The vehicle service cancellation threshold 1102 can be indicative of a threshold time and/or distance that the vehicle 104 is in the holding pattern. For instance, the vehicle service cancellation threshold 1102 can be indicative of a time between when the vehicle 104 initially arrived within a vicinity 206 of the user 110 (and/or passed the location 202) to the current time. Additionally, or alternatively, the vehicle service cancellation threshold 1102 can be indicative of a distance travelled by the vehicle 104 while in a holding pattern (e.g., number of times the vehicle is re-routed to arrive at the user 110). The vehicle service cancellation threshold 1102 can be determined and updated continuously, periodically, as scheduled, on request, in real-time, in near real-time, etc. (e.g., per trip, while on a trip, etc.). The vehicle service cancellation threshold 1102 can be determined by the vehicle computing system 102 and/or offboard the vehicle 104 and provided to the vehicle computing system 102.

The information 1100 can include vehicle service demand data 1104A, historic vehicle service data 1104B, geographic area preferences 1104C, data 1104D associated with other vehicle(s) within the geographic area, user selected holding patterns 1104E, and/or other types of information. The vehicle service demand data 1104A can include a current level of demand (e.g., number of current service requests) for vehicle services (e.g., within the geographic area 200). Additionally, or alternatively, the vehicle service demand data 1104A can include a historic level of demand for vehicle services at a certain time, day, etc. (e.g., within the geographic area, similarly situated area, etc.). In the event that the demand is lower, the vehicle service cancellation threshold 1102 can be higher (e.g., because the vehicle 104 may not be needed for other vehicle service requests). In the event that the demand is higher, the vehicle service cancellation threshold 1102 can be lower (e.g., because the vehicle 104 may be needed for other vehicle service requests).

The historic vehicle service data 1104B can be associated with the specific user 110 and/or one or more other user(s). For example, the historic vehicle service data 1104B can indicate that the user 110 typically takes a longer amount of time to arrive at the vehicle 104 (e.g., due to a disability). As such, the vehicle service cancellation threshold 1102 can be higher in order to cause the vehicle 104 to remain in the holding pattern longer, thereby giving the user 110 a greater opportunity to arrive at the vehicle 104. Additionally, or alternatively, the historic vehicle service data 1104B can indicate that it generally takes user(s) of within the geographic area 200 longer to arrive at the vehicle 104. As such, the vehicle service cancellation threshold 1102 may be higher. In the event that the historic vehicle service data 1104B indicates that the user 110 (and/or other user(s)) typically arrives at the vehicle 104 in a relatively short timeframe, the vehicle service cancellation threshold 1102 may be lower.

The geographic area preferences 1104C can be descriptive of the preferences associated with a geographic area 200 (e.g., as indicated by the managers of the geographic area 200). For example, the geographic area 200 may prefer that a vehicle 104 only remain in a holding pattern (e.g., circle the block) for a certain time period and/or distance so as not to affect local traffic.

In some implementations, the vehicle service cancellation threshold 1102 can be based at least in part on data 1104D associated with one or more other vehicles (e.g., other autonomous vehicles in an associated fleet). For example, the data 1104D can be indicative of the location(s) of other vehicle(s) (e.g., within the geographic area 200) and/or whether the other vehicle(s) are available to provide a vehicle service (e.g., whether or not the other vehicle is assigned to a service request, currently providing a vehicle service, etc.). In the event that another vehicle is located close to the location 202 associated with the user 110, the vehicle service cancellation threshold 1102 may be lower (e.g., because the user 110 can be serviced by the other vehicle in the event a new request is made after cancellation). In the event that another vehicle is not located close to the location 202 associated with the user 110, the vehicle service cancellation threshold 1102 may be higher (e.g., because another vehicle is not readily available in the event the user 110 makes a new request after cancellation).

In some implementations, the vehicle service cancellation threshold 1102 can be based at least in part on user selected holding patterns 1104E. The user selected holding patterns 1104E can include data indicative of a vehicle service cancellation threshold 1102 selected by a user 110. For example, the user 110 can purchase (e.g., via a user interface associated with a software application) a higher vehicle service cancellation threshold 1102, such that the vehicle 104 will remain in the holding pattern (e.g., circle the block) for a longer time/distance before the vehicle service request is cancelled. In some implementations, a user 110 can have a higher vehicle service cancellation threshold 1102 due to a higher user rating, specialized treatment (e.g., frequent user), and/or based on other conditions.

In some implementations, the vehicle service cancellation threshold 1102 can be based at least in part on a model, such as a machine learned model. For example, the model can be trained based on previously obtained information 1100 and labeled data indicative of the vehicle service cancellation thresholds associated therewith. In a manner similar to that described herein for the estimated traffic impact 504 and the estimated time of user arrival, the vehicle computing system 102 (or other computing system) can provide input data (e.g., the information 1100) into such a model and receive, as an output, a recommended vehicle service cancellation threshold.

The vehicle computing system 102 can cancel the request 140 associated with the user 110 in the event that the user 110 has not arrived at the vehicle 104 and the vehicle 104 has exceeded the vehicle service cancellation threshold 1102. In response, the vehicle computing system 102 can provide data indicating that the request 140 for the vehicle service provided by the vehicle 104 is cancelled to the operations computing system 106 (and/or one or more other computing devices that are remote from the vehicle computing system 102). In some implementations, such data can request the cancellation of the user's service request 140. The operations computing system 106 can cancel the service request 140 (and inform the user 110 accordingly) and/or re-route the vehicle 104 to provide a vehicle service to another user. In some implementations, the vehicle computing system 102 can communicate directly with a user device 138 associated with the user 110 to cancel the service request 140 and/or inform the user 110 of the vehicle service cancellation. The vehicle computing system 102 can report such a cancellation to the operations computing system 106.

Figure 12:
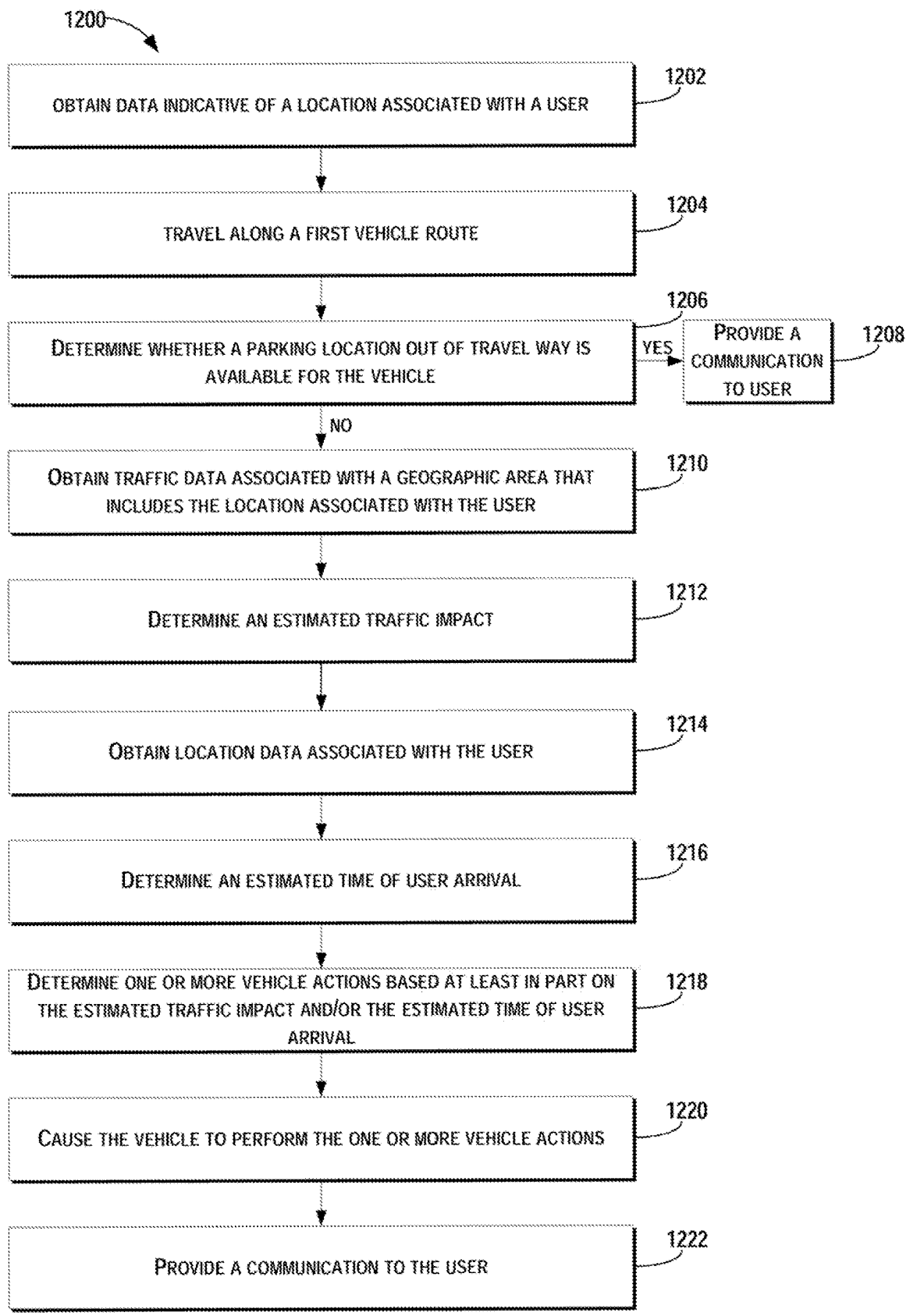
FIG. 12 depicts a flow diagram of an example method of controlling autonomous vehicles according to example embodiments of the present disclosure.

FIG. 12 depicts a flow diagram of an example method 1200 of controlling autonomous vehicles according to example embodiments of the present disclosure. One or more portion(s) of the method 1200 can be implemented by one or more computing devices such as, for example, the one or more computing device(s) of the vehicle computing system 102 and/or other systems. Each respective portion of the method 1200 (e.g., 1202-1222) can be performed by any (or any combination) of the one or more computing devices. Moreover, one or more portion(s) of the method 1200 can be implemented as an algorithm on the hardware components of the device(s) described herein (e.g., as in FIGS. 1 and 14), for example, to control an autonomous vehicle. FIG. 12 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (1202), the method 1200 can include obtaining data indicative of a location associated with a user. For instance, the vehicle computing system 102 can obtain data 142 indicative of a location 202 associated with a user 110 to which the vehicle 104 is to travel. The vehicle 104 is to travel along a first vehicle route 204 that leads to the location 202 associated with the user 110. As described herein, the user 110 can be associated with a request 140 for a vehicle service. The vehicle computing system 104 and/or the operations computing system 106 can determine the first vehicle route 204 so that the vehicle 104 can travel to the user 110 to provide the user 110 with the requested vehicle service (e.g., pick up the user 110 for a transportation service, deliver an item for a delivery service, receive an item for courier service, and/or provide another service).

At (1204), the method 1200 can include travelling along a first vehicle route. A human operator may not be located within the vehicle 104. The vehicle computing system 102 can provide one or more control signals to the motion planning system 128 and/or the vehicle's control systems 116 to cause the vehicle 104 to plan its motion and/or implement a motion plan to travel in accordance with first vehicle route 204 (e.g., autonomously, without input from a human operator to the vehicle 104).

The first vehicle route 204 can bring the vehicle 104 within the vicinity 206 of the location 202 associated with the user 110. The vicinity of the location 202 associated with the user 110 can be defined at least in part by a distance from the location 202 associated with the user 110. In some implementations, the distance from the location 202 associated with the user 110 can be based at least in part on an acceptable walking distance 302 from the location 202 associated with the user 110, as described herein.

At (1206), the method 1200 can include determining whether a parking location out of a travel way is available for the vehicle. For instance, the vehicle computing system 102 can determine whether a parking location within the vicinity 206 of the location 202 associated with the user 110 is available for the vehicle 104 (e.g., based on sensor data 118, map data 120, etc.). The vehicle computing system 102 may search for a parking location while the vehicle 104 is in an approach operating mode 108D, as described herein. The vehicle computing system 102 may search for a parking location before and/or after the vehicle 104 passes the location 202 associated with the user 110. In the event that the vehicle computing system 102 is able to identify an available parking location, the method 1200 can include sending a communication to a user 110 to indicate that the vehicle 104 has arrived and the location of the vehicle 104. Once the user has arrived at the vehicle 104, the vehicle 104 can provide the vehicle service to the user 110. In some implementations, the vehicle computing system 102 can determine that a parking location that is out of the travel way 600 is unavailable for the vehicle 104.

At (1210), the method 1200 can include obtaining traffic data associated with the geographic area that includes the location associated with the user. The vehicle computing system 102 can obtain traffic data 500 associated with a geographic area 200 that includes the location 202 associated with the user 110. The traffic data 500 can be associated with the vicinity 206 of the location 202 (e.g., a block, neighborhood, etc. where the user 110 is located) and/or other portions of the geographic area 200. For instance, the vehicle computing system 102 can obtain, via one or more sensors 112 of the vehicle 104, sensor data 118 associated with the surrounding environment of the vehicle 104 that is within the vicinity 206 of the location 202 associated with the user 110. The vehicle computing system 102 can determine a level of traffic based at least in part on the sensor data 118, as described herein.

At (1212), the method 1200 can include determining an estimated traffic impact. For instance, the vehicle computing system 102 can determine an estimated traffic impact 504 of the vehicle 104 on the geographic area 200 based at least in part on the traffic data 500. The estimated traffic impact 504 can be indicative of an estimated impact of the vehicle 104 on one or more objects within a surrounding environment of the vehicle 104 in the event that the vehicle 104 were to stop at least partially in the travel way 600 (e.g., a current lane 602) within the vicinity 206 of the location 202 associated with the user 110. In some implementations, to determine the estimated traffic impact 504, the vehicle computing system 102 can compare the level of traffic (e.g., determined based at least in part on the sensor data, other traffic data) to a traffic constraint 506. The traffic constraint 506 can include a traffic threshold indicative of a threshold level of traffic. In some implementations, the traffic constraint can be determined at least in part from a machine-learned model, as described herein.

At (1214), the method 1200 can include obtaining location data associated with a user. For instance, the vehicle computing system 102 can obtain location data associated with a user device 138 (e.g., mobile device) associated with the user 110, as described herein. The location data associated with the user device 138 can be indicative of one or more locations of the user device 138 associated with the user 110 at one or more times.

At (1216), the method 1200 can include determining an estimated time of user arrival. For instance, the vehicle computing system 102 can determine an estimated time of user arrival based at least in part on the location data associated with the user device 138. The estimated time of user arrival can be indicative of an estimated time at which the user 110 will arrive at the vehicle 104.

At (1218), the method 1200 can include determining one or more vehicle actions based at least in part on the estimated traffic impact and/or the estimated time of user arrival. For instance, the vehicle computing system 102 can determine one or more vehicle actions based at least in part on the estimated traffic impact 504. The vehicle computing system 102 can determine the one or more vehicle actions also, or alternatively, based at least in part on the estimated time of user arrival. The one or more vehicle actions can include at least one of stopping the vehicle 104 at least partially in a travel way 600 within a vicinity 206 of the location 202 associated with the user 110 or travelling along a second vehicle route 208 (e.g., entering into a vehicle holding pattern). The second vehicle route 208 can be at least partially different from the first vehicle route 204. The second vehicle route 208 can include a route that leads to the location 202 associated with the user 110 (or at least to a vicinity 206 of the location 202).

At (1220), the method 1200 can include causing the vehicle to perform the one or more vehicle actions. For instance, the vehicle computing system 102 can cause the vehicle 104 to perform the one or more vehicle actions. To do so, the vehicle computing system 102 can provide one or more control signals to one or more systems onboard the vehicle 104 to cause the vehicle 104 to perform the vehicle action(s) (e.g., to stop in the travel way 600, enter the vehicle holding pattern).

At (1222), the method 1200 can include providing a communication to the user. For instance, the vehicle computing system 102 can provide a communication to a user device 138 associated with the user 110 that is indicative of a vehicle action. By way of example, in the event that the vehicle 104 stops at least partially within a travel way 600 within the vicinity 206 of the location 202 associated with the user 110, the vehicle computing system 102 can provide, to the user device 138 associated with the user 110, a communication indicating that the vehicle 104 is stopped (and/or will stop). In response to receiving the communication, the user device 138 can display a map user interface 1006 that indicates a vehicle location of the vehicle 104 and a user route 1008 to the vehicle location of the vehicle 104. In the event that the vehicle 104 travels in accordance with the second vehicle route 208, the vehicle computing system can provide a communication to the user device 138 associated with the user 110 indicating that the vehicle 104 is travelling to return to the location 202 associated with the user 110.

Figure 13A:
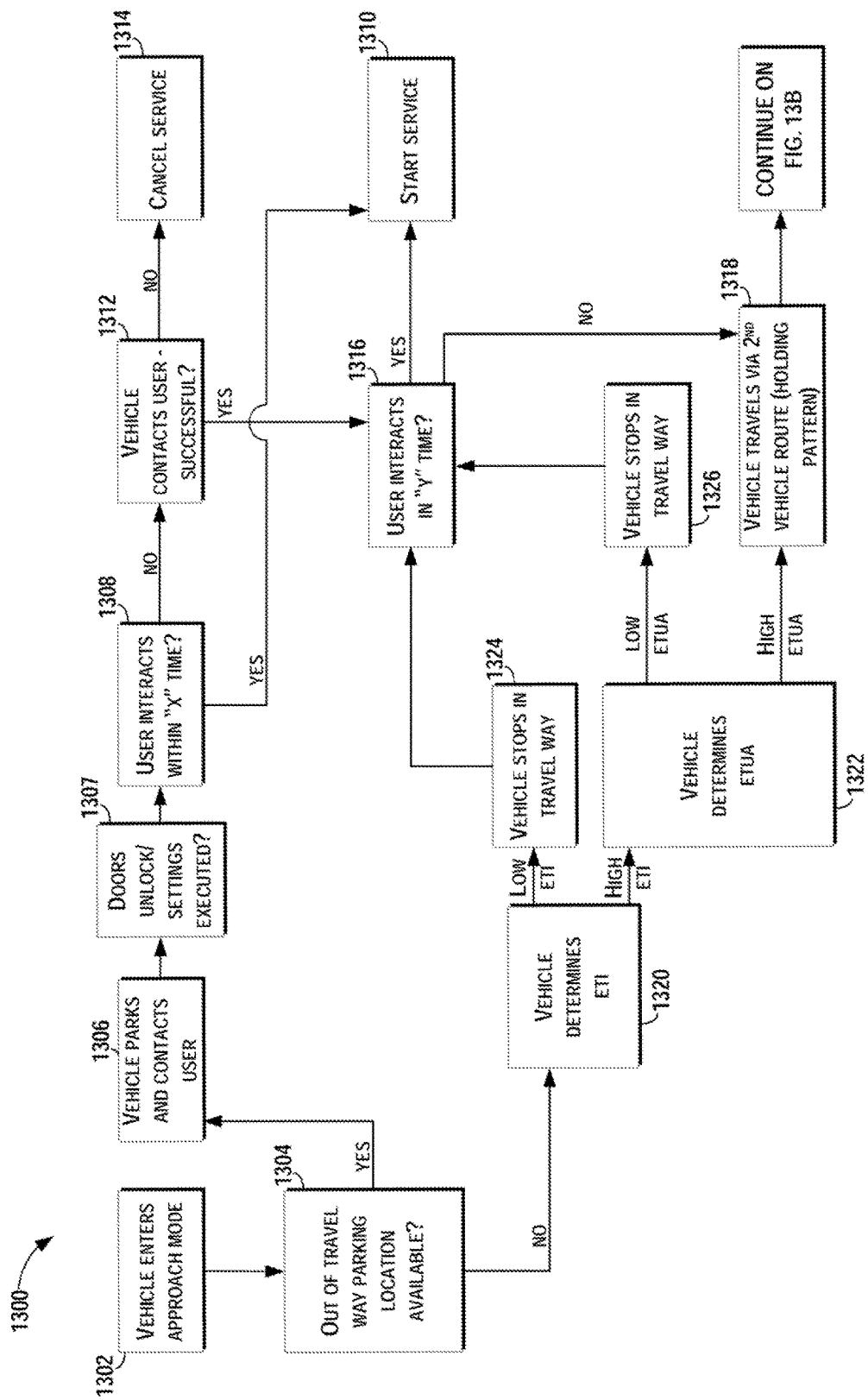
FIGS. 13A-B depict a flow diagram of an example method of controlling autonomous vehicles according to example embodiments of the present disclosure.
Figure 13B:
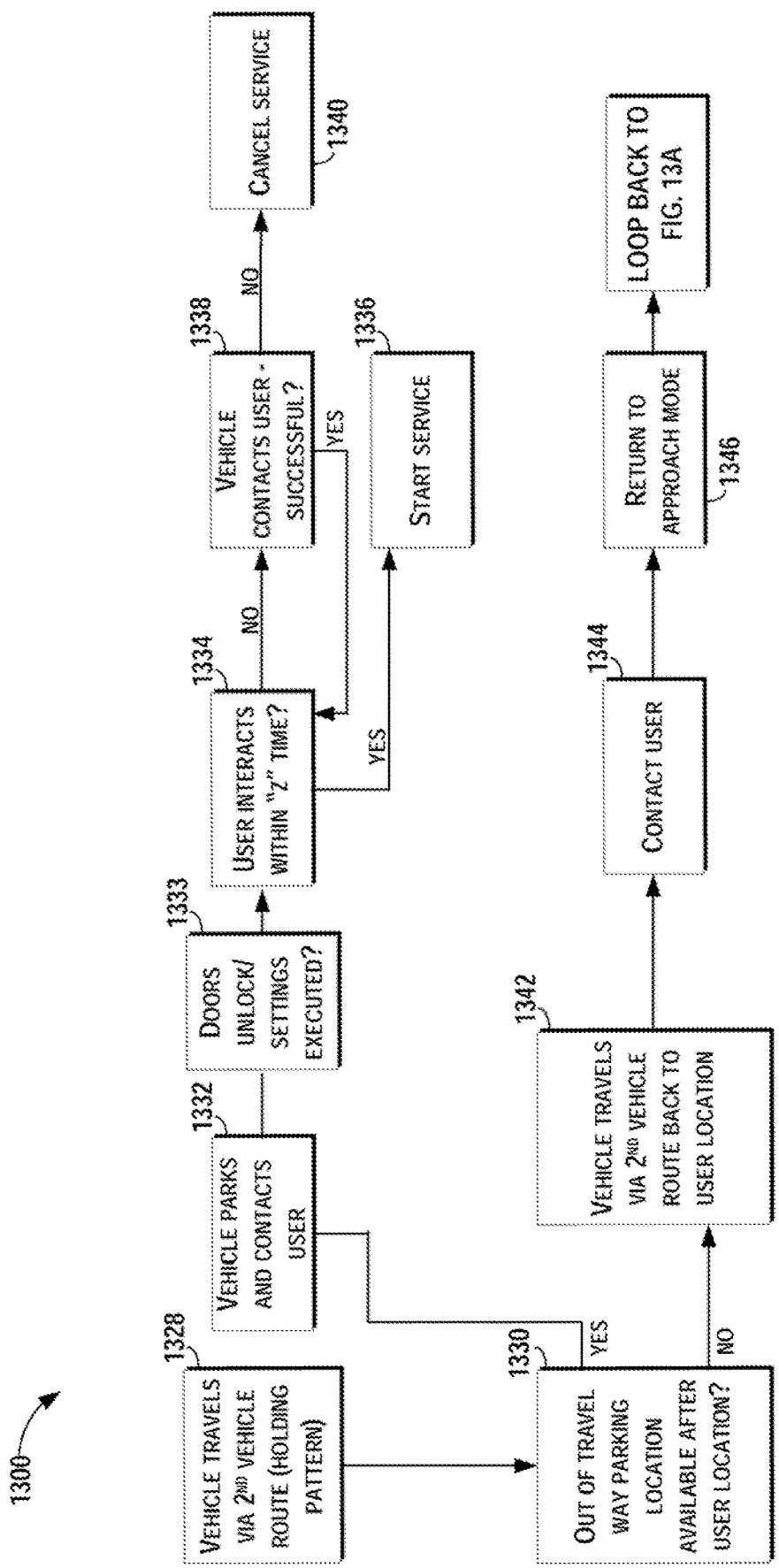

FIGS. 13A-B depict a flow diagram of an example method 1300 of controlling autonomous vehicles according to example embodiments of the present disclosure. One or more portion(s) of the method 1300 can be implemented by one or more computing devices such as, for example, the one or more computing device(s) of the vehicle computing system 102 and/or other systems. Each respective portion of the method 1300 (e.g., 1302-1346) can be performed by any (or any combination) of the one or more computing devices. Moreover, one or more portion(s) of the method 1300 can be implemented as an algorithm on the hardware components of the device(s) described herein (e.g., as in FIGS. 1 and 14), for example, to control an autonomous vehicle. FIGS. 13A-B depicts elements performed in a particular order for purposes of illustration and discussion.

At (1302) of FIG. 13A, the vehicle 104 can enter into an approach operating mode 108D. For example, a vehicle computing system 102 can obtain data 142 indicative of a location 202 associated with a user 110. The vehicle computing system 102 can cause the vehicle 104 to travel in accordance with a first vehicle route 204 to arrive within a vicinity 206 of the location 202 associated with the user 110. The vehicle 104 can enter into the approach mode 108D, for example, when it is within the vicinity 206 of the location 202. The vehicle 104 can approach the location 202 associated with the user 110 in the approach operating mode 108D. Moreover, the vehicle computing system 102 can send accurate (e.g., localized) approach data (e.g., through a network) to a software application running on a user device 138 associated with the user 110. The software application can cause the user device 138 to display a user interface via a display device. The user interface can display a map interface with the user's position (e.g., based on GPS) and a precise location approach (e.g., of the vehicle 104), as well as a target location of the vehicle 104 to meet the user 110. The user interface can also alert the user 110 that the vehicle 104 is arriving (e.g., "your vehicle is arriving, please prepare to board").

In some implementations, the vehicle 104 can each include an outwardly visible lighting element, such as a number or array of LED lights capable of producing rapid flash patterns. For example, the lighting element can be located within the interior and viewable through the front of the vehicle (e.g., windshield), and/or can be located on the exterior of the vehicle 104. When the vehicle 104 is assigned (or accepts) a service request, the operations computing system 106 can transmit a flash code to the vehicle 104 and the requesting user device 138. As the vehicle 104 approaches the pick-up location, the vehicle 104 can output the flash code using the lighting element. The requesting user 110 can be prompted to hold up the user device 138 so that a camera or the camera lens of the user device 138 is pointed towards the vehicle 104 and can detect the flash code (e.g., the camera can be pointed towards the vehicle 104 and the display screen of the mobile device can display a viewfinder or preview of the imagery detected or captured by the camera). Upon detecting the flash code from the vehicle 104, the user device 138 can determine whether the flash code matches the flash code provided by the operations computing system 106 (e.g., utilizing a perception algorithm). If so, the user device 138 can display an indicator, such as a circle or a highlight for the vehicle 104, so that the requesting user 110 can readily identify the vehicle 104.

While in the approach operating mode 108D, the vehicle 104 can search for an available parking location that is out of a travel way 600 (e.g., out of a current travel lane 602), at (1304). For example, the vehicle computing system 102 can search for an out-of-lane parking location when the vehicle 104 is within a certain distance (e.g., an acceptable walking distance 302) from the location 202 associated with the user 110. To do so, the vehicle computing system 102 can utilize the vehicle's sensor(s), as described herein.

In the event an out-of-lane parking location is found, the vehicle computing system 102 can cause the vehicle 104 to park (e.g., autonomously, without user input), at (1306), and send a communication to the user, as described herein. In some implementations, if the estimated time until the user 110 starts interaction with the vehicle 104 (e.g., the estimated time until the user 110 starts boarding the vehicle 104) is low (e.g., less than a few seconds, 1, 2, 3 s, etc.) the vehicle doors can be unlocked and/or user specific vehicle settings (e.g., music, temperature, seat position, etc.) can be implemented, at (1307) (e.g., because boarding is imminent). If the user 110 arrives within a certain time frame (e.g., starts and/or completes boarding, item retrieval, item placement, etc. within "X" time), at (1308), the vehicle 104 can start to provide the user 110 with a vehicle service (e.g., transport the user 110 to a destination location), at (1310). However, if the user 110 does not arrive (e.g., start and/or complete boarding, item retrieval, item placement, etc.) at the vehicle 104 within the time frame, the vehicle computing system 102 can again contact the user 110, at (1312). The contact can be facilitated by the vehicle computing system 102 providing a communication to the user 110 via a software application on the user device 138 (e.g., using a suitable communication protocol). If unsuccessful (e.g., the user 110 is unresponsive, does not travel to vehicle 104), the vehicle computing system 102 can cancel the vehicle service, at (1314), as described herein. However, if the contact is successful, the vehicle 104 can wait another timeframe (e.g., "Y" time) for the user 110 to arrive (e.g., start and/or complete boarding, item retrieval, item placement, etc.), at (1316). The vehicle computing system 102 can cause the vehicle 104 to provide the vehicle service to the user 110, in the event that the user 110 arrives at the vehicle 104 (e.g., boards the vehicle 104). In the event the user 110 does not arrive within "Y" time (e.g., start and/or complete boarding, item retrieval, item placement, etc.), the vehicle 104 can enter into the holding pattern and travel in accordance with the second vehicle route 208, at (1318).

In the event that an out-of-lane parking location is not found, the vehicle computing system 102 can determine at least one of an estimated traffic impact 504 of the vehicle 104 on the geographic area 200 based at least in part on traffic data 500, at (1320) or an estimated time of user arrival based at least in part on the location data associated with the user device 110 as described herein, at (1322). The vehicle computing system 102 can determine the estimated traffic impact 504 to determine if and how long to wait in-lane for the user 110 to arrive at the vehicle 104. As the vehicle 104 moves towards the location 202 associated with the user 110, the vehicle computing system 102 can determine whether the vehicle 104 should stop at the location 202 based at least in part on at least one of the estimated traffic impact 504 or the estimated time to user arrival. For example, the vehicle computing system 102 can start sensing the traffic presence and object speed around the vehicle 104 (e.g., in-lane, behind and ahead of the vehicle 104). Moreover, the vehicle computing system 102 can use RF sensors and/or Bluetooth beacons to determine a user presence, general distance between the user 110 and the vehicle 104, and/or changes in the distance indicating number of seconds from user arrival.

In some implementations, in the event that the estimated traffic impact 504 is low, the vehicle computing system 102 can cause the vehicle 104 to stop in the travel way 600, at (1324). If the user 110 arrives (e.g., start and/or complete boarding, item retrieval, item placement, etc.) within a certain timeframe (e.g., within "Y" time), the vehicle 104 can provide the vehicle service to the user 110. If the user 110 does not arrive (e.g., start and/or complete boarding, item retrieval, item placement, etc.) within the timeframe, the vehicle 104 can enter into the holding pattern.

In some implementations, in the event that the estimated traffic impact 504 is high, the vehicle computing system 102 can determine the estimated time to user arrival. In the event that the estimated time to user arrival is low, the vehicle computing system 102 can cause the vehicle 104 to stop within the travel way 600 (e.g., in a travel lane), at (1326), despite potential traffic build-up. If the user 110 arrives (e.g., starts and/or completes boarding, item retrieval, item placement, etc.) within a certain timeframe (e.g., within "Y" time), the vehicle 104 can provide the vehicle service to the user 110. If the user 110 does not arrive (e.g., start and/or complete boarding, item retrieval, item placement, etc.) within the timeframe, the vehicle 104 can enter into the holding pattern.

With reference to FIG. 13B, the vehicle computing system 102 can cause the vehicle 104 to travel past the location 202 associated with the user 110, at (1328). In some implementations, this can be a portion of the second vehicle route 208. The vehicle computing system 102 can search for a parking location out of the travel way 600 after the vehicle 104 passes the location 202 associated with the user 110, at (1330). This can occur until the vehicle 104 travels a certain distance past the location 202 (e.g., until the vehicle 104 reaches the acceptable walking distance 302). In some implementations, even after the vehicle travels past the location associated with the user 110, if the estimated traffic impact 504 and/or the estimated time of user arrival is low enough the vehicle computing system 102 can cause the vehicle 104 to stop.

In the event that a parking location is found, at (1332), the vehicle computing system 102 can contact the user 110 via the user device 138 (e.g., indicating the location of the vehicle 104 and a user route thereto). The contact can be facilitated by the vehicle computing system 102 providing a communication to the user 110 via a software application on the user device 138 (e.g., "This is as close as I can get. Please come to me"). In some implementations, if the estimated time until the user 110 starts interaction with the vehicle 104 (e.g., the estimated time until the user 110 starts boarding the vehicle 104) is low (e.g., less than a few seconds, 1, 2, 3 s, etc.) the vehicle doors can be unlocked and/or user specific vehicle settings (e.g., music, temperature, seat position, etc.) can be implemented, at (1333) (e.g., because boarding is imminent). If the user 110 arrives (e.g., starts and/or completes boarding, item retrieval, item placement, etc.) at the vehicle 104 within a certain timeframe (e.g., with "Z" time), at (1334), the vehicle 104 can provide a vehicle service to the user 110, at (1336). If the user 110 does not arrive (e.g., start and/or complete boarding, item retrieval, item placement, etc.) within the timeframe, the vehicle computing system 102 can contact the user 110, at (1338). If the contact is successful, the vehicle 104 can again wait for the user 110 to arrive (e.g., start and/or complete boarding, item retrieval, item placement, etc.) to the vehicle 104. If the contact is not successful, the vehicle computing system 102 can cancel the vehicle service, at (1340).

In the event that the vehicle computing system 102 does not find a parking location after the location 202 associated with the user 110 and within the vicinity 206 of the location 202 (e.g., an acceptable walking distance 302), the vehicle computing system 102 can cause the vehicle 104 to implement a vehicle holding pattern (e.g., enter a holding pattern operating mode), at (1342). As such, the vehicle 104 can ignore any potential parking locations and provide a communication to the user device 138 associated with the user 110. The user device 138 can display a map interface depicting a location of the vehicle 104. In some implementations, the vehicle computing system 102 can request a second vehicle route 208 from the operations computing system 106. The operations computing system 106 can provide data indicative of the second vehicle route 208 to the vehicle computing system 102. The vehicle computing system 102 can obtain the data indicative of the second vehicle route 208 and send one or more control signals to cause the vehicle 104 to travel in accordance with the second vehicle route 208. At (1344), the vehicle computing system 102 can send a communication to the user 110 indicating that the vehicle 104 is travelling to return to the location 202 associated with the user 110, as described herein. As the vehicle 104 returns back toward the location 202 associated with the user 110, the vehicle 104 can enter into the approach operating mode 108D again, at (1346). As such, the process can continue as shown in FIG. 13A.

The vehicle 104 can continue in the holding pattern until the vehicle service cancellation threshold 1102 is reached. After the vehicle service cancellation threshold 1102 is reached, the vehicle computing system 102 can provide a communication directly to the user device 138 (e.g., via the vehicle's communication system 136) to inform the user 110 that the vehicle service has been cancelled. In some implementations, if another vehicle would be more appropriate to provide the vehicle service to the user 110 (e.g., another vehicle could arrive to the location 202 associated with the user 110 quicker than the vehicle 104), the operations computing system 106 can re-route the other vehicle to the location 202 associated with the user 110.

Figure 14:
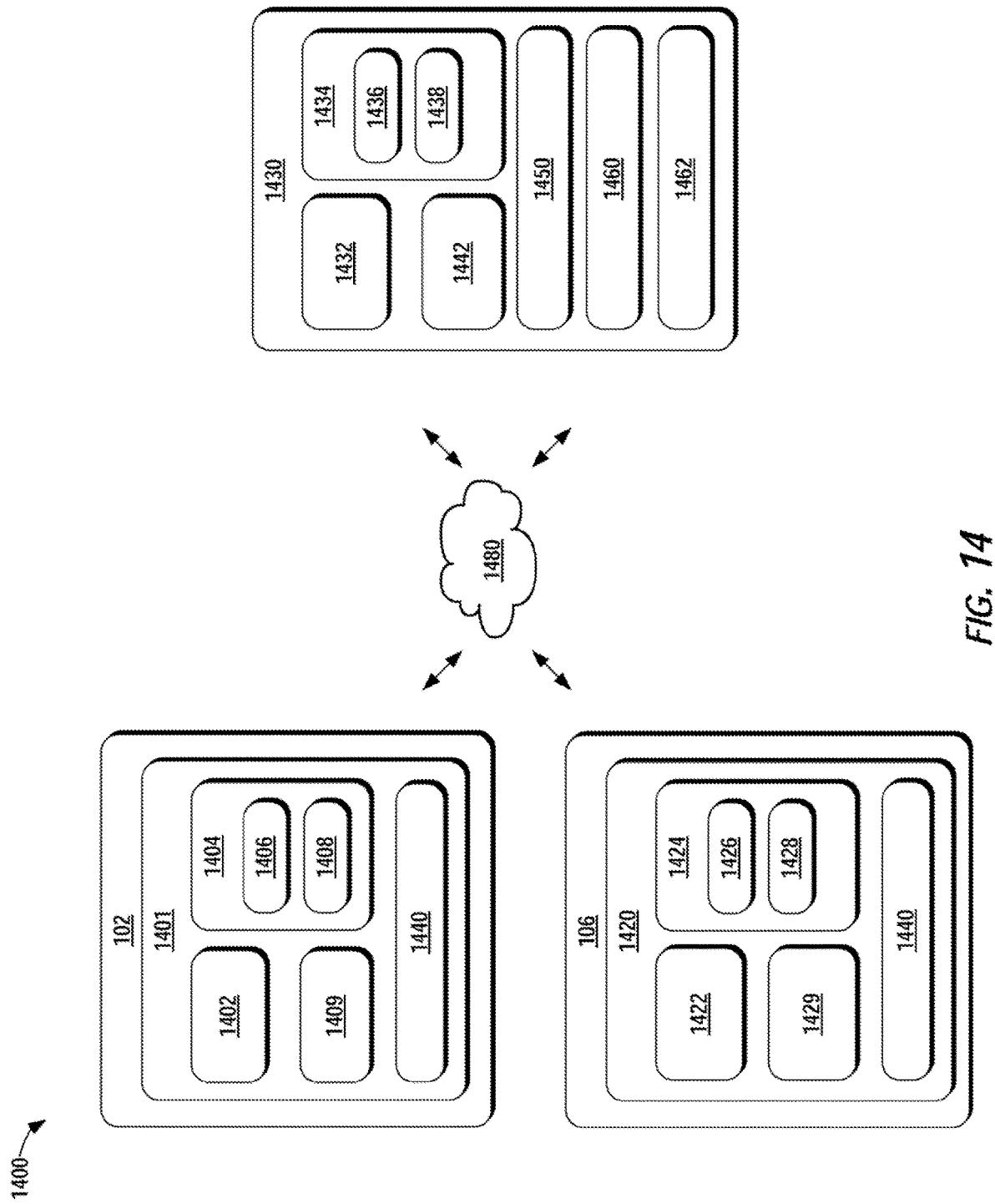
FIG. 14 depicts example system components according to example embodiments of the present disclosure.

FIG. 14 depicts example system components of an example system 1400 according to example embodiments of the present disclosure. The example system 1400 can include the vehicle computing system 102, the operations computing system 106, and a machine learning computing system 1430 that are communicatively coupled over one or more network(s) 1480.

The vehicle computing system 102 can include one or more computing device(s) 1401. The computing device(s) 1401 of the vehicle computing system 102 can include processor(s) 1402 and a memory 1404 (e.g., onboard the vehicle 104). The one or more processors 1402 can be any suitable processing device (e.g., a processor core, a microprocessor, an ASIC, a FPGA, a controller, a microcontroller, etc.) and can be one processor or a plurality of processors that are operatively connected. The memory 1404 can include one or more non-transitory computer-readable storage media, such as RAM, ROM, EEPROM, EPROM, one or more memory devices, flash memory devices, etc., and combinations thereof.

The memory 1404 can store information that can be accessed by the one or more processors 1402. For instance, the memory 1404 (e.g., one or more non-transitory computer-readable storage mediums, memory devices) can include computer-readable instructions 1406 that can be executed by the one or more processors 1402. The instructions 1406 can be software written in any suitable programming language or can be implemented in hardware. Additionally, or alternatively, the instructions 1406 can be executed in logically and/or virtually separate threads on processor(s) 1402.

For example, the memory 1404 can store instructions 1406 that when executed by the one or more processors 1402 cause the one or more processors 1402 (the computing system 102) to perform operations such as any of the operations and functions of the vehicle computing system 102, the vehicle 104, or for which the vehicle computing system 102 and/or the vehicle 104 are configured, as described herein, the operations for determining autonomous boarding times and/or other time estimates (e.g., one or more portions of method 700) the operations for controlling autonomous vehicles (e.g., one or more portions of methods 1200 and/or 1300), and/or any other functions for the vehicle 104, as described herein.

The memory 1404 can store data 1408 that can be obtained, received, accessed, written, manipulated, created, and/or stored. The data 1408 can include, for instance, traffic data, location data, historic data, map data, sensor data, state data, prediction data, motion planning data, data associated with operating modes, data associated with estimated times, and/or other data/information described herein. In some implementations, the computing device(s) 1401 can obtain data from one or more memory device(s) that are remote from the vehicle 104.

The computing device(s) 1401 can also include a communication interface 1409 used to communicate with one or more other system(s) on-board the vehicle 104 and/or a remote computing device that is remote from the vehicle 104 (e.g., the other systems of FIG. 1400, a user device associated with a user, etc.). The communication interface 1409 can include any circuits, components, software, etc. for communicating via one or more networks (e.g., 1480). In some implementations, the communication interface 1409 can include for example, one or more of a communications controller, receiver, transceiver, transmitter, port, conductors, software and/or hardware for communicating data/information.

The operations computing system 106 can perform the operations and functions for managing autonomous vehicles, as described herein. The operations computing system 106 can be located remotely from the vehicle 104. For example, the operations computing system 106 can operate offline, off-board, etc. The operations computing system 106 can include one or more distinct physical computing devices.

The operations computing system 106 can include one or more computing devices 1420. The one or more computing devices 1420 can include one or more processors 1422 and a memory 1424. The one or more processors 1422 can be any suitable processing device (e.g., a processor core, a microprocessor, an ASIC, a FPGA, a controller, a microcontroller, etc.) and can be one processor or a plurality of processors that are operatively connected. The memory 1424 can include one or more non-transitory computer-readable storage media, such as RAM, ROM, EEPROM, EPROM, one or more memory devices, flash memory devices, etc., and combinations thereof.

The memory 1424 can store information that can be accessed by the one or more processors 1422. For instance, the memory 1424 (e.g., one or more non-transitory computer-readable storage mediums, memory devices) can store data 1426 that can be obtained, received, accessed, written, manipulated, created, and/or stored. The data 1426 can include, for instance, service request data, vehicle data, vehicle service cancellation thresholds, and/or other data or information described herein. In some implementations, the operations computing system 106 can obtain data from one or more memory device(s) that are remote from the operations computing system 106.

The memory 1424 can also store computer-readable instructions 1428 that can be executed by the one or more processors 1422. The instructions 1428 can be software written in any suitable programming language or can be implemented in hardware. Additionally, or alternatively, the instructions 1428 can be executed in logically and/or virtually separate threads on processor(s) 1422.

For example, the memory 1424 can store instructions 1428 that when executed by the one or more processors 1422 cause the one or more processors 1422 to perform any of the operations and/or functions described herein, including, for example, any of the operations and functions of the operations computing system 106, the computing device(s) 1420, and any of the operations and functions for which the operations computing system 106 and/or the computing device(s) 1420 are configured, as described herein, as well as one or more portions of methods 1200 and/or 1300.

The computing device(s) 1420 can also include a communication interface 1429 used to communicate with one or more other system(s). The communication interface 1429 can include any circuits, components, software, etc. for communicating via one or more networks (e.g., 1480). In some implementations, the communication interface 1429 can include for example, one or more of a communications controller, receiver, transceiver, transmitter, port, conductors, software and/or hardware for communicating data/information.

According to an aspect of the present disclosure, the vehicle computing system 102 and/or the operations computing system 106 can store or include one or more machine-learned models 1440. As examples, the machine-learned models 1440 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), or other forms of neural networks.

In some implementations, the vehicle computing system 102 and/or the operations computing system 106 can receive the one or more machine-learned models 1440 from the machine learning computing system 1430 over the network(s) 1480 and can store the one or more machine-learned models 1440 in the memory of the respective system. The vehicle computing system 102 and/or the operations computing system 106 can use or otherwise implement the one or more machine-learned models 1440 (e.g., by processor(s) 1402, 1422). In particular, the vehicle computing system 102 and/or the operations computing system 106 can implement the machine learned model(s) 1440 to determine an acceptable walking distance, traffic constraint, estimated traffic impact, estimated time of user arrival (e.g., estimated boarding time, estimated boarding during, estimated boarding completion, etc.), second vehicle route (e.g., vehicle holding pattern), vehicle service cancellation threshold, etc., as described herein.

The machine learning computing system 1430 can include one or more processors 1432 and a memory 1434. The one or more processors 1432 can be any suitable processing device (e.g., a processor core, a microprocessor, an ASIC, a FPGA, a controller, a microcontroller, etc.) and can be one processor or a plurality of processors that are operatively connected. The memory 1434 can include one or more non-transitory computer-readable storage media, such as RAM, ROM, EEPROM, EPROM, one or more memory devices, flash memory devices, etc., and combinations thereof.

The memory 1434 can store information that can be accessed by the one or more processors 1432. For instance, the memory 1434 (e.g., one or more non-transitory computer-readable storage mediums, memory devices) can store data 1436 that can be obtained, received, accessed, written, manipulated, created, and/or stored. In some implementations, the machine learning computing system 1430 can obtain data from one or more memory devices that are remote from the system 1430.

The memory 1434 can also store computer-readable instructions 1438 that can be executed by the one or more processors 1432. The instructions 1438 can be software written in any suitable programming language or can be implemented in hardware. Additionally, or alternatively, the instructions 1438 can be executed in logically and/or virtually separate threads on processor(s) 1432. The memory 1434 can store the instructions 1438 that when executed by the one or more processors 1432 cause the one or more processors 1432 to perform operations.

In some implementations, the machine learning computing system 1430 can include one or more server computing devices. If the machine learning computing system 1430 includes multiple server computing devices, such server computing devices can operate according to various computing architectures, including, for example, sequential computing architectures, parallel computing architectures, or some combination thereof.

In addition or alternatively to the model(s) 1440 at the vehicle computing system 102 and/or the operations computing system 106, the machine learning computing system 1430 can include one or more machine-learned models 1450. As examples, the machine-learned models 1450 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks, or other forms of neural networks. The machine-learned models 1450 can be similar to and/or the same as the machine-learned models 1440.

As an example, the machine learning computing system 1430 can communicate with the vehicle computing system 102 and/or the operations computing system 106 according to a client-server relationship. For example, the machine learning computing system 1430 can implement the machine-learned models 1450 to provide a web service to the vehicle computing system 102 and/or the operations computing system 106. For example, the web service can provide machine-learned models to an entity associated with an autonomous vehicle; such that the entity can implement the machine-learned model (e.g., to determine estimated traffic impacts, vehicle service request cancellation, etc.). Thus, machine-learned models 1450 can be located and used at the vehicle computing system 102 and/or the operations computing system 106 and/or machine-learned models 1450 can be located and used at the machine learning computing system 1430.

In some implementations, the machine learning computing system 1430, the vehicle computing system 102, and/or the operations computing system 106 can train the machine-learned models 1440 and/or 1450 through use of a model trainer 1460. The model trainer 1460 can train the machine-learned models 1440 and/or 1450 using one or more training or learning algorithms. One example training technique is backwards propagation of errors. In some implementations, the model trainer 1460 can perform supervised training techniques using a set of labeled training data. In other implementations, the model trainer 1460 can perform unsupervised training techniques using a set of unlabeled training data. The model trainer 1460 can perform a number of generalization techniques to improve the generalization capability of the models being trained. Generalization techniques include weight decays, dropouts, or other techniques.

In particular, the model trainer 1460 can train a machine-learned model 1440 and/or 1450 based on a set of training data 1462. The training data 1462 can include, for example, a number of sets of data from previous events (e.g., acceptable walking distance data, historic traffic data, user arrival data, trip cancellation data, user feedback data, other data described herein). In some implementations, the training data 1462 can be taken from the same geographic area (e.g., city, state, and/or country) in which an autonomous vehicle utilizing that model 1440/1450 is designed to operate. In this way, the models 1450/1450 can be trained to determine outputs (e.g., estimated traffic impact, acceptable walking distances) in a manner that is tailored to the customs of a particular location (e.g., waiting for a user longer, decreasing an acceptable walking distance, etc.). The model trainer 1460 can be implemented in hardware, firmware, and/or software controlling one or more processors.

The network(s) 1480 can be any type of network or combination of networks that allows for communication between devices. In some embodiments, the network(s) 1480 can include one or more of a local area network, wide area network, the Internet, secure network, cellular network, mesh network, peer-to-peer communication link and/or some combination thereof and can include any number of wired or wireless links. Communication over the network(s) 1480 can be accomplished, for instance, via a network interface using any type of protocol, protection scheme, encoding, format, packaging, etc.

FIG. 14 illustrates one example system 1400 that can be used to implement the present disclosure. Other computing systems can be used as well. For example, in some implementations, the vehicle computing system 102 and/or the operations computing system 106 can include the model trainer 1460 and the training dataset 1462. In such implementations, the machine-learned models 1440 can be both trained and used locally at the vehicle computing system 102 and/or the operations computing system 106. As another example, in some implementations, the vehicle computing system 102 and/or the operations computing system 104 may not be connected to other computing systems.

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method, comprising:
    obtaining, by a computing system that comprises one or more computing devices, data indicative of a location associated with a user that has requested a vehicle service;
    communicating, by the computing system for an autonomous vehicle, data indicative of the location associated with the user, wherein the autonomous vehicle has been assigned to provide the user with the vehicle service and is to travel to the location associated with the user;
    obtaining, by the computing system, location data associated with a user device of the user;
    determining, by the computing system, an estimated time at which the user will arrive at the autonomous vehicle based at least in part on the location data associated with the user device and a location of the autonomous vehicle;
    determining, by the computing system, an unlock time indicative of when the autonomous vehicle is to unlock a vehicle door of the autonomous vehicle based at least in part on the estimated time at which the user will arrive at the autonomous vehicle; and
    communicating, by the computing system and based at least in part on the unlock time, data indicating to unlock the vehicle door.

2. The computer-implemented method of claim 1, wherein the location associated with the user is a pick-up location, and wherein the vehicle service is a delivery service for which the autonomous vehicle is to transport an item from the pick-up location to a destination location.

3. The computer-implemented method of claim 2, wherein the location associated with the user is a destination location, and wherein the vehicle service is a delivery service for which the autonomous vehicle is to transport an item to the destination location.

4. The computer-implemented method of claim 1, further comprising:
    determining, by the computing system, an estimated time until the user completes retrieval of an item from the autonomous vehicle.

5. The computer-implemented method of claim 4, further comprising:
    determining, by the computing system, an estimated time until the user places an item in the autonomous vehicle.

6. The computer-implemented method of claim 1, wherein the user device of the user receives a textual message indicating the autonomous vehicle is within a vicinity of the location associated with the user.

7. The computer-implemented method of claim 6, wherein the textual message indicates that the autonomous vehicle is arriving for the vehicle service.

8. The computer-implemented method of claim 1, further comprising:
    determining, by the computing system, a parking location when the autonomous vehicle is within a vicinity of the location associated with the user.

9. The computer-implemented method of claim 8, wherein the parking location is a designated parking location for the vehicle service.

10. A computing system comprising:
    one or more processors; and
    one or more memory devices, the one or more memory devices storing instructions that when executed by the one or more processors cause the computing system to perform operations, the operations comprising:
        obtaining data indicative of a location associated with a user that has requested a vehicle service;
        communicating, for an autonomous vehicle, data indicative of the location associated with the user, wherein the autonomous vehicle has been assigned to provide the user with the vehicle service and is to travel to the location associated with the user;
        obtaining location data associated with a user device of the user;
        determining an estimated time at which the user will arrive at the autonomous vehicle based at least in part on the location data associated with the user device and a location of the autonomous vehicle;
        determining an unlock time indicative of when the autonomous vehicle is to unlock a vehicle door of the autonomous vehicle based at least in part on the estimated time at which the user will arrive at the autonomous vehicle; and
        communicating, based at least in part on the unlock time, data indicating to unlock the vehicle door.

11. The computing system of claim 10, wherein the user device comprises a software application via which the user requested the vehicle service.

12. The computing system of claim 10, wherein the vehicle service is a delivery service.

13. The computing system of claim 10, wherein the location associated with the user is a pick-up location, and wherein the vehicle service is a delivery service for which the autonomous vehicle is to transport an item from the pick-up location to a destination location.

14. The computing system of claim 10, wherein the location associated with the user is a destination location, and wherein the vehicle service is a delivery service for which the autonomous vehicle is to transport an item to the destination location.

15. The computing system of claim 10, further comprising:
    determining an estimated time until the user completes retrieval of an item from the autonomous vehicle.

16. The computing system of claim 10, further comprising:
    determining an estimated time until the user places an item in the autonomous vehicle.

17. One or more tangible, non-transitory, computer readable media storing instructions that when executed by one or more processors cause the one or more processors to perform operations comprising:
- obtaining data indicative of a location associated with a user that has requested a vehicle service;
- communicating, for an autonomous vehicle, data indicative of the location associated with the user, wherein the autonomous vehicle has been assigned to provide the user with the vehicle service and is to travel to the location associated with the user;
- obtaining location data associated with a user device of the user;
- determining an estimated time at which the user will arrive at the autonomous vehicle based at least in part on the location data associated with the user device and a location of the autonomous vehicle;
- determining an unlock time indicative of when the autonomous vehicle is to unlock a vehicle door of the autonomous vehicle based at least in part on the estimated time at which the user will arrive at the autonomous vehicle; and
- communicating, and based at least in part on the unlock time, data indicating to unlock the vehicle door.

18. The one or more tangible, non-transitory computer readable media of claim 17, wherein the vehicle service is a delivery service.

19. The one or more tangible, non-transitory computer readable media of claim 18, wherein the location associated with the user is a pick-up location or a destination location associated with the delivery service.

20. The one or more tangible, non-transitory computer readable media of claim 19, wherein the pick-up location is associated with an item being placed into the autonomous vehicle, and wherein the destination location is associated with an item being retrieved from the autonomous vehicle.

* * * * *